(12) United States Patent
Pinckney et al.

(10) Patent No.: US 9,245,231 B2
(45) Date of Patent: *Jan. 26, 2016

(54) INFERRING USER PREFERENCES FROM AN INTERNET BASED SOCIAL INTERACTIVE CONSTRUCT

(71) Applicant: eBay Inc., San Jose, CA (US)

(72) Inventors: Thomas Pinckney, New York, NY (US); Christopher Dixon, New York, NY (US); Matthew Ryan Gattis, New York, NY (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,150

(22) Filed: Jan. 15, 2015

(65) Prior Publication Data

US 2015/0127586 A1 May 7, 2015

Related U.S. Application Data

(63) Continuation of application No. 13/945,274, filed on Jul. 18, 2013, now Pat. No. 9,037,531, which is a continuation of application No. 12/813,715, filed on Jun. 11, 2010, now Pat. No. 8,494,978, said (Continued)

(51) Int. Cl.
*G06F 17/00* (2006.01)
*G06F 17/20* (2006.01)

(Continued)

(52) U.S. Cl.
CPC .............. *G06N 5/048* (2013.01); *G06N 99/005* (2013.01); *G06Q 30/02* (2013.01)

(58) Field of Classification Search
None
See application file for complete search history.

(56) References Cited

U.S. PATENT DOCUMENTS 5,583,763 A 12/1996 Atcheson et al.
5,704,017 A 12/1997 Heckerman et al.

(Continued)

FOREIGN PATENT DOCUMENTS

CN 103348369 A 10/2013
EP 2218019 A2 8/2010

(Continued)

OTHER PUBLICATIONS

"Who Are Your Friends?" —A Simple Mechanism that achieves perfect network formation Ming, F.; Fai Wong; Marbach, P. INFOCOM, 2011 Proceedings IEEE Year: 2011 pp. 566-570, DOI: 10.1109/INFCOM.2011.5935227 Referenced in: IEEE Conference Publications.*

(Continued)

*Primary Examiner* — Michael B Holmes
(74) *Attorney, Agent, or Firm* — Schwegman Lundberg & Woessner, P.A.

(57) ABSTRACT

In embodiments of the present invention improved capabilities are described for a computer program product embodied in a computer readable medium that, when executing on one or more computers, helps determine an unknown user's preferences through the use of internet based social interactive graphical representations on a computer facility by performing the steps of (1) ascertaining preferences of a plurality of users who are part of an inter-net based social interactive construct, wherein the plurality of users become a plurality of known users; (2) determining the internet based social interactive graphical representation for the plurality of known users; and (3) inferring the preferences of an unknown user present in the interact based social interactive graphical representation of the plurality of known users based on the inter-relationships between the unknown user and the plurality of known users within the graphical representation.

20 Claims, 37 Drawing Sheets

Related U.S. Application Data application No. 13/945,274 is a continuation-in-part of application No. 12/483,768, filed on Jun. 12, 2009, now Pat. No. 8,032,480, which is a continuation-in-part of application No. 12/262,862, filed on Oct. 31, 2008, now Pat. No. 7,958,066.

(60) Provisional application No. 61/233,326, filed on Aug. 12, 2009, provisional application No. 61/300,511, filed on Feb. 2, 2010, provisional application No. 61/097,394, filed on Sep. 16, 2008, provisional application No. 60/984,948, filed on Nov. 2, 2007, provisional application No. 61/060,226, filed on Jun. 10, 2008.

(51) Int. Cl.
*G06N 5/04* (2006.01)
*G06N 99/00* (2010.01)
*G06Q 30/02* (2012.01)

(56) References Cited

U.S. PATENT DOCUMENTS

| | | | |
|---|---|---|---|
| 6,064,978 A | 5/2000 | Gardner et al. | |
| 6,246,981 B1 | 6/2001 | Papineni et al. | |
| 6,249,785 B1 | 6/2001 | Paepke | |
| 6,767,325 B2 | 7/2004 | Iliff | |
| 6,785,671 B1 | 8/2004 | Bailey et al. | |
| 7,089,226 B1 | 8/2006 | Dumais et al. | |
| 7,146,627 B1 | 12/2006 | Ismail | |
| 7,293,019 B2 | 11/2007 | Dumais et al. | |
| 7,519,529 B1 | 4/2009 | Horvitz | |
| 7,562,304 B2* | 7/2009 | Dixon | G06F 17/30861 705/35 |
| 7,685,132 B2 | 3/2010 | Hyman | |
| 7,716,236 B2 | 5/2010 | Sidhu et al. | |
| 7,765,481 B2* | 7/2010 | Dixon | G06Q 30/02 705/26.8 |
| 7,822,620 B2* | 10/2010 | Dixon | G06Q 30/02 705/1.1 |
| 7,958,066 B2* | 6/2011 | Pinckney | G06N 99/005 706/12 |
| 7,966,282 B2* | 6/2011 | Pinckney | G06Q 30/0601 706/12 |
| 8,032,480 B2* | 10/2011 | Pinckney | G06N 99/005 706/45 |
| 8,032,481 B2* | 10/2011 | Pinckney | G06N 99/005 706/12 |
| D666,403 S * | 9/2012 | Finnegan | D2/966 |
| 8,296,664 B2* | 10/2012 | Dixon | G06Q 10/06 715/760 |
| 8,321,791 B2* | 11/2012 | Dixon | G06F 17/30861 705/35 |
| 8,429,545 B2* | 4/2013 | Dixon | G06Q 10/06 707/706 |
| 8,438,399 B2 | 5/2013 | Lenger | |
| 8,438,499 B2* | 5/2013 | Dixon | G06Q 10/06 715/760 |
| 8,484,142 B2* | 7/2013 | Pinckney | G06F 17/30867 706/12 |
| 8,494,978 B2* | 7/2013 | Pinckney | G06N 99/005 706/11 |
| 8,516,377 B2* | 8/2013 | Dixon | G06F 17/30861 705/35 |
| 8,566,726 B2* | 10/2013 | Dixon | H04L 63/1441 705/35 |
| 8,666,309 B2* | 3/2014 | Hottinen | H04B 7/022 370/315 |
| 8,666,909 B2 | 3/2014 | Pinckney et al. | |
| 8,667,100 B2* | 3/2014 | Dixon | H04L 67/10 709/221 |
| 8,712,877 B2 | 4/2014 | Stremler et al. | |
| 8,826,154 B2* | 9/2014 | Dixon | G06Q 10/06 715/760 |
| 8,826,155 B2* | 9/2014 | Dixon | G06Q 10/06 715/760 |
| 8,972,314 B2* | 3/2015 | Pinckney | G06Q 30/02 706/12 |
| 9,009,096 B2* | 4/2015 | Pinckney | G06F 17/30867 706/52 |
| 9,037,531 B2* | 5/2015 | Pinckney | G06N 99/005 706/62 |
| 2003/0065636 A1 | 4/2003 | Peyrelevade | |
| 2004/0236981 A1 | 11/2004 | Karpf | |
| 2005/0021357 A1 | 1/2005 | Schuetze et al. | |
| 2005/0055321 A1 | 3/2005 | Fratkina et al. | |
| 2005/0086187 A1 | 4/2005 | Grosser et al. | |
| 2005/0260549 A1 | 11/2005 | Feierstein et al. | |
| 2006/0173985 A1 | 8/2006 | Moore | |
| 2006/0195362 A1 | 8/2006 | Jacobi et al. | |
| 2006/0230008 A1 | 10/2006 | Burgener | |
| 2007/0022075 A1 | 1/2007 | Horvitz et al. | |
| 2007/0078884 A1 | 4/2007 | Ott, IV et al. | |
| 2007/0100653 A1 | 5/2007 | Ramer et al. | |
| 2007/0143281 A1 | 6/2007 | Smirin et al. | |
| 2007/0207449 A1 | 9/2007 | Feierstein | |
| 2008/0005075 A1 | 1/2008 | Horvitz et al. | |
| 2008/0010272 A1 | 1/2008 | Schickel-Zuber et al. | |
| 2008/0086436 A1 | 4/2008 | Zhao et al. | |
| 2008/0086504 A1 | 4/2008 | Sanders et al. | |
| 2008/0091722 A1 | 4/2008 | Wendelrup | |
| 2008/0126476 A1 | 5/2008 | Nicholas et al. | |
| 2008/0139112 A1 | 6/2008 | Sampath et al. | |
| 2008/0140674 A1 | 6/2008 | Ishikawa | |
| 2008/0162393 A1 | 7/2008 | Iliff | |
| 2008/0189621 A1 | 8/2008 | Reich et al. | |
| 2008/0214204 A1 | 9/2008 | Ramer et al. | |
| 2008/0228040 A1 | 9/2008 | Thompson | |
| 2008/0276279 A1 | 11/2008 | Gossweiler et al. | |
| 2009/0077022 A1 | 3/2009 | Cuthbert | |
| 2009/0112989 A1 | 4/2009 | Anderson et al. | |
| 2009/0119234 A1 | 5/2009 | Pinckney et al. | |
| 2009/0164442 A1 | 6/2009 | Shani et al. | |
| 2009/0300036 A1 | 12/2009 | Nagasaki | |
| 2009/0307159 A1 | 12/2009 | Pinckney et al. | |
| 2010/0010913 A1 | 1/2010 | Pinckney et al. | |
| 2010/0017348 A1 | 1/2010 | Pinckney et al. | |
| 2010/0211308 A1 | 8/2010 | Zheng et al. | |
| 2010/0312650 A1 | 12/2010 | Pinckney et al. | |
| 2010/0312724 A1 | 12/2010 | Pinckney et al. | |
| 2010/0325205 A1 | 12/2010 | Murphy et al. | |
| 2010/0332324 A1 | 12/2010 | Khosravy et al. | |
| 2011/0302117 A1 | 12/2011 | Pinckney et al. | |
| 2011/0307478 A1 | 12/2011 | Pinckney et al. | |
| 2013/0304691 A1 | 11/2013 | Pinckney et al. | |
| 2014/0180979 A1 | 6/2014 | Pinckney et al. | |
| 2015/0127585 A1 | 5/2015 | Pinckney et al. | |
| 2015/0127587 A1 | 5/2015 | Pinckney et al. | |
| 2015/0127597 A1 | 5/2015 | Pinckney et al. | |
| 2015/0127598 A1 | 5/2015 | Pinckney et al. | |
| 2015/0142711 A1 | 5/2015 | Pinckney et al. | |

FOREIGN PATENT DOCUMENTS

| | | |
|---|---|---|
| JP | 10162025 A | 6/1998 |
| JP | 2006012045 A | 1/2006 |
| JP | 2006079412 A | 3/2006 |
| JP | 2006331089 A | 12/2006 |
| JP | 2008217133 A | 9/2008 |
| JP | 2009015834 A | 1/2009 |
| WO | WO-0137136 A2 | 5/2001 |
| WO | WO-2007118202 A2 | 10/2007 |
| WO | WO-2009059199 A2 | 5/2009 |
| WO | WO-2009059199 A3 | 5/2009 |
| WO | US2010/0144766 A1 | 6/2010 |
| WO | WO-2010144766 A1 | 12/2010 |
| WO | WO-2012094516 A1 | 7/2012 |
| WO | WO-2012094519 A1 | 7/2012 |

OTHER PUBLICATIONS

Mining the Dynamics of Music Preferences from a Social Networking Site Schlitter, N.; Falkowski, T. Social Network Analysis and

(56) References Cited

OTHER PUBLICATIONS

Mining, 2009. ASONAM '09. International Conference on Advances in Year: 2009 pp. 243-248, DOI: 10.1109/ASONAM.2009.26 Referenced in: IEEE Conference Publications.*

Distributed Advice-Seeking on an Evolving Social Network Rezaei, G.; Pfau, J.; Kirley, M. Web Intelligence and Intelligent Agent Technology (WI-IAT), 2010 IEEE/WIC/ACM International Conference on Year: 2010, Volume: 2 Pages 24-31, DOI: 10.1109/WI-AT.2010.78 Referenced in: IEEE Conference Publications.*

Investigating City Characteristics Based on Community Profiling in LBSNs Zhu Wang; Daqing Zhang; Dingqi Yang; Zhiyong Yu; Xingshe Zhou; Zhiwen Yu Cloud and Green Computing (CGC), 2012 Second International Conference on Year: 2012 pp. 578-585, DOI: 10.1109/CGC.2012.25 IEEE Conference Publications.*

Privacy Settings in Online Social Networks—Preferences, Perception, and Reality Netter, Michel; Riesner, Moritz; Weber, Michael; Pernul, Gunther System Sciences (HICSS), 2013 46th Hawaii International Conference on Year: 2013 pp. 3219-3228, DOI: 10.1109/HICSS.2013.455 Referenced in: IEEE Conference Publications.*

Tourist Tour Planning Supported by Social Network Analysis Ahmedi, L.; Rrmoku, K.; Sylejmani, K. Social Informatics (SocialInformatics), 2012 International Conference on Year: 2012 pp. 295-303, DOI: 10.1109/SocialInformatics.2012.89 Referenced in: IEEE Conference Publications.*

The Behavior and Preferences of Users on Web 2.0 Social Network Sites: An Empirical Study Shwu-Min Horng Information Technology: New Generations, 2009. ITNG '09. Sixth International Conference on Year: 2009 pp. 934-939, DOI: 10.1109/ITNG.2009.253 Referenced in: IEEE Conference Publications.*

Video abstraction in social media: Augmenting facebook's EdgeRank algorithm in video content presentation Ntalianis, K.; Doulamis, A.; Doulamis, N.; Tsapatsoulis, N. Image Processing (ICIP), 2013 20th IEEE International Conference on Year: 2013 pp. 2684-2688, DOI: 10.1109/ICIP.2013.6738553 Referenced in: IEEE Conf. Publication.*

"U.S. Appl. No. 12/262,862, filed Oct. 4, 2010", 29 pgs.

"U.S. Appl. No. 12/262,862, Non Final Office Action mailed Nov. 9, 2010", Attorney Reference GDPL-0001-P01, (Nov. 9, 2010), 30 pgs.

"U.S. Appl. No. 12/262,862, Non Final Office Action mailed Nov. 9, 2010", 28 pgs.

"U.S. Appl. No. 12/262,862, Notice of Allowance mailed Apr. 11, 2011", 8 pgs.

"U.S. Appl. No. 12/483,768, Non Final Office Action mailed Nov. 8, 2010", 16 pgs.

"U.S. Appl. No. 12/483,768, Notice of Allowance mailed Jun. 8, 2011", 12 pgs.

"U.S. Appl. No. 12/503,263, Examiner Interview Summary mailed Feb. 16, 2011", 3 pgs.

"U.S. Appl. No. 12/503,263, Non Final Office Action mailed Sep. 29, 2010", 19 pgs.

"U.S. Appl. No. 12/503,263, Non Final Office Action mailed Sep. 29, 2010", 17 pgs.

"U.S. Appl. No. 12/503,263, Notice of Allowance mailed Jun. 3, 2011", 18 pgs.

"U.S. Appl. No. 12/503,334, Examiner Interview Summary mailed Feb. 16, 2011", 3 pgs.

"U.S. Appl. No. 12/503,334, Non Final Office Action mailed Sep. 29, 2010", 16 pgs.

"U.S. Appl. No. 12/503,334, Notice of Allowance mailed Apr. 13, 2011", 10 pgs.

"U.S. Appl. No. 12/503,334, Notice of Allowance mailed Apr. 13, 2011", 7 pgs.

"U.S. Appl. No. 12/503,334, Notice of Allowance mailed Apr. 13, 2011", 8 pgs.

"U.S. Appl. No. 12/813,715, Non Final Office Action mailed Sep. 26, 2012", 9 pgs.

"U.S. Appl. No. 12/813,715, Notice of Allowance mailed Mar. 19, 2013", 9 pgs.

"U.S. Appl. No. 12/813,715, Response filed Jan. 28, 13 to Non Final Office Action mailed Sep. 26, 2012", 6 pgs.

"U.S. Appl. No. 12/813,738, Notice of Allowance mailed Feb. 22, 2013", 7 pgs.

"U.S. Appl. No. 12/813,738, Notice of Allowance mailed Sep. 10, 2012", 8 pgs.

"U.S. Appl. No. 12/813,738, Notice of Allowance mailed Dec. 26, 2012", 7 pgs.

"U.S. Appl. No. 13/155,917, Non Final Office Action mailed Jul. 10, 2013", 8 pgs.

"U.S. Appl. No. 13/155,917, Notice of Allowance mailed Oct. 21, 2013", 8 pgs.

"U.S. Appl. No. 13/155,917, Response filed Oct. 10, 2013 to Non Final Office Action mailed Jul. 10, 2013", 10 pgs.

"U.S. Appl. No. 13/155,964, Final Office Action mailed Aug. 14, 2013", 14 pgs.

"U.S. Appl. No. 13/155,964, Final Office Action mailed Aug. 27, 2014", 16 pgs.

"U.S. Appl. No. 13/155,964, Non Final Office Action mailed Feb. 1, 2013", 9 pgs.

"U.S. Appl. No. 13/155,964, Notice of Allowance mailed Dec. 29, 2014", 5 pgs.

"U.S. Appl. No. 13/155,964, Response filed May 1, 2013 to Non Final Office Action mailed Feb. 1, 2013", 13 pgs.

"U.S. Appl. No. 13/155,964, Response filed Nov. 14, 2013 to Final Office Action mailed Aug. 14, 2013", 13 pgs.

"U.S. Appl. No. 13/155,964, Response filed Dec. 1, 2014 to Final Office Action mailed Aug. 27, 2014", 12 pgs.

"U.S. Appl. No. 13/945,274, Non Final Office Action mailed May 20, 2014", 10 pgs.

"U.S. Appl. No. 13/945,274, Notice of Allowance mailed Jan. 14, 2015", 5 pgs.

"U.S. Appl. No. 13/945,274, Notice of Allowance mailed Oct. 2, 2014", 6 pgs.

"U.S. Appl. No. 13/945,274, Preliminary Amendment filed Apr. 9, 2014", 7 pgs.

"U.S. Appl. No. 13/945,274, Response filed Sep. 22, 2014 to Non Final Office Action mailed May 20, 2014", 8 pgs.

"U.S. Appl. No. 14/195,479, Non Final Office Action mailed Jun. 18, 2014", 13 pgs.

"U.S. Appl. No. 14/195,479, Notice of Allowance mailed Oct. 1, 2014", 7 pgs.

"U.S. Appl. No. 14/195,479, Preliminary Amendment filed Apr. 9, 2014", 5 pgs.

"U.S. Appl. No. 14/195,479, PTO Response to Rule 312 Communication mailed Dec. 1, 2014", 1 pg.

"U.S. Appl. No. 14/195,479, Response filed Sep. 18, 2014 to Non Final Office Action mailed Jun. 18, 2014", 6 pgs.

"Canadian Application Serial No. 2,823,693, Office Action mailed Jan. 26, 2015", 4 pgs.

"Chinese Application Serial No. 201280007906.5, Amendment filed Aug. 13, 2014", 7 pgs.

"Chinese Application Serial No. 201280007906.5, Voluntary Amendment filed Jan. 29, 2014", with English translation of claims, 14 pgs.

"European Application Serial No. 08844789.1, Examination Notification Art. 94(3) mailed Nov. 21, 2013", 6 pgs.

"European Application Serial No. 08844789.1, Office Action mailed Apr. 3, 2012", 1 pg.

"European Application Serial No. 08844789.1, Office Action mailed Jun. 15, 2010", 5 pgs.

"European Application Serial No. 08844789.1, Office Action mailed Jun. 30, 2014", 1 pg.

"European Application Serial No. 08844789.1, Office Action mailed Aug. 1, 2011", 2 pgs.

"European Application Serial No. 08844789.1, Office Action mailed Nov. 6, 2012", 7 pgs.

"European Application Serial No. 08844789.1, Response filed Jul. 18, 2014 to Office Action mailed Jun. 30, 2014", 10 pgs.

"European Application Serial No. 08844789.1, Response filed Oct. 9, 2012 to Office Action mailed Apr. 3, 2012", 4 pgs.

"European Application Serial No. 08844789.1, Response filed Oct. 11, 2011 to Office Action mailed Aug. 1, 2011", 1 pg.

(56) References Cited

OTHER PUBLICATIONS

"European Application Serial No. 08844789.1, Response filed Dec. 3, 2012 to Office Action mailed Nov. 6, 2012", 2 pgs.
"European Application Serial No. 08844789.1, Supplemental Search Report mailed Mar. 15, 2012", 7 pgs.
"European Application Serial No. 12732269.1, Office Action mailed Aug. 13, 2013", 2 pgs.
"European Application Serial No. 12732269.1, Response filed Feb. 17, 2014", 14 pgs.
"Fortune-telling", Wikipedia, [Online]. Retrieved from the Internet: <http://en.wikipedia.org/w/index.php?title=Fortune-telling &oldid=168151917>, (Accessed Mar. 2, 2012), 6 pgs.
"International Application Serial No. PCT/US10/38259 Search Report mailed Sep. 17, 2010", 2 pgs.
"International Application Serial No. PCT/US2008/082077, International Preliminary Report on Patentability mailed May 4, 2010", 7 pgs.
"International Application Serial No. PCT/US2008/082077, International Search Report mailed May 20, 2009", 2 pgs.
"International Application Serial No. PCT/US2008/082077, Written Opinion mailed May 20, 2009", 6 pgs.
"International Application Serial No. PCT/US2010/038259, Written Opinion mailed Sep. 17, 2010", 5 pgs.
"International Application No. PCT/US2012/020358, International Preliminary Report on Patentability mailed Jul. 18, 2013", 8 pgs.
"International Application Serial No. PCT/US2012/020358, Search Report mailed May 11, 2012", 2 pgs.
"International Application Serial PCT/US2012/020358, Written Opinion mailed May 11, 2012", 6 pgs.
"International Application Serial No. PCT/US2012/020362, Written Opinion mailed Apr. 24, 2012", 7 pgs.
"International Application Serial No. PCT/US2012/020362, International Preliminary Report on Patentability mailed Jul. 18, 2013", 9 pgs.
"International Application Serial No. PCT/US2012/020362, Search Report mailed Apr. 24, 2012", 2 pgs.
"Japanese Application Serial No. 2013-548548, Office Action mailed Sep. 16, 2014", with English translation of claims, 8 pgs.
"South African Application Serial No. 2013/04707, Amendment filed Oct. 9, 2014", 6 pgs.
Adomavicius, G., et al., "Toward the next generation of recommender systems: a survey of the state-of-the-art and possible extensions", IEEE Transactions on Knowledge and Data Engineering, 17(6), (Jun. 2005), 734-749.

Burke, Robin, "Hybrid Web Recommender Systems", Lecture Notes in Computer Science, vol. 4321, (May 16, 2007), 377-408.
Quarteroni, Silvia, et al., "A Chatbot-based Interactive Question Answering System", Decalog 2007: Proceedings of the 11th Workshop on the Semantics and Pragmatics of Dialogue. Trento, Italy., (May 2007), 83-90.
Yamamoto, Kouji, et al., "Information Recommendation System on Map based on Posted Information", The Institute of Electronics, Information and Communication Engineers Technical Report, vol. 104, No. 144, SIS2004-1-15., (Jun. 18, 2004), 55-60.
"U.S. Appl. No. 13/155,964, Notice of Allowance mailed Jun. 12, 2015", 5 pgs.
"U.S. Appl. No. 13/609,267, Preliminary Amendment filed Mar. 20, 2015", 8 pgs.
"U.S. Appl. No. 14,595,016, Preliminary Amendment filed Mar. 20, 2015", 6 pgs.
"U.S. Appl. No. 14/595,016, Non Final Office Action mailed Jun. 3, 2015", 15 pgs.
"U.S. Appl. No. 14/595,016, Response filed Aug. 26, 2015 to Non Final Office Action mailed Jun. 3, 2015", 7 pgs.
"U.S. Appl. No. 14/598,141, Non Final Office Action mailed Jun. 12, 2015", 17 pgs.
"U.S. Appl. No. 14/598,141, Preliminary Amendment filed Mar. 20, 2015", 7 pgs.
"U.S. Appl. No. 14/598,141, Response filed Aug. 26, 2015 to Non Final Office Action mailed Jun. 12, 2015", 7 pgs.
"U.S. Appl. No. 14/598,146, Non Final Office Action mailed Jun. 30, 2015", 14 pgs.
"U.S. Appl. No. 14/598,146, Preliminary Amendment filed Mar. 20, 2015", 7 pgs.
"U.S. Appl. No. 14/598,146, Response filed Aug. 26, 2015 to Non Final Office Action mailed Jun. 30, 2015", 8 pgs.
"U.S. Appl. No. 14/598,153, Non Final Office Action mailed Jul. 1, 2015", 17 pgs.
"U.S. Appl. No. 14/598,153, Preliminary Amendment filed Mar. 20, 2015", 6 pgs.
"U.S. Appl. No. 14/598,153, Response filed Aug. 26, 2015 to Non Final Office Action mailed Jul. 1, 2015", 7 pgs.
"Japanese Application Serial No. 2013-548548, Office Action mailed Jun. 23, 2015", w/ English Translation, 6 pgs.
"Korean Application Serial No. 2013-7020657, Office Action mailed Mar. 9, 2015", with English translation of claims, 11 pgs.

* cited by examiner

SELECT AN ACTIVITY IN CAMERAS    SWITCH TOPIC

RATE ITEMS
TELL US IF AN ITEM WOULD BE A GOOD DECISION FOR YOU
20% THIS ACTIVITY

RATE Q&A
JUDGE THE QUALITY OF Q&A ASKED
10% THIS ACTIVITY

QUALITY CONTROL ITEMS
VERIFY THAT SUBMITTED ITEMS HAVE QUALITY PHOTOS AND DESCRIPTIONS
10% THIS ACTIVITY

IDENTIFY DUPLICATE ITEMS
MARK PAIRS OF ITEMS AS DIFFERENT, DUPLICATES, OR VERY SIMILAR
10% THIS ACTIVITY

IDENTIFY DUPLICATE Q&A
MARK Q&A PAIRS AS DIFFERENT, DUPLICATES, OR VERY SIMILAR
20% THIS ACTIVITY

RATE PRO/CONS
MARK USER SUBMITTED PRO / CONS AS HELPFUL OR UNHELPFUL
20% THIS ACTIVITY

1102 — SUGGESTED TOPICS

TOPIC | TOPIC | TOPIC | TOPIC | TOPIC

SEE ALL

IMAGE | DESCRIPTION — 45%

IMAGE | DESCRIPTION — EXPERIMENTAL

78%

THERE IS A 78% CHANCE YOU'LL AGREE WITH THIS DECISION.

DESCRIPTION TITLE

DETAILED DESCRIPTION

IMAGE

VARIATIONS

DO YOU AGREE WITH THIS DECISION?

YES | NO

1312

PROS & CONS FROM PEOPLE LIKE YOU

1100

USER NAME
USER IMAGE
DEMOGRAPHIC

23 MINUTES AGO – 288 PEOPLE FOUND THIS REVIEW HELPFUL

PROS

CONS

DID THIS HELP?
YES | NO

USER NAME
USER IMAGE
DEMOGRAPHIC

23 MINUTES AGO – 288 PEOPLE FOUND THIS REVIEW HELPFUL

PROS

CONS

DID THIS HELP?
YES | NO

WRITE YOUR OWN PROS AND CONS

PROS

CONS

SUBMIT

FIG. 11A

TOPIC: POWER MOWERS

1200

| 49 % | MOWER #1 IMAGE | DESCRIPTION TITLE | DO YOU AGREE WITH THIS DECISION? YES NO |
| DETAILED DESCRIPTION |
| LISTED AT 'LOCATION' FOR 'PRICE' |

| 36 % | MOWER #2 IMAGE | DESCRIPTION TITLE | DO YOU AGREE WITH THIS DECISION? YES NO |
| DETAILED DESCRIPTION |
| LISTED AT 'LOCATION' FOR 'PRICE' |

| 30 % | MOWER #3 IMAGE | DESCRIPTION TITLE | DO YOU AGREE WITH THIS DECISION? YES NO |
| DETAILED DESCRIPTION |
| LISTED AT 'LOCATION' FOR 'PRICE' |

DISPLAYING FIRST 3 RESULTS

FIG. 12

EDIT RESULT TRAINING FOR 'RUSTY'

NEED HELP TRAINING THIS RESULT? READ OUR TRAINING FAQ.

RUSTY

| DESCRIPTION |

TRAINED QUESTIONS (5), IRRELEVANT QUESTIONS (0), 83% TRAINED
UNTRAINED QUESTIONS (1), LEARNED (3)

IS THIS NAME FOR A
FEMALE, OR MALE DOG?
○ FEMALE
● MALE

HISTORY    FIX THIS

HOW MANY SYLLABLES
DO YOU WANT TO HAVE?
○ KEEP IT TO ONE
● NO MORE THAN 2
● MORE THAN 3 OK

HISTORY    FIX THIS

HOW MANY POUNDS
SHOULD THE DOG BE?
○ LESS THAN 10
● UP TO 50
● MORE THAN 50

HISTORY    FIX THIS

THIS DOG IS
● SOCIAL
○ SHY

HISTORY    FIX THIS

THIS DOG IS:
● CUTE
○ STRONG

HISTORY    FIX THIS

HOBBIES AND PETS:
WHAT'S THE BEST NAME FOR MY NEW PUPPY?

| #1 | #2 | #3 | WILD CARD | ALL RESULTS |

RUSTY

READ MORE URL:

REVISIONS HISTORY

SELECTED TOPICS

WHAT'S THE BEST DOG BREED FOR ME?
98 PLAYS

WHICH DOG TOY WOULD MY POOCH ENJOY?
123 PLAYS

WHAT'S THE BEST DOG FOOD FOR MY DOG?
45 PLAYS

WHICH WALKING SHOE SHOULD I WEAR?
8 PLAYS

WHICH US SUMMER CAMP WOULD MY CHILD ENJOY?
33 PLAYS

CANCEL    SAVE

VIEW VERSION OF "CANON REBEL T1i" (RESULT)

REVISION AS OF 08:30, 14 APR 2009
STAFF (DISCUSS | CONTRIBS)

RESULT NAME: CANON REBEL T1i

RESULT IMAGE: IMAGE

DESCRIPTION: DESCRIPTION

READ MORE URL: URL

REVISION AS OF 12:28, 27 MAR 2009
(REVERT TO THIS ONE)
JON (DISCUSS | CONTRIBS)

RESULT NAME: CANON REBEL T1i

RESULT IMAGE: IMAGE

DESCRIPTION: DESCRIPTION

READ MORE URL: URL

VIEW VERSION OF "RUSTY" (ATTRIBUTES)

REVISION AS OF 13:34, 26 SEPT 2008
(REVERT TO THIS ONE)
STAFF (DISCUSS | CONTRIBS)

NO MORE THAN 2

HOW MANY SYLLABLES DO YOU WANT THE NAME TO HAVE?

REVISION AS OF 13:26, 17 FEB 2009
KELLY (DISCUSS | CONTRIBS)

NO MORE THAN 2

3 OR MORE IS OK

HOW MANY SYLLABLES DO YOU WANT THE NAME TO HAVE?

FIG. 24

[WORKSHOP] WELCOME TO THE WORKSHOP:

2400

THIS IS WHERE USERS MAY FASHION NEWLY CREATED TOPICS. TRY THEM OUT, AND IMPROVE THEM BY ADDING AND EDITING RESULTS AND QUESTIONS. IF YOU THINK A TOPIC IS POLISHED AND REFINED, GIVE IT A THUMBS UP! GOOD TOPICS MAY BE PUBLISHED. THINK IT'S NO GOOD? THUMBS DOWN. ENOUGH THUMBS DOWN AND A TOPIC MAY BE DISCARDED

TOPICS | SUGGESTED TOPICS

FILTER: CATEGORY OR KEYWORD

| | | DATE | CONCEPT | COMPLETENESS |
|---|---|---|---|---|
| IMAGE | HOW SHOULD I TRAVEL ACROSS CANADA? | APR 4, 2009 STAFF EDIT | 0 OF 2 HELPFUL | 1 OF 1 HELPFUL |
| | CREATED BY 'USERNAME' – CONTRIBUTIONS BY 'OTHER USER NAMES' | | | |
| IMAGE | SHOULD I SHOP AT WALMART? | 2 DAYS AGO STAFF EDIT | 2 OF 3 HELPFUL | 2 OF 3 HELPFUL |
| | CREATED BY 'USERNAME' – CONTRIBUTIONS BY 'OTHER USER NAMES' | | | |

TEACH US ABOUT YOU

DO YOU WEAR YOUR WATCH ON YOUR RIGHT OR LEFT WRIST?

○ DON'T WEAR A WATCH
○ RIGHT
○ LEFT          SKIP THIS QUESTION

| ACTIVITY FEED | | |
|---|---|---|
| IMAGE | 'USERNAME' SAID YOUR PRO/CON FOR THE TOYOTA PRIUS WAS HELPFUL | 40 MINUTES AGO |
| IMAGE | 'USERNAME' ADDED 3 RESULTS IN 'WHICH MODERN FURNITURE SHOULD I BUY?' | AT 9:52 AM |
| YOU EARNED 1433 BANJOS IN WEEK ENDING 5/10/09 | | AT 12:07 AM |
| IMAGE | 'USERNAME' ADDED 2 RESULT IN 2 TOPICS | YESTERDAY |
| IMAGE | 'USERNAME' ADDED 2 RESULTS TO 3 QUESTIONS IN THE WORKSHOP | YESTERDAY |
| IMAGE | 'USERNAME' ADDED 1 RESULT AND 2 PRO/CONS IN 3 TOPICS | YESTERDAY |
| IMAGE | THE TOPIC 'HOW TO GET ORGAINIZED', CREATED BY 'USERNAME' WAS PROMOTED OUT OF THE WORKSHOP | YESTERDAY |

SEARCH: FIOS

2702

RESULTS FOR: WHAT ISP SHOULD I USE?
1. VERIZON FIOS – VERISON FIOS, WHICH STANDS FOR 'FIBER OPTIC SERVICE," IS AN INTERNET, TELEPHONE, AND TV SERVICE THAT IS PRESENTLY OFFEREC IN SOME AREAS OF THE U.S. BY VERIZON. VERIZON HAS ATTRACTED CONSUMER AND MEDIA ATTENTION IN THE AREA OF BROADBAND...
2. U-VERSE
3. COMCAST CABLE MODEM

SEE ALL RESULTS

2704

RESULTS FOR: WHAT US SATELLITE/CABLE SERVICE SHOULD I GET?
1. VERIZON FIOS – VERISON FIOS, IS A BUNDLED COMMUNICATIONS (INTERNET, TELEPHONE, AND TV) SERVICE, OPERATIONG OVER A FIBER-OPTIC COMMUNICATIONS NETWORK, THAT IS PRESENTLY OFFERED IN SOME AREAS OF THE U.S. BY VERIZON.  VERIZON HAS ATTRACTED CONSUMER AND MEDIA ATTENTION IN THE AREA...
2. TIME WARNER CABLE
3. CHARTER COMMUNICTIONS

SEE ALL RESULTS

FIG. 27

SEARCH: SUV

IMAGE | RESULTS FOR: WHAT NEW CAR SHOULD I BUY? > SUV
1. TOYOTA HIGHLANDER HYBRID 4WD – THE 2009 TOYOTA HIGHLANDER HYBRID IS AN IDEAL CHOICE FOR SHOPPERS WANTING A VEHICLE THAT OFFERS HIGH FUEL…
2. BMW X6 XDRIVE35I
3. LEXUS RX 400H 2WD

/ 2802

IMAGE | RESULTS FOR: WHICH BMW SHOULD I BUY? > SUV
1. BMW X5 XDRIVE30I – STARTING AT $47,500 MSRP 3.0-LITER, INLINE 6-CYLINDER ENGINE 260 HP XDRIVE, INTELLIGENT ALL-WHEEL-DRIVE 21 MPG HWY
2. BMW X5 XDRIVE48I
3. BMW X5 XDRIVE35D

/ 2804

IMAGE | RESULTS FOR: WHAT LATE MODEL USED CAR SHOULD I BUY? > SUV OR TRUCK
1. RANGE ROVER – THE RANGE ROVER IS A FOUR-WHEEL DRIVE LUXURY SPORT UTILITY VEHICLE (SUV) PRODUCED BY LAND ROVER IN THE UK, OWNED BY…
2. TOYOTA 4RUNNER
3. TOYOTA RAV4

/ 2808

IMAGE | RESULTS FOR: WHAT TIRES SHOULD I USE ON MY CAR OR TRUCK? > LIGHT TRUCK / SUV
1. PIRELLI SCORPION ICE & SNOW – WINTER'S ICE- AND SNOW-COVERED HIGHWAYS MAY REQUIRE MORE TRACTION THAN THE TYPICAL ALL-SEASON…
2. YOKOHAMA GEOLANDAR A/T-S
3. PIRELLI SCORPION ATR

/ 2810

SEE ALL RESULTS

FIG. 28

WHAT NEW CAR SHOULD I BUY?

IMAGE

WHICH ONE OF YOUR ANSWERS IS MOST IMPORTANT?

○ UNDER $18,000
○ SUV
○ PRACTICAL

SKIP THIS QUESTION

FIG. 29

| IMAGE | CORRELATIONS FOR GLENN BECK'S FOLLOWERS |

COMPARED TO ALL TWITTER USERS, PEOPLE WHO FOLLOW GLENBECK ARE: MUCH MORE LIKELY TO ANSWER....

| | | |
|---|---|---|
| DO YOU TEND TO SUPPORT LIBERAL OR CONSERVATIVE POLITICIANS? | WITH | CONSERVATIVE |
| WHEN IT COMES TO ABORTION, ARE YOU: | WITH | PRO LIFE |
| DO YOU THINK GLOBAL WARMING IS: | WITH | AN OVERBLOWN ISSUE |
| HOW DO YOU FEEL ABOUT THE WAR IN IRAQ? | WITH | THE U.S. IS DOING THE RIGHT THING |
| SHOULD GAY MARRAGE BE LEGAL? | WITH | CIVIL UNIONS YES, BUT MARRAGE NO CHANGING MORAL VALUES |
| DO YOU CONSIDER ONE OF THESE A PARTICULAR MORAL PROBLEM OF SOCIETY TODAY? | WITH | GOVERNMENT |
| WHICH OF THESE DO YOU FEEL WE HAVE TOO MUCH OF THESE DAYS: | WITH | WALL STREET JOURNAL |
| YOU'RE STAYING IN A HOTEL IN THE US WHICH OFFERES A COMPLIMENTARY PAPER EACH MORNING. WOULD YOU CHOOSE: | WITH | THEY SHOULD STAY. |
| DO YOU THINK STANDARDS SHOULD CHANGE FROM GENERATION TO GENERATION, OR STAY THE SAME? | WITH | YES, HE COMMITTED A CRIME |
| DO YOU THINK BILL CLINTON SHOUL HAVE BEEN IMPEACHED? | WITH | YES |
| DO YOU CONSIDER YOURSELF A PARTICULARLY RELIGIOUS PERSON? | WITH | YES |
| DO YOU BELIEVE THAT RACIAL PROFILING HELPS KEEP AIRPORTS AND AIRPLANES SAFER? | WITH | |

FIG. 30

CORRELATIONS FOR MARTHA STEWART'S FOLLOWERS

IMAGE

COMPARED TO ALL TWITTER USERS, PEOPLE WHO FOLLOW MARTHA STEWART ARE: SOMEWHAT MORE LIKELY TO ANSWER....

| Question | | Answer |
|---|---|---|
| THESE ARE THE BATHROOM SIGNS AT THE SCIENC FICTION MUSEUM IN SEATTLE. WHICH DOOR WOULD YOU ENTER? | WITH | IMAGE |
| HOW FREQUENTLY DO YOU WEAR MAKEUP? | WITH | EVERY DAY |
| DOES CELEBRITY GOSSIP INTEREST YOU? | WITH | YES |
| DO YOU CARRY ANYTHING IN YOUR POCKETS? | WITH | NOTHING. THAT WOULD SPOIL THE LINE IN MY CLOTHING. |
| ARE YOU MALE OR FEMALE? | WITH | FEMALE |

COMPARED TO ALL TWITTER USERS, PEOPLE WHO FOLLOW MARTHA STEWART ARE: SOMEWHAT MORE LIKELY TO ANSWER....

| Question | | Answer |
|---|---|---|
| WHICH WALLET IS CLOSEST TO YOURS? | WITH | IMAGE |
| WHEN WAS THE LAST TIME YOU HAD A MANICURE? | WITH | WITHIN THE LAST YEAR |
| DO YOU EVER WEAR USED OR VINTAGE CLOTHES? | WITH | I'M WEARING VINTAGE RIGHT NOW! |
| SINCE BECOMING AN ADULT, HAVE YOU EVER HAND-CRAFTED A GIFT FOR SOMEONE? | WITH | YES, I ROUTINELY MAKE... |
| WHO DO YOU FIND THE MOST ATTRACTIVE? | WITH | IMAGE |

FIG. 31

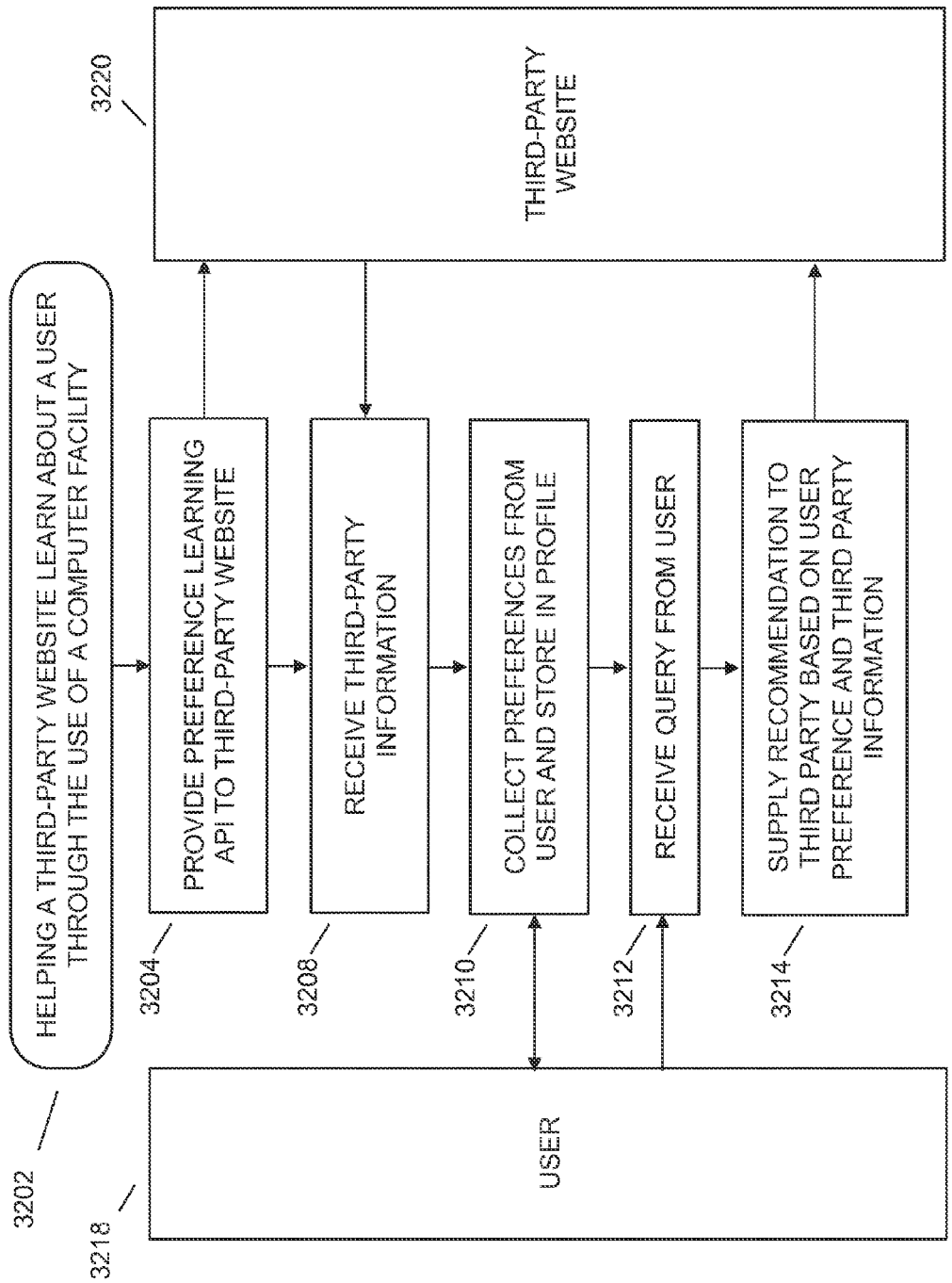

INFERRING USER PREFERENCES FROM AN INTERNET BASED SOCIAL INTERACTIVE CONSTRUCT

CROSS-REFERENCE TO RELATED APPLICATIONS

This application is a continuation of U.S. patent application Ser. No. 13/945,274, filed Jul. 18, 2013, which is a continuation of U.S. patent application Ser. No. 12/813,715, filed Jun. 11, 2010, issued as U.S. Pat. No. 8,494,978, and claims the benefit of the following provisional applications, each of which is hereby incorporated by reference their entirety: U.S. Provisional App. No. U.S. 61/233,326 filed Aug. 12, 2009 and U.S. Provisional App. No. U.S. 61/300, 511 filed Feb. 2, 2010.

U.S. patent application Ser. No. 12/813,715 filed Jun. 11, 2010 is a continuation-in-part of U.S. application Ser. No. 12/483,768 filed Jun. 12, 2009, which claims the benefit of U.S. Provisional Appl. No. U.S. 61/097,394 filed Sep. 16, 2008, each of which is incorporated by reference in its entirety.

The Ser. No. 12/483,768 application is a continuation-in-part of the following U.S. patent applications, each of which is incorporated by reference in its entirety: U.S. application Ser. No. 12/262,862 filed Oct. 31, 2008 which claims the benefit of following applications, U.S. Provisional Appl. No. 60/984,948 filed Nov. 2, 2007 and U.S. Provisional Appl. No. 61/060,226 filed Jun. 10, 2008, and U.S. App No. 61/097,394 filed Sep. 16, 2008.

BACKGROUND

1. Field

The present invention is related to collective knowledge systems, and more specifically to providing natural language computer-based topical advice based on machine learning through user interaction.

2. Description of the Related Art

Online searching for topical advice represents a significant use of computer resources such as provided through the Internet. Computer users may currently employ a variety of search tools to search for advice on specific topics, but to do so may require expertise in the use of search engines, and may produce voluminous search results that take time to sift through, interpret, and compare. People may be accustomed to asking other people for advice in spoken natural language, and therefore it may be useful to have a computer-based advice tool that mimics more closely how people interact with each other. In addition, advice on topics may change in time, and any static database of advice may fall quickly out of date. Therefore, a need exists for improved topical advice search capabilities adapted for use with natural language, and that provides for continuous content refinement.

SUMMARY

The present invention may consist of a computing facility, such as a machine learning facility, that may ask a user questions, and based on the user's answers the system may offer a decision, such as a recommendation, a diagnosis, a conclusion, advice, and the like. Internally, the system may use machine learning to optimize which questions to ask and what decision to make at the end of the question and answer dialog. The system may learn through users providing feedback on the provided decision, including deciding whether the decision was helpful or not. Helpful decisions may become reinforced and become associated with the questions and answers that were asked along the way. When a user indicates that a decision was helpful, the system may remember which questions it asked, what the answer to each question was, and may associate these questions and answers with the ultimate decision. In embodiments, these associations may be the basis of the machine learning that may learn over time which question to ask the next time a user comes to the system.

In embodiments, the present invention may help a user make a decision through the use of a machine learning facility. The process may begin with an initial question being received by the machine learning facility from the user. The initial question may be received via a search interface, where the ultimate decision is based on the initial search terms, the dialog of questions and answers with the user, the training in the system, and the like. The user may then be provided with a dialog consisting of questions from the machine learning facility and answers provided by the user. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user.

In embodiments, the initial question posed to the user may be an objective question, a subjective question, and the like. A question may be provided from amongst abroad category of topics, such as topics pertaining to a product, personal information, personal health, economic health, business, politics, education, entertainment, the environment, and the like. The question may be in the form of a multiple choice question, a yes-no question, a rating, a choice of images, a personal question, and the like. The question may be about the user, provided by another user, provided by an expert, and the like. The question may be based on a previous answer, such as from the current dialog with the user, from a stored previous dialog with the user, from a stored previous dialog with another user. The question may be a pseudo random question, such as a test question, an exploration question that helps select a pseudo random decision on the chance that the pseudo random decision turns out to be useful, and the like. The question may include at least one image as part of the question. The question may be along psychographic dimensions. In embodiments, the question may not be asked directly to the user, but rather determined from contextual information, such as through an IP address, the location of the user, the weather at the user's location, a domain name, related to path information, related to a recent download, related to a recent network access, related to a recent file access, and the like.

In embodiments, the dialog may continue until the machine learning facility develops a high confidence in a reduced set of decisions, such as a reduced set of decisions presented to the user, a single decision presented to the user. The decision provided by the machine learning facility may be independent of the order of questions in the dialog. The decision may provide an alternate decision when at least one question in the dialog is omitted, where the alternate decision may be different based on the machine learning facility having less information from the user. The decision may display a ranking of decision choices, such as ranking decisions across non-traditional feature dimensions. The decision may display at least one image related to the decision. The decision may be a pseudo random decision on the chance that the pseudo random decision turns out to be useful, such as the pseudo random decision being part of a system of exploration, where the system of exploration may improve the effectiveness of the system, the machine learning facility may learn from exploration, and the like.

In embodiments, the feedback provided may be related to, or derived from, how the user answers questions in the dialog, how the user responds to the decision provided by the machine learning facility, and the like. In embodiments, the feedback may be solicited from the user.

In embodiments, users may extend the learning of the machine learning facility by entering new information, where the new information may be their own topic, question, answer, decision, and the like. The machine learning facility may use the new information to determine whether the new information is helpful to users.

In embodiments, expert users may extend the learning of the computational facility by entering new information, where the new information may be their own topic, question, answer, decision, and the like. An expert user entering a new question, answer, or decision may specify how the system should rank the decisions when future users give particular answers to the question. The expert user may also specify pre-conditions/dependencies on when the new question should be asked. The expert user may also optionally enter an importance for the question.

In embodiments, the system may be implemented as a series of dynamic decision trees. During the question and answer dialog with the user, the system may be looking at which questions are relevant to ask given the answers the user has already provided. When users enter new questions, answers, or decisions they may specify which questions are relevant to which decisions and how the answers affect the relative ranking of the various decisions.

In embodiments, the system may recommend a decision based on multiple independent factors, such as how well a decision matches the objective requirements specified by the user during the question and answer dialog and how well the decision matches the user's subjective requirements such as the user's taste preferences.

In embodiments, a user interface may be provided for user interaction with the machine learning facility, such as associated with a web interface, instant messaging, a voice interface, a cell phone, with SMS, and the like.

In embodiments, the present invention may help a user make a decision through the use of a machine learning facility. The process may begin with an initial question being received by the machine learning facility from the user, where the initial question may be associated with one of a broad category of topics, such as product, personal, health, business, political, educational, entertainment, environment, and the like. The user may then be provided with a dialog consisting of questions from the machine learning facility and answers provided by the user. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user.

In embodiments, the present invention may help a user make a decision through the use of a computing facility. The process may begin with an initial question being received by the computing facility from the user. The user may then be provided with a dialog consisting of questions from the computing facility and answers provided by the user. The computing facility may then provide a decision to the user based on an aggregated feedback from a plurality of users. In embodiments, the computer facility may improve future questions and decisions provided by the computing facility based on receiving feedback from the user.

In embodiments, the present invention may help a user make a decision through the use of a machine learning facility. The process may begin with an initial question being received by the machine learning facility from the user. The user may then be provided with a dialog consisting of questions from the machine learning facility and answers provided by the user, where the number of questions and answers provided through the dialog may determine the quality of the decision. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user. In embodiments, the quality may be high when the number of questions and answers large, such as greater than 10 questions, greater than 15 questions, greater than 10 questions, and the like. In embodiments, the quality may be good quality when the number of questions and answers is small, such as less than 10 questions, less than 5 questions, less than 3 questions, one question, and the like.

In embodiments, the present invention may make a decision through the use of a machine learning facility. The system may include a machine learning facility that may receive an initial question from the user, a dialog facility within the machine learning facility providing the user with questions and accepting answers from the user, the machine learning facility providing a decision to the user, and the like. In embodiments, the decision provided to the user may be based on the exchange between the user and the machine learning facility, and pertain to the initial question. Further, the machine learning facility may receive feedback from the user to improve future questions and decisions provided by the machine learning facility.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 9 depicts choices that a user may contribute expertise.

FIGS. 11 and 11A depict an embodiment of an answer format.

FIG. 12 depicts an example list of all decisions in a topic.

FIG. 19 depicts an embodiment interface for users to set associations between attributes and decision results.

FIG. 20 depicts an embodiment illustrating how a user may edit a decision result.

FIG. 21 depicts an embodiment showing prior revisions to content and changes between two prior revisions.

FIG. 23 depicts an embodiment showing the revision history for attributes.

FIG. 24 depicts an embodiment of a workshop interface where newly added areas of advice may be displayed.

FIG. 25 depicts an embodiment where the system is asking the user a subjective question in order to learn the preferences of the user.

FIG. 26 depicts an embodiment showing an activity feed of recent activity by contributors.

FIG. 27 depicts an embodiment showing results based on multiple dimensions.

FIG. 28 depicts an embodiment showing multiple question and answer results in response to a user's unstructured input.

FIG. 29 depicts an embodiment showing an example question to the user, asking for their preference.

FIG. 30 depicts a similarity profile of the news personality Glenn Beck as determined in embodiments of the present invention.

FIG. 31 depicts a similarity profile of the personality Martha Steward as determined in embodiments of the present invention.

FIG. 32 depicts an embodiment for using a third-party API to help learn about a user.

Figure 1:
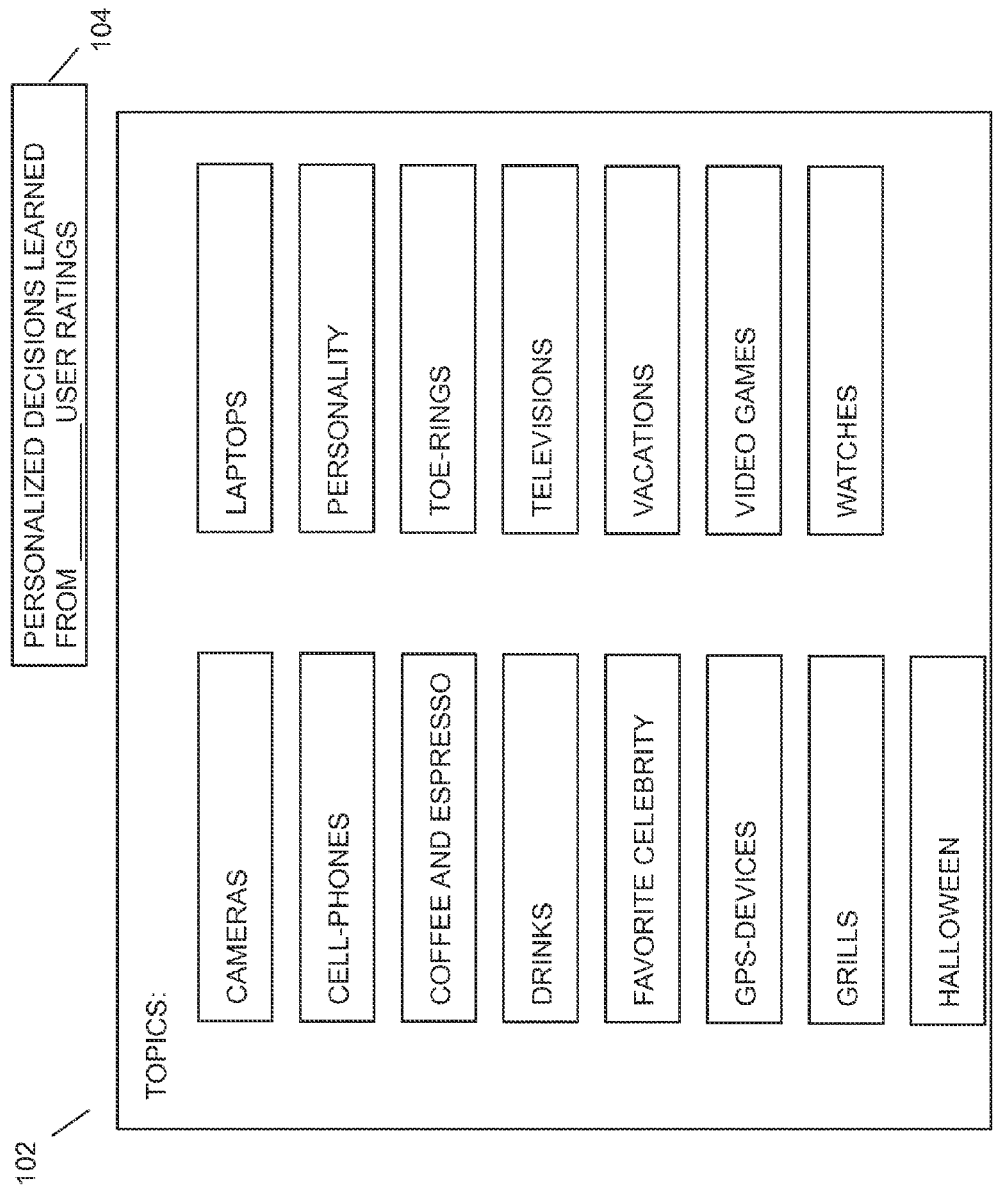
FIG. 1 depicts a list of topics in the system from which users may get decisions.

While the invention has been described in connection with certain preferred embodiments, other embodiments would be understood by one of ordinary skill in the art and are encompassed herein.

All documents referenced herein are hereby incorporated by reference.

DETAILED DESCRIPTION

The present invention may ask the user 1314 questions 1320 and based on the user's answers the system may offer a decision, such as a recommendation, a diagnosis, a conclusion, advice, and the like. Internally, the system may use machine learning to optimize which questions 1320 to ask and what decision 1310 to make at the end of the process. The system may learn through users giving feedback on the ultimate decision, whether the decision 1310 was helpful or not. Helpful solutions may get reinforced and associated with the questions 1320 and answers 1322 that were asked along the way. When a user 1314 says that a decision 1310 was helpful the system may remember which questions 1320 it asked, what the answer 1322 to each question 1320 was, and may associate these questions 1320 and answers 1322 with the ultimate decision. These associations may be the basis of the machine learning that learns over time which question 1320 to ask the next time a user 1314 comes to the system.

For example a user 1314 may try to get advice picking a bar to visit. The system may ask the question "How old are you?" and get the answer "in my 30s". Ultimately, the system may show the user 1314 the decision "Kelley's Irish Bar". Assume the user 1314 says this decision was helpful. The system will increase the association between the question "How old are you?", the answer "in my 30s" and the decision "Kelley's Irish Bar". The next time a user 1314 comes to the site looking for advice on a bar, the system will be more likely to ask the user 1314 the "How old are you?" question 1320 since in the past this question 1320 was useful in helping the user. If the user 1314 answers the question 1320 in the same way as the prior user 1314 (saying "in my 30s") then the system will increase its belief that the ultimate decision is "Kelley's Irish Pub".

The system may build a profile of each user's tastes, aesthetic preferences, etc. and learn via feedback which decisions 1310 are liked by which types of people. Alternatively, an expert user may specify which kinds of decisions 1310 are liked by which kinds of people. Learning user's taste profiles may happen through a separate process from the dialog of questions 1320 and answers 1322 asked by the system in a specific topic. For example, a user 1314 may separately tell the system about their taste choices through a different question and answer dialog designed specifically to understand the user's aesthetic preferences.

A user 1314 may not want to spend the time to teach the system about all of their taste preferences, and so instead the system may learn, or an expert may specify, which of all the taste questions 1320 are the most important taste questions to ask in the context of the user 1314 making one specific decision 1310. Out of the universe of all questions the system may know about finding out about taste profiles, for instance the system may have learned there are three specific questions 1310 that are best for when the user 1314 is trying to find a sedan under $25,000. Alternately, there may be a completely different set of three taste questions to ask a user 1314 who is interested in a SUV over $45,000.

A user 1314 may also only tell the system about their taste preferences and not about any objective questions. In this case the system may provide a ranking of all the decisions 1310 in an area of advice based purely on taste. So instead of the user 1314 saying they want a $200 point-and-shoot camera, effectively what the user 1314 would be doing is saying they want a camera that other urban 35 year old men who prefer computers to sports want. Users 1314 may indicate this preference by using a search interface and choosing an area of advice that is explicitly labeled "cameras for urban men in their 30s" instead of the "which camera should buy" area of advice. Alternatively, users 1314 may indicate their interest in making a decision 1310 about cameras and then opt to not answer any of the questions in the Q&A dialog from the system and thus the system will only have subjective information about the user 1314 to use in recommending cameras to the user 1314. Alternatively, users 1314 may answer questions 1320 in the dialog that are both objective and subjective and the system may then recommend a camera based on the combined objective data about the camera and subjective data about the camera.

Users may also enter new questions, answers, and ultimate decisions. The system may then try out the new questions 1320 with future users to see if the questions 1320 turn out to be useful in helping those users. For example, a user 1314 of the bar recommendation service may contribute the question "Do you want a loud place or a quiet intimate setting?". The system may decide to ask this question 1320 in a future use of the bar recommendation service and through the process outlined above observe a correlation between the answers of this question 1320 and recommendations that users find useful. On the other hand, a user 1314 may contribute a question 1320 that has no value in helping users. For example, a user 1314 could contribute the question "Do you have a Canon camera?". The system may try this question 1320 out on future users and fail to notice any correlation between the answers to this question 1320 and bar recommendations that users find helpful. In this case, the question 1320 may get asked less since it's not predictive of whether one recommendation or another recommendation is helpful.

The system may keep asking questions 1320 until it feels it has a high confidence in a few possible decisions. The system may also stop sooner if it feels like it has already asked too many questions 1320 and risks annoying the user. The system may also ask at least a minimum number of questions 1320 to avoid the user 1314 feeling that the system couldn't possibly have asked enough to make an intelligent decision.

The system may have a mechanism to tolerate incorrect answers from the user. Incorrect answers may result from the user 1314 not understanding the question, not understanding the answer 1322 or not knowing the answer 1322 to the question. If the bulk of the answers given by the user 1314 support a particular decision, the system may make that decision 1310 even though not all the user's answers support that decision.

In embodiments, the present invention may provide for at least one of questions 1320 and answers 1322 between the system and the user, decisions to users, and machine learning utilized to improve decisions. The system may provide for an improved way to generate questions 1320 and answers 1322, an improved way to provide decisions to users, an improved way to utilize machine learning to improve questions 1320 and decisions provided by a system, and the like, where any of these capabilities may be separately, or in combination, used as a standalone system or incorporated into a third party system as an improved capability. In embodiments, each of these improved capabilities may utilize some form of machine learning as described herein. For example, the system may provide for an improved way to execute a question 1320 and answer 1322 session with a user 1314 by learning under what circumstances the user 1314 is looking for certain information. For instance, it may be learned by the system that the weather is a condition under which users have a differentiated preference depending on the time of day and the weather conditions. When it's raining during the day, and a user 1314 searches for movies, the user 1314 may be more likely to be looking for movie tickets and locations where the movie is playing. When it's raining during the night, and the user 1314 searches for movies, the user 1314 may be more likely to be looking for a description of the movie. In another example, the system may provide for an improved way to provide decisions to users, such as learning that users prefer certain formats during the daytime versus during the evening, providing choices verses a single decision 1310 based on age, prefer a greater number of questions 1320 prior to presentation of the decision 1310 based on the user's geographic location, and the like. In another example, the system may provide for an improved way to learn what decision 1310 to choose for a user, such as utilizing greater expert information based on age and education, utilizing popular opinion more when the topic is fashion and the user 1314 is young versus utilizing traditional practice more when the user 1314 is older, asking more questions 1320 about the user's choices in friends when the topic is personal, and the like.

In embodiments, the present invention may provide for combinations of question 1320 and answer, providing decisions, and learning what decisions to provide, where one of the elements may not be provided by the system, such as when that element is provided by a third party system. For example, a third party search engine web application may what to improve their capabilities for providing sorted lists from a user's search query, and so may want to utilize the present invention's facility for generating questions 1320 and answers 1322 to augment their keyword search and sort algorithms. In this instance, the third party search engine provider may not be interested in the present invention's facility for generating decisions, because their service is in the business of providing sorted lists, not a limited set of decisions. However, the present invention may provide an important new capability to the search engine provider, in that the present invention's ability to constantly improve the questions 1320 and answers 1322 to users may enable the search engine provider to improve their sorting result to users based on the present inventions capabilities.

In embodiments, the subject of the initial area of advice may be specified through a search interface. For example, a user 1314 searching for "romantic honeymoons in Italy" may get taken to a web page that helps the user 1314 decide where to honeymoon in Italy instead of first asking the user questions about where they want to vacation, what type of vacation they were looking for etc. Or a user 1314 could search for a specific location in Italy and be directed to a web page on that 1) helps the user 1314 decide if that specific location is a good one for their needs (for example, showing things like "this vacation is good for honeymooners and romantic getaways and bad for family vacations") and 2) offers to start a dialog to help the user 1314 find alternative and potentially better locations in Italy to vacation. Or a user 1314 could be searching for specific products and then enter into a dialog to narrow down which of those products are best for them. In both cases #1 and #2 the information shown may be based how other users have answered questions in decision making dialogs and then given positive feedback to this decision. So if many people using the "where should I go on vacation" topic answered a question "do you want a romantic vacation" with "yes" and then gave positive feedback to "Italy" the system would display that Italy is a romantic destination to users 1314 coming in via search engines. Alternatively, the users 1314 who added the decision "Italy" or the question "do you want a romantic vacation" into the system could have explicitly indicated that the answer "yes" to the question "do you want a romantic vacation" should be associated with Italy and thus show that Italy is a romantic vacation to users 1314 coming in via search engines.

In embodiments, the present invention may provide other combinations of some subset of asking questions, making decisions, and learning to make better decisions, such as using the present invention's facilities for making better decisions, but only using input from experts; not providing a question 1320 and answer 1322 session for a particular user, but rather utilize previous user 1314 interactions with the system to provide decisions; asking questions 1320 and answers 1322 to a user 1314 to allow the system to learn in association with future decisions, but providing rewards to the user 1314 rather than decisions; asking question 1320 and answers and making a decision 1310 without any learning, such as simply filtering down results; utilizing the present invention's ability to learn how to make a better decision, but providing that capability to an expert system rather than to users through a question 1320 and answer 1322 interface; and the like. In embodiments, the system may provide for all the elements of a question 1320 and answer 1322 user 1314 session, providing decisions to the user, and learning how to improve decisions.

In embodiments, a user 1314 entering a question 1320 may optionally specify dependencies and importances for the question. Dependencies may control when the question can be asked. Importances may specify relative importances between different questions 1320 for weighing a user's 1314 answers. If the system has to make trade-offs because no one decision 1310 result matches all of the answers 1322 specified by a user 1314, the system may try to recommend decision results that match high importance questions over lower importance questions. The system may also prioritize asking high importance questions over low importance questions. For example, a user 1314 entering a new question like "Where in the United States do you want to vacation" set a dependency that requires an existing question such as "Where in the world do you want to go" to have been answered with "The United States" before the new question "Where in the United States do you want to vacation" can be asked.

In embodiments, the present invention may provide for a system with a user 1314 interface through which the user 1314 may interact with the facilities of the system. The system may include several parts, some of which may be the website, the supervisor, and a collection of widgets. Widgets may be collections of code that collect, process, and render a single piece of content on the website. The website may consist of interfaces for end-users, staff members, and registered users to get decisions, edit the decisions, and view reports on system performance. The supervisor may be a container for running widgets so that a widget can perform time-consuming data collection and processing ahead of user 1314 requests to render that content.

For example, a widget might collect videos about decisions from the internet. The widget, in the supervisor, might crawl the web looking for videos about each decision 1310 and store videos it finds in a database. When the user 1314 comes to the website and gets a particular decision, the website may ask the video widget to render itself and display any videos it has previously found.

A plurality of instances of the supervisor may be running on multiple computers in order to scale up the widget's processing. Each widget may be running on its own computer. Similarly, many computers may be providing interfaces to the system through web-servers, instant messaging, voice gateways, email, programmatic APIs, via being embedded in third party websites, and the like.

In embodiments, attributes may be combinations of a question 1320 and one particular answer 1322 to that question. For example, if a question 1320 was "How old are you?" and the answers to that question 1320 were "under 18", "20-30" and "over 30", then an attribute would be "How old are you? Under 18". The system may work by learning the relationship between attributes and decisions. When the system asks a question 1320 and the user 1314 gives an answer 1322 then the system may take that attribute and see which decisions are associated with it.

In embodiments, the system may understand that some attributes represent continuous values white others represent discrete values. When using continuous attributes, the system may be able to make more intelligent tradeoffs such as understanding that it is frequently acceptable to recommend a product that costs less than the user 1314 asked for but rarely acceptable to offer a product that costs more than the user 1314 asked for.

In embodiments, the relationships between attributes and decisions may be learned from users, explicitly given to the system or some combination of the two, and the like. For example, a price attribute of "How much do you want to spend? Under $200" might be explicitly linked to cameras that fall into that price range based on data from experts, ecommerce sites/APIs, etc. The relationship between the attribute "How will you use the camera? On vacations" and possible vacation destinations might be fully learned however.

When entering new questions 1320, answers 1322, and results the user 1314 may optionally specify the relationships between attributes and decision results. For example, if a user 1314 were to enter the question "how much do you want to spend?" in the "which camera should I buy" topic, the user 1314 may also specify to the system that the answer "under $200" should be associated with cameras X and Y but not camera Z. Then, if a future user were to use the "which camera should I buy" topic and were to answer the "how much do you want to spend" question with the answer "under $200" that user 1314 may have a higher chance of being recommended camera X and Y over camera Z.

After seeking advice from the system and receiving a decision result, a user 1314 may also be given reasons from the system as to why that particular decision result was recommended. This explanation may also allow the user 1314 to change the attributes for the decision result if the user 1314 believes that the decision result was recommended in error by the system.

In general, the relationships learned may involve training from users, experts, employees, automated data feeds from third parties, or some combination.

In embodiments, there may be various ways that the system can recommend a solution and select the next question 1320 to ask the user. Possible machine learning systems may be geometric systems like nearest neighbors and support vector machines, probabilistic systems, evolutionary systems like genetic algorithms, decision trees, neural networks, associated with decision trees, Bayesian inference, random forests, boosting, logistic regression, faceted navigation, query refinement, query expansion, singular value decomposition and the like. These systems may be based around learning from complete game plays (e.g., all attributes given by a user 1314 before getting a decision), the answers to individual questions/subsets of game plays, only positive feedbacks, only negative feedbacks or some combination of the two. Additionally, the system may take into account previous interactions the user 1314 had such as remembering previously answered questions, decisions that the user 1314 liked or did not like, which areas of advice the user 1314 previously sought advice in, etc. Additionally, the system may take into account factors that are implicitly provided by the user 1314 such as time of day and date the user 1314 used the system, the user's IP address, client type (e.g., Firefox, IE, cell phone, SMS, and the like), and other such data.

In embodiments, the present invention may provide for a machine learning system that goes well beyond the capabilities of collaborative filtering, such as through explicitly asking questions 1320 instead of implicitly learning based on a user's behavior, which may be much more powerful since the system is not left trying to infer the user's intent, mood, etc. Also, choosing the questions 1320 to ask the user 1314 based on what they've already answered may allow the present invention to zero in on nuances that would otherwise be missed. The present invention may have the ability to explain decisions, such as providing decisions beyond simple extrapolations form past behavior such as in, 'other people who bought X, Y and Z also liked product A'. Instead, the present invention may be able to say the user 1314 should 'do A because the user 1314 said they wanted X, liked Y and believed Z'. In addition, the present invention may allow users to contribute new questions 1320 that may be useful, and then automatically learn under which contexts, if any, the question 1320 is helpful. In another area of difference, the present invention's machine learning technology may be able to provide decisions in a great variety of user 1314 interest areas, where collaborative filtering has difficulties being applied to non-product/media applications. For instance, collaborative filtering would not be easily applied to helping a user 1314 make a decision 1310 on a highly personal topic, such as whether they should get a tattoo, or a rare question 1320 such as whether a particular expense can be deducted on the user's tax return. The present invention may be capable of such applications. In embodiments, the present invention may be able to use pre-programmed expert advice inter-mixed with advice learned from a group of users to make decisions to users.

In embodiments, the system may have a wiki web interface for editing all of the data on the system. The web interface may be used to edit/create/delete questions, answers, attributes, and solutions. Each solution may also have a variety of information associated with it, which may be shown on the decision page when that solution is recommended. For example, when recommending a vacation in Cancun the recommendation page might show videos about Cancun. All of this ancillary data about the solution may also be editable through the wiki.

In embodiments, the wiki may be used to edit data collected by widgets running in the supervisor. This may allow the widgets to collect data ahead of time and then have a human quality assurance process to review and change the collected data.

In embodiments, the system may maintain a history of all changes made by either the widgets or humans. For example, one use of this history may be to review the work done by hired contractors doing content quality assurance. Another use of this history may be making sure that the widgets do not undo work done by humans. For example, if the widgets collect a particular video and a human deletes that video because it is inappropriate, then the widget can use the history to not re-add that video again sometime in the future. Finally, if data is corrupted or incorrectly deleted the history may allow a means of recovery.

In embodiments, when widgets find new content they may queue tasks to a human workflow for validating and editing that content.

In embodiments, in order to learn, the system may sometimes make random or semi-random decisions in hopes of recommending something that the system wouldn't have expected to be useful, but which may turn out to be useful. If the system wants to use what it has already learned, then it may not make random choices in which questions 1320 it asks and which decision 1310 it makes. There may be a tradeoff between using what is already known, also referred to as exploitation, and potentially learning something new, also referred to as exploration. Exploitation may lead to a more satisfied user, while exploration may make the system smarter.

In embodiments, one way to make this trade-off when selecting questions 1320 to ask the user 1314 may be to ask questions 1320 that the system is confident are useful in making a decision 1310 and then picking a few random questions 1320 to ask. Another way to make the trade-off may be to have a fixed budget in every user 1314 interaction where a fixed set of questions 1320 are based on exploitation and the next set are based on exploration.

In embodiments, decisions may also be explored or exploited. If the system wants to learn, it may show a random decision. Instead of showing a purely random decision, the system may also show a decision 1310 that meets some requirements specified by the user 1314 and is purely exploring within the remaining requirements. For example, instead of picking a random camera to show the user 1314 the system could pick a random camera that meets the user's price requirements. This may result in more efficient training since the system may be less likely to show a decision 1310 that has no chance of meeting the user's needs. Rather than showing a random decision 1310 when exploring, the system may also show both the exploited decision 1310 and an explored solution and get feedback on each separately from the user. Alternatively, the system could inject a limited amount of randomness and pick a decision "like" what the system's best guess is. For example, the system may predict that the user 1314 will like one particular camera but could instead recommend another similar but not identical camera in order to balance making a reasonable decision 1310 and still learning new information from the user. In embodiments, the system may identify to the user 1314 when it is asking questions 1320 or making decisions through exploration vs. exploitation, or it may not.

In embodiments, the system may be viewed as surveying users about the various things it is recommending. For example, the system may ask the user 10 questions 1320 about the Canon SD1000 camera. This may provide a rich set of data about each camera allowing the system to start building lists of what kind of user 1314 is likely to like this camera. The system may build a ranked list of decisions for each attribute, such as from most likely to be liked to least likely to be liked, given that attribute. For example, the system may build a list of cameras in order likely to be liked by people who say "How old are you? Over 50". This may be shown by the system as the top 10 cameras for users over 50. Numerous of these top 10 lists may be constructed based on the system's data. These lists may also be combined to form new lists. For example, given the ranked lists of cameras for the attribute "How old are you? Over 50" and another list for the attribute "Why are you buying a camera? Travel", the system may construct a new ranked list of cameras for the "Over 50 year old users who want a travel camera". These combinations of top lists may be pre-generated, generated on-demand by incrementally asking the user 1314 to select new top lists, and the like.

In embodiments, these "top lists" may be used for a variety of purposes. Some users may not want to answer a series of questions 1320 before receiving a decision. Instead, they may be able to browse through these lists and find a relevant decision. The system may have a large number of top lists, such as thousands or tens of thousands, each of which may have their own web page. In addition, these pages may contain a large amount of content that may be indexed by search engines and bring users to the system's website. Alternatively, users 1314 may use a search interface in the system itself to find the area of advice they want a decision in. Various top lists may be used to short-cut the dialog by implicitly answering some of the questions 1320 in the dialog based on the toplist. For example, there could be an area of advice called "vacations" and a top list called "romantic honeymoon vacations in Italy" that servers as a short cut or gateway into the "vacations" topic with several questions 1320 from the "vacations" dialog already answered: "Where do you want to go? Europe", "Where in Europe do you want to go? Italy", "Are you traveling on a special occasion? Yes", "What is the special occasion? honeymoon". This may serve as an alternate interface for the user 1314 to seek advice through a traditional search interface without engaging in a question and answer dialog.

In embodiments, various pages on the site may have self-contained displays of information called widgets. For example, the decision pages may have a widget that shows how other people who liked this question 1320 answered various questions, videos/pictures about the decision, links to other web sites that have information about the decision, personalized pros and cons of this decision 1310 based on how the user 1314 answered questions, lists of other decisions that a similar, lists of other decisions that would have been made had questions 1320 been answered differently, lists of awards/honors for this decision (such as Consume Reports recommended), and the like.

In embodiments, the system may allow users to navigate through the universe of decisions (e.g., cameras, vacation destinations, etc.) along dimensions that are not commonly available. For example, instead of being shown a camera and only letting the user 1314 say "show me more/less expensive cameras" the system may let the user 1314 say "show me cameras that are more liked by young people", "show me a camera that is better for travel and less stylish", and the like. Dimensions like "style", "good for travel", "bad for young people", and the like, may be generated as a side-effect by asking users questions 1320 and then learning what is a good decision 1310 given those answers.

In embodiments, navigating along alternative dimensions may be used as a starting point for the user 1314, instead of the user 1314 selecting an area to seek advice in and then engaging in a dialog. The user 1314 may start interacting with the system by using a search interface or an external search engine to search for a specific decision result, such as a product name or travel destination. The system would then show the user information about that specific decision result and allow the user 1314 to navigate to other decision results, engage in a dialog to refine what the user 1314 is looking for, or show the user 1314 information that the system has learned (through machine learning, expert advice or some combination) about this specific decision result. For example, a user 1314 may use a search interface to navigate to a web page showing information on a Canon SD1100 camera. The system may show other cameras that people looking for a Canon SD1100 also like, allow the user 1314 to find similar cameras along non-traditional feature dimensions such as a camera that is better for taking pictures of sporting events, as well as show what the system knows about the Canon S1100 such as "great for travel", "not good for people learning photography", "Available for under $200", "Preferred by people who are consider themselves design conscious", and the like.

In embodiments, another possible interface may be to show users a list of decisions and display a simple explanation for why each decision 1310 is being made. For example, when recommending cameras the system may show three cameras and say that one is "cheaper", one has "longer zoom" and the other is "better for travel". This may help the user 1314 see alternatives that they may not have otherwise seen based on how they answered the questions 1320 leading up to the decision 1310.

In embodiments, users may be asked different types of questions, such as questions 1320 about the item being recommended (price, color, etc.), questions 1320 about themselves, and the like. The system may differentiate users along dimensions, such as psychographic dimensions, demographic dimensions, and the like. Properties of users that may be predictive may include the user's age, sex, marital status, whether they live in rural/urban areas, frequencies of church attendance, political affiliation, aesthetic preferences, sense of irony/sense of humor, socio-economic background, taste, preference for neat or disorganized lifestyle, degree to which they plan ahead of time, and the like.

In embodiments, it may be difficult to directly ask questions 1320 and instead the system may try to measure things that are correlated instead. For example, instead of asking about income, the system might ask where the user 1314 prefers to shop (e.g., Wal-Mart, Target, Saks, etc.). Aesthetics may be determined via showing pictures of art, living rooms, clothes, and the like, and asking which style the user 1314 prefers. In embodiments, pictures may take the place of the question (and the answers may be about how you react to the picture) or the picture can take the place of answers to questions 1320 such as "Which of the following best resembles the clothes you like to wear".

In embodiments, the system may group questions 1320 by whether they are about the item being recommended or about the user. The system may explain what type of questions 1320 it is asking in order to help the user 1314 understand the value of otherwise surprising and potentially offensive questions 1320 being asked. The system may also display other types of messages to the user 1314 while asking questions, such as telling the user 1314 how many questions 1320 remain, taunting the user 1314 by saying the system can already guess what decision 1310 to make, and the like.

In embodiments, instant messenger (IM) systems may provide a natural interface to the question 1320 and answer 1322 dialog of the system. For example, a user 1314 may invite our system to their "buddy list" and then initiate a dialog to get a decision 1310 over IM. The system may IM the first question 1320 to the user, the user 1314 may then IM their answer 1322 back, and the like, until eventually the system IM'ed the user 1314 a link to the decision, or directly IM'ed the name of the decision 1310 to the user. In embodiments, other forms of communications may also be used, such as cell phones, SMS, email, and the like.

In embodiments, the system, such as in the form of an application, may be embedded in third party web sites. For example, the system could be put on a website that sells cameras and offer to recommend relevant cameras to the user. Alternatively, after the user 1314 searched for cameras and had a list of potential cameras they were interested in, the system could ask questions 1320 to help the user 1314 decide amongst the list of cameras. For example, if all of the cameras that the user 1314 was considering were good for travel the system would not ask about how the user 1314 wanted to use the camera, but the system might realize that asking whether interchangeable lenses were desired could be used to recommend one camera over another.

In embodiments, the system may make decisions in a plurality of topic areas, such as: products (e.g., cameras, TVs, GPS/navigation, home audio, laptops, bath & beauty, baby, garden/outdoor, automobiles, jewelry, watches, apparel, shoes, and the like), travel (e.g., where to go, where to stay, what region to visit, what to do there, and the like), financial (e.g., which mortgage, whether to refinance, which credit card, whether something is deductible on taxes, what type of IRA to save in, asset allocation for investments, and the like), gifts for various holidays and occasions, other date-based decisions (what to dress up for Halloween, and the like), personality (e.g., about a user's personality, about their relationships, their career, and the like), recommending the right pet, drinks and other aspects of night-life, books, movies, film, music, concerts, TV shows, video games, where to eat, what to order, celebrity related such as which celebrity the user 1314 is most similar to, recommending a gift, what neighborhood to live in, what to watch on television, and the like.

In embodiments, the system may be used to diagnose problems, such as in the areas of technology/IT (e.g., computer, software, printers, home networking, wireless, business networks, performance issues, and the like), medical/health, automotive, relationship or interpersonal problems, home and building problems, and the like.

In embodiments, users of the system may be either anonymous or logged in users. A logged in user 1314 may be one that has created an account on the site. Logged in users may also have profile pages about them. Content on the profile page may include basic information about that user (nickname, picture, etc.), decisions they have received and liked, decisions the system predicts the user 1314 will like even though the user 1314 has not answered questions 1320 in that topic area, lists of facts about the user 1314 that the user 1314 has given so that they do not need to be repeated each time the user 1314 uses the system for a decision (e.g., the user's age or their aesthetic preferences can be given once and remembered across different times the user uses the system), lists of tasks that the system thinks the user 1314 may be qualified and interested in doing via the wiki (such as reviewing new user 1314 submitted content, fixing spelling errors in user 1314 submitted content, reviewing new content found by the widgets, etc.), other users with similar answers to questions, and the like.

In embodiments, users may also have various titles, ranks or levels which may affect what they can do on the system. For example, some users may be given the title of "moderator" in a particular topic which would allow those users to edit certain aspects of those topics. The ranks and titles may be assigned manually or by through automatic means including being based on how many decisions they have given, how many new questions 1320 or solutions they have contributed to the system, how many tasks they have accomplished using the wiki, how well they answer 1322 certain questions 1320 in the various topics, and the like.

In embodiments, non logged in users may not have the benefit of using the system with a large selection of aesthetic or taste-based preferences already entered into their profiles. Based on learning or manual training from logged in users 1314, the system may select some aesthetic questions to ask in question dialogs when non-togged in users seek advice in particular topic areas. For example, based on logged in users answering taste questions about themselves and then giving feedback about which cars they like and don't like, the system may learn that a question 1320 about whether the user enjoys gourmet dining is useful to ask non-logged in users trying to decide between a Toyota and a Lexus. Using the attribute associations learned or manually specified by logged in users, the system may then adjust whether it recommends the Toyota or the Lexus to the non-logged in user.

In embodiments, the system may learn from users submitting feedback on decisions. Some users may either intentionally or unintentionally give incorrect feedback. For example, a vendor may try to game the system to make their product be highly recommended. Alternatively, a user 1314 who does not know much about video games may recommend a video game that in reality is not a good video game. The system may try to filter out feedback from these users by a variety of means. The system may throttle the number of feedbacks that a given user 1314 can submit (and have a higher throttle limit if the user 1314 is logged in or has a high rank/title). The system may also throttle or weight feedback based on how well the user 1314 answers certain 'test' questions 1320 during the question 1320 & answer 1322 phase in order to test the user's knowledge of the subject and weigh feedback from knowledgeable users more than unknowledgeable users. The system may also require the user 1314 to pass a 'captcha' (Completely Automated Public Turing test to tell Computers and Humans Apart) before their feedback is counted or they get a decision. The system may also look at the series of answers given by the user 1314 and weight the user's feedback based on that series of answers. For example, if the user 1314 either always clicked the first answer 1322 or the user 1314 clicked in a very improbable way, then the system may weight that user's feedback lower. Finally, the system may change the weight of the user's feedback or decide to not show a decision 1310 based on the history of previous game plays. For example, the 10th time a user 1314 tries to get a camera decision 1310 the system may weight their feedback less than on the 9th time.

In embodiments, the system may include search engine optimization (SEO), the process of improving the system's website rankings within major search engines. This process may be broken down into several mostly-automated steps, such as discovering the keywords that users are searching for, understanding the competition in the search engines to have the site's page come up when users search for these words, understanding how search engines rank sites, understanding what changes to the system's website need to be made in order to increase the site's ranking for common searches, and the like.

In embodiments, discovering keywords that users may be searching for may be found through different means, such as using keyword suggestion tools such as what Google and Yahoo provide, using data about historical searches licensed from third party data providers and crawling other websites to see what words they use, and the like. Once these keywords are found, the system may use the data in many ways, such as bidding on those words via search engine marketing (SEM), developing content on the system's site about those keywords in hopes of getting search traffic in the future, looking at how our competitors are using those same keywords, and the like.

In embodiments, the system may understand what other sites are doing and how they rank in the search engines by running keywords through the search engines and looking at who is advertising on each keyword and what the top natural search results are for each keyword. The sites discovered through this process may be crawled to discover more potential keywords. The system may also decide to develop new content or avoid a market based on this competitive information. If there are few highly ranked sites in a content area, the system may develop content in that area.

In embodiments, the system may understand that paid advertisements that bring users 1314 to the site are relatively cheap in one topic area of advice on the site and expensive in another. The system may therefore try to advertise for the low-cost traffic, help those users 1314 with their decision, and then recommend that those users 1314 use the system in a topic area that is expensive to advertise and buy traffic in. For example, the system may run ads for people who want to figure out what dog breed they should buy, help those users 1314 decide what dog breed is right for them, and then direct them to figure out where they should buy their pet medicines. The latter topic area being one that may be expensive for the system to source traffic in due to expensive ad rates, while the former topic area may be relatively cheap, as few existing businesses may be competing for customers who want advice on what type of dog to get.

In embodiments, the system may understand how search engines rank their natural (non-sponsored) search results by studying the relationship between sites that come up when a search is done and factors of those sites. Possible factors that may be correlated between sites that come up with high ranking may be factors such as the content of the site, number and quality of other sites linking to the site, the type of content on those other linking sites, and the like. From the prior step, the system may generate a list of site factors, ranked by their ability to increase a sites ranking in the search engines, and the like. The system may then use this ranked list to make changes to the site to increase the probability that the site as a whole, or certain pages on the site, will be highly ranked in the search engines.

Search engines may typically utilize a keyword index to find documents relevant to a user's query. In embodiments, the present invention may utilize a "decision index", which may also map user-input to relevant documents. The index may be built automatically, experts may hand build the index, the index may be learned through feedback from different types of users who implicitly or explicitly decide to train the system, and the like. The results of the search utilizing the decision index, may be displayed as a list of documents, a single document, and the like.

Referring to FIG. 1, an embodiment for a list of topics 102 in the system from which users may get decisions is presented, including cameras, cell phones, coffee and espresso, drinks, favorite celebrity, GPS devices, grills, Halloween, laptops, personality, toe rings, TVs, vacations, video games, watches, and the like. In addition, there may be an indicator as to the number of decisions learned 104 from user ratings, such as learned from 43,921 user ratings.

Figure 2:
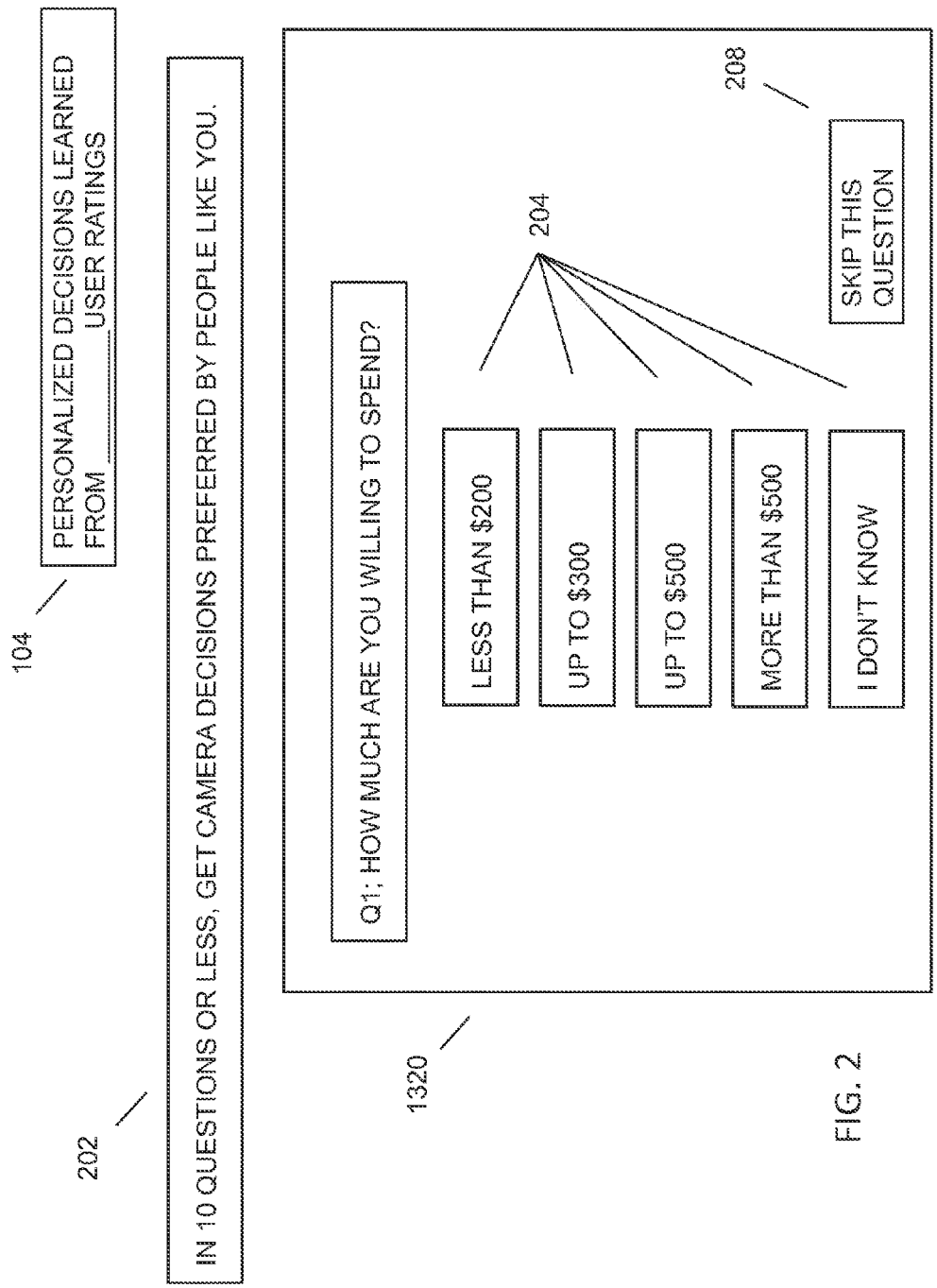
FIG. 2 depicts an example question that the system may ask a user.

Referring to FIG. 2, an embodiment of an example question 1320 that the system may ask a user 1314 is provided. In this example the user 1314 is asking for a decision 1310 related to the purchase of a camera, and the question 1320 is "How much are you willing to spend?" The user 1314 may now choose from the selection 204, such as to select between less than $200, up to $300, up to $500, more than $500, don't know, and the like. In addition, there may be an indication as to how many questions 1320 may be asked 202, such as in "In 10 questions or less, get camera decisions preferred by people like you." In embodiments, the user may also offer their own question, their own answer, their own decision, and the like, where the system may utilize this information in the current or future decision session. In embodiments, the user 1314 may choose to skip the question 208, where the user 1314 may now be provided an alternate decision based on a reduced amount of information available from the user, the system may ask the user alternate questions 1320 to make up for the skipped question 208, the question 1320 may have been a test question and will not affect the resulting decision 1310, and the like.

Figure 3:
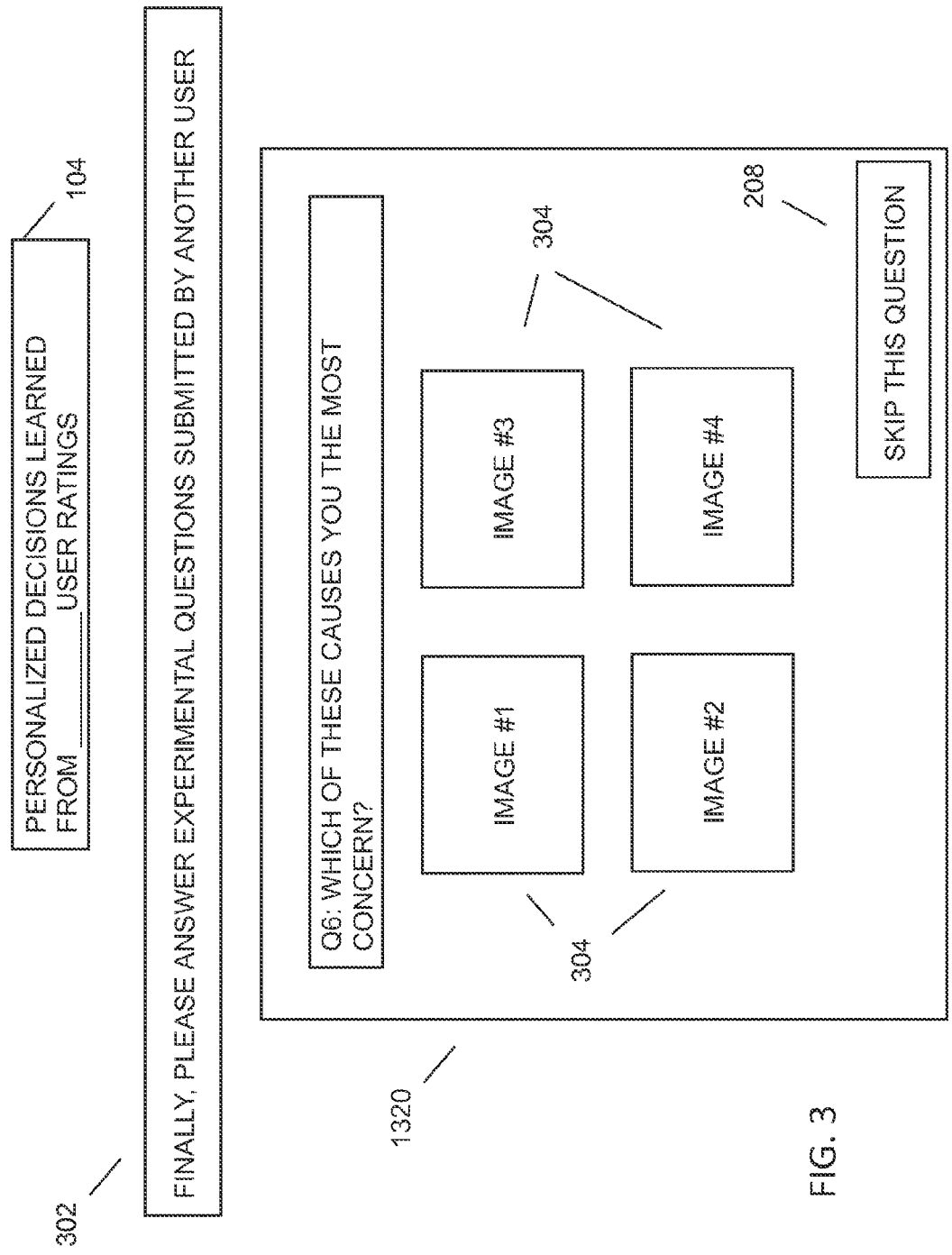
FIG. 3 depicts an example picture question that the system may ask a user.

Referring to FIG. 3, an embodiment of an example picture question 1320 that the system may ask a user 1314. In this example, the system may be asking a question 1320 whose answer 1322 may better enable the system to determine a personal characteristic of the user 1314. For instance, the question 1320 as illustrated asks "Which of these causes you the most concern?", where the picture choices 304 are indicative of certain topics, such as pollution, finances, national defense, health, and the like. This question 1320 may be targeted to the current user or be inserted as an experimental question. In embodiments, the user 1314 may be informed that the question 1320 is an experimental question 302, such as shown in FIG. 3 with the header that reads, "Finally, please answer the experimental questions submitted by another user."

Figure 4:
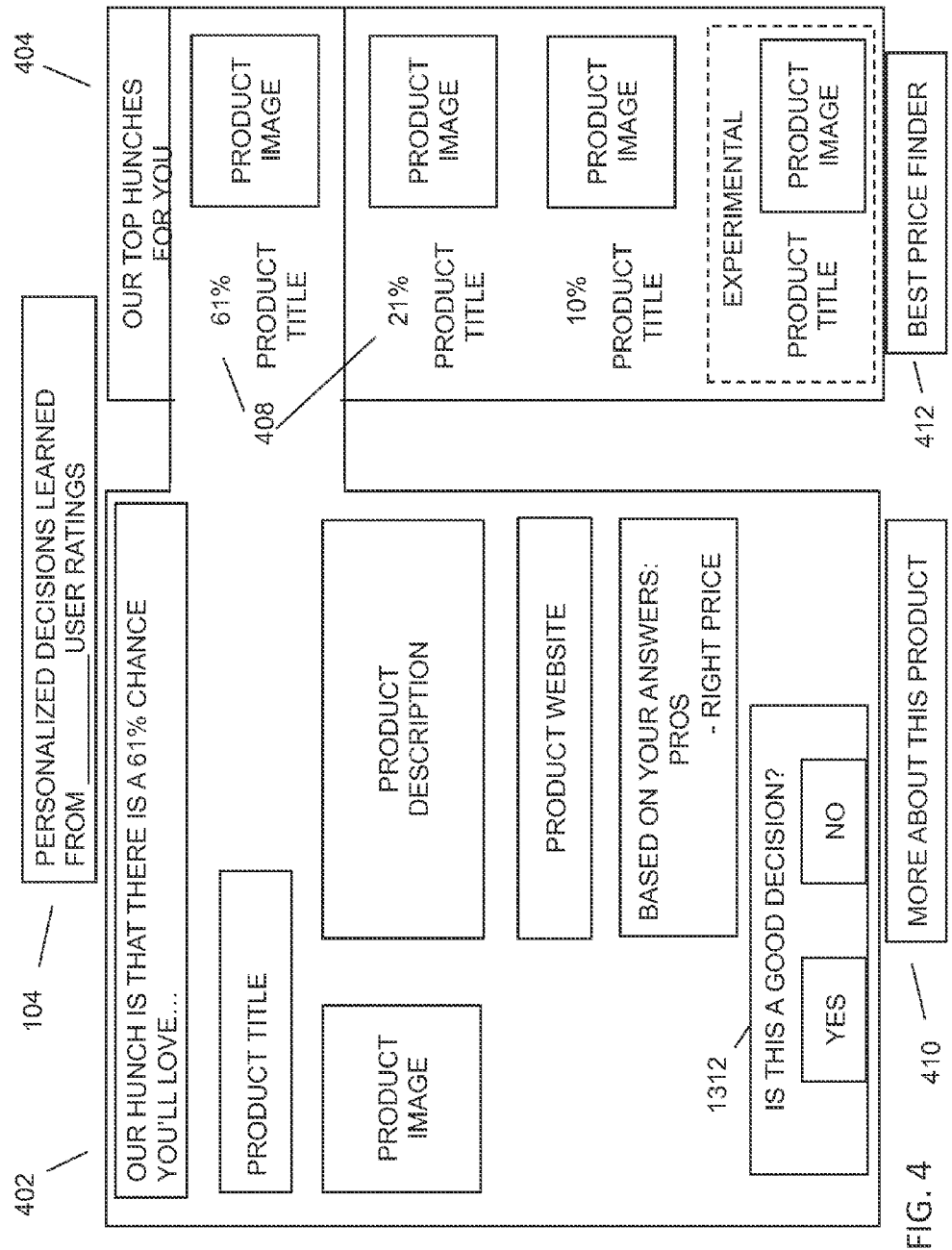
FIG. 4 depicts an example of the type of information the system may show the user when making a particular decision.

Referring to FIG. 4, an embodiment of an example of the type of information 402 the system may show the user 1314 when making a particular decision 1310 is presented. For example, the decision 1310 may be for a certain camera, where information is provided about the camera, such as a description, who uses it, the best cost for the camera, how it compares 404 to other cameras, and the like. In embodiments, other decisions 1310 may be provided, such as with a relative ranking 408, by a score, by a percentage matching, and the like. The user 1314 may also be queried for feedback 1312, such as being asked if the decision 1310 is a good decision. In addition, the user 1314 may be provided with the opportunity to find out more about the decision 1310, such as more about the product 410, best price finder 412, websites to more advice, and the like.

Figure 5:
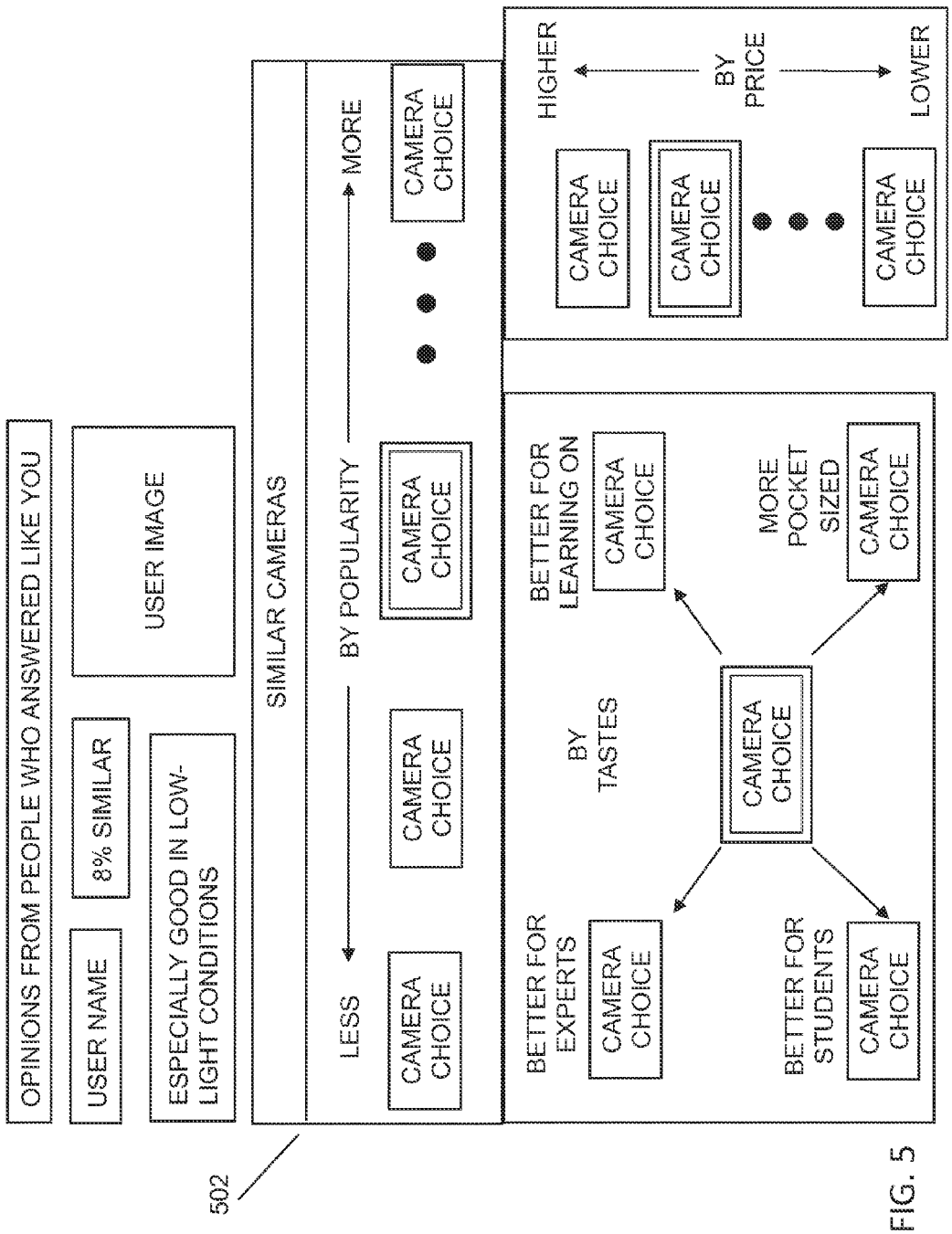
FIG. 5 depicts an example of top lists for cameras.
Figure 6:
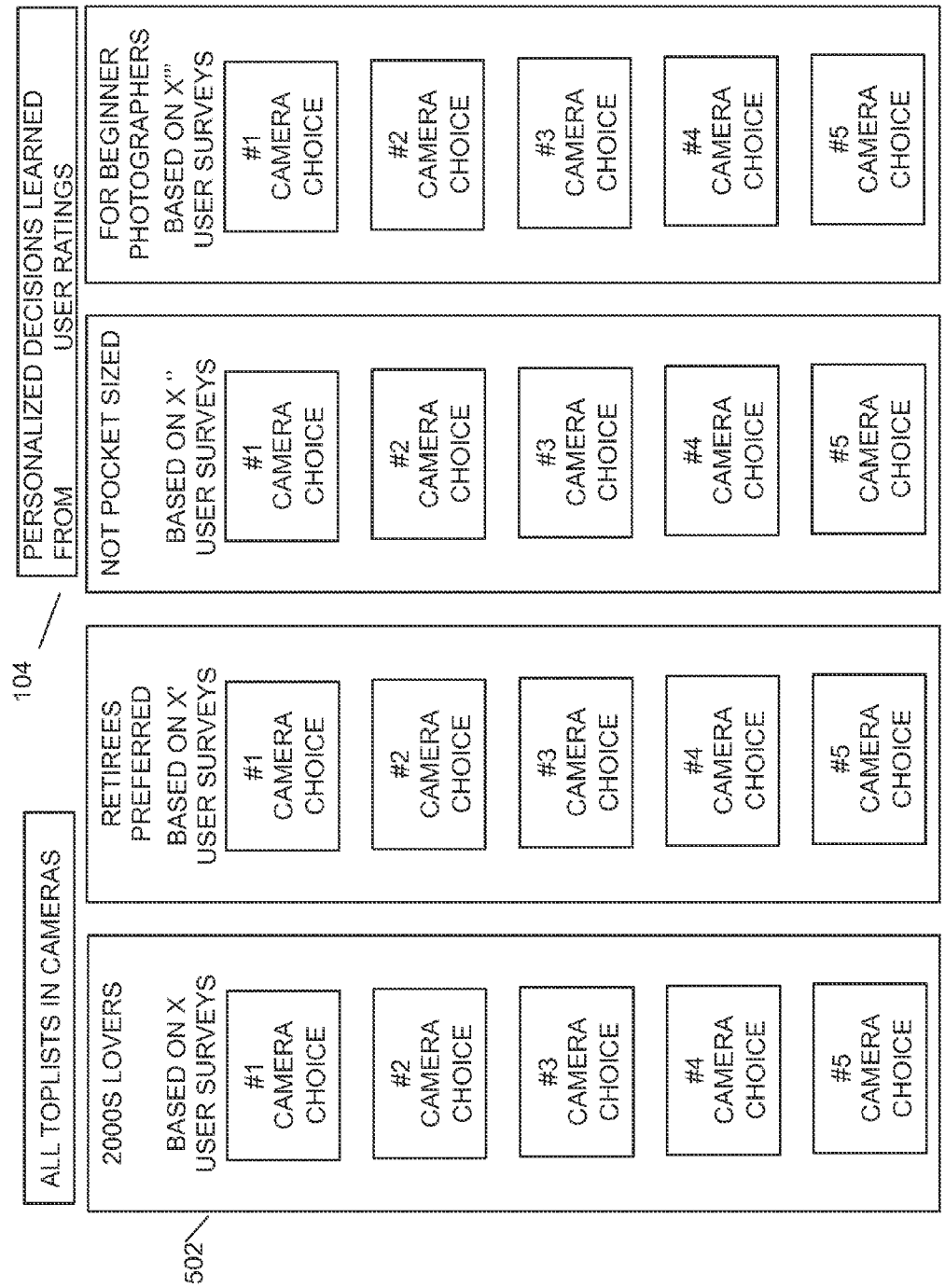
FIG. 6 depicts a second example of a top list for cameras.

Referring to FIG. 5 and FIG. 6, the user 1314 may be provided with various top lists 502 associated with a topic as described herein, such as presented in association with a decision, in association with a user's request to view top lists, and the like.

Figure 7:
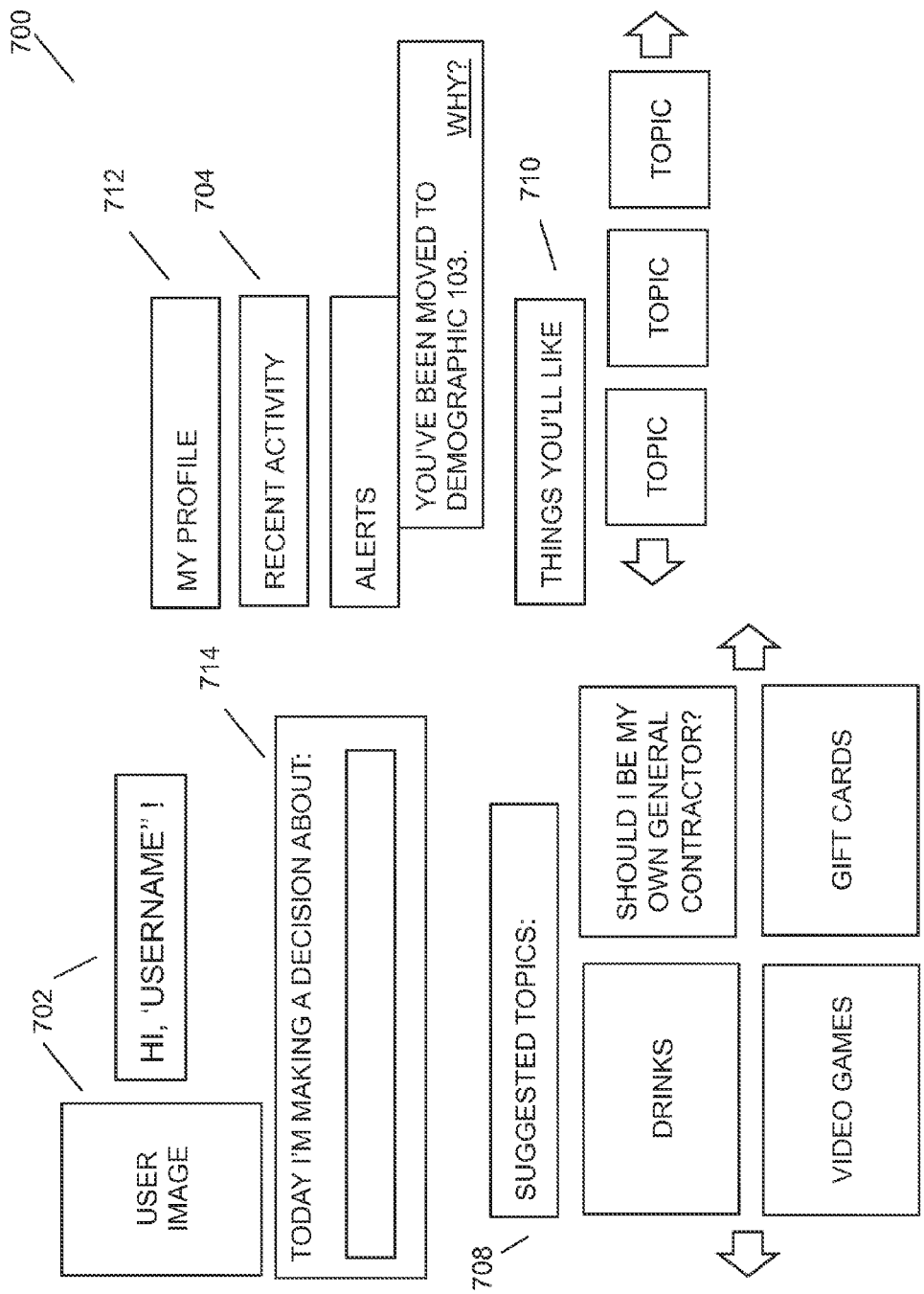
FIG. 7 depicts an embodiment of a user home page.

In embodiments, the present invention may provide users with a home page 700 including user 1314 identification 702, personal representation, past decisions made, future topics for consideration, decision 1310 to make today 714, and the like. FIG. 7 provides an example of a user home page 700, such as what the user 1314 sees when they are logged into the system account. Here, there may be a display of recent decisions the system recommended, lists of popular topics 708 to get decisions in, a search interface 710 to find topics, status updates about the user 1314 getting benefits for contributing to the system, recent activity 704, access to the user's profile 712, and the like.

Figure 8:
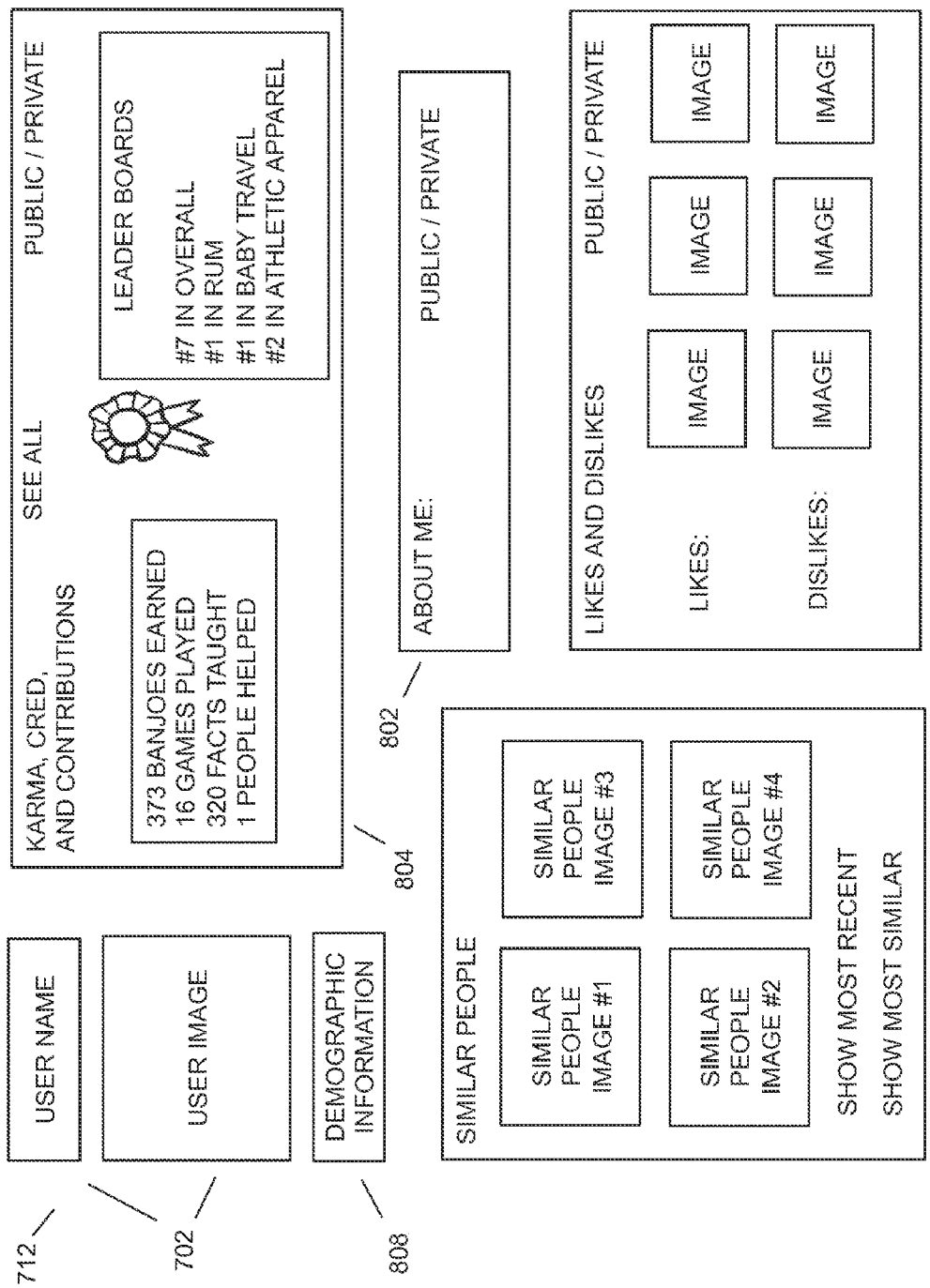
FIGS. 8 and 8A depict an embodiment of a user's remembered answers.
Figure 8A:

FIGS. 8 and 8A provide an example of a user's profile 712 page showing information about them and their account. The user 1314 may manage user information 802, such as a user's email address, password, and the like. They may also answer questions 1320 about themselves and have these answers remembered 810 and automatically used when they use decision making topics in the system. The user 1314 may also receive rewards 804, such as "badges", and see them displayed as received in response to helping other users, contributing to the system, and the like. Some of these rewards may be based on the quality of the user's contributions, on the quantity of contributions, and the like. In addition, users may be assigned a demographic group 808 of people who answered questions 1320 about themselves similarly.

In embodiments, users may be able to decide they want to contribute expertise 902 to the system, such as in a 'teach the system' mode. FIG. 9 shows an example of various links/pages that may allow a user 1314 to contribute, such as giving the system training about various decisions, rating the quality of pictures and user-contributed prose, finding duplicate items and questions, contributing new decision making topics, contributing new questions 1320 to existing topics, and the like.

Figure 10:
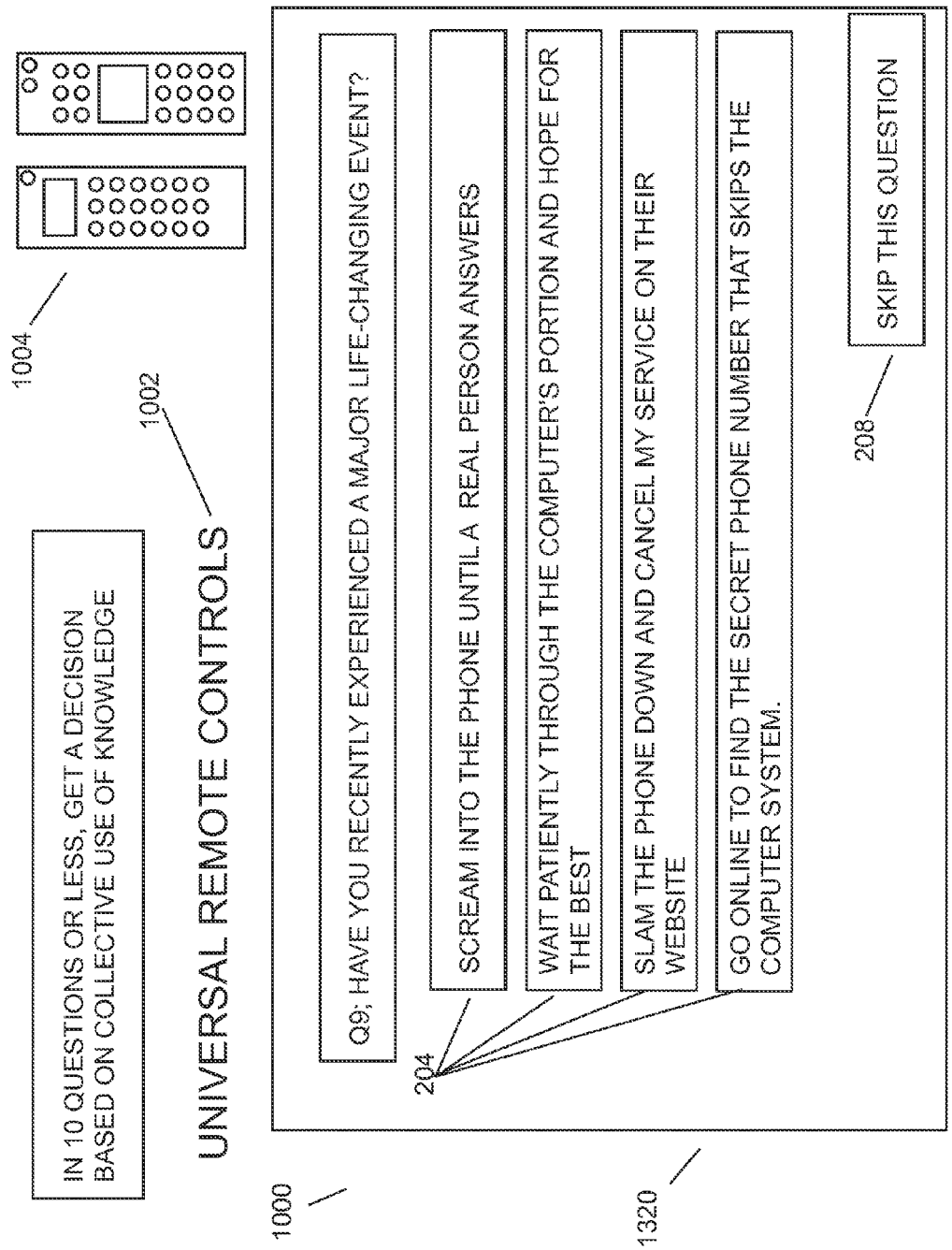
FIG. 10 depicts an example of a user question.

In embodiments, the user, after choosing a topic for the system to make decisions for, may be asked questions. FIG. 10 provides an example of how a question 1320 may be presented 1000 to the user. As shown, the presentation of the question 1320 to the user 1314 may provide different elements, such as a topic heading 1002, a picture or illustration associated with the topic 1004, a question, a set of answer choices, and the like.

After answering questions, the user 1314 may be provided an answer 1322 or decision 1310 associated with the user's original question. FIGS. 11 and 11A show an example of how a decision 1310 may be presented 1100 to the user, and may include a primary decision, information summarizing the decision, alternate decisions, variations on the decision, and the like. In addition, the user 1314 may be provided with an opportunity to provide feedback 1312 to the system, such as whether the user 1314 agrees with the decision 1310 or not. The user 1314 may also be provided other suggested topics 1102, such as based on the current topic, answers provide, history of answers, a user's profile, a user's history of questions, topics that other users found helpful, and the like.

FIG. 12 shows an example list of decisions 1200 in a topic. For a product topic, such as shown, the "decisions" may be what product to buy. For other topics, the decision 1310 might be "yes, dump him" or "no, don't get a tattoo". The decisions may be ranked and ordered based on their relevancy to the user, based on how the user 1314 answered questions, based on how the user 1314 answered questions 1320 in the topic, and the like. Additionally, the items may be ranked by price, by name, and the like.

Figure 16:
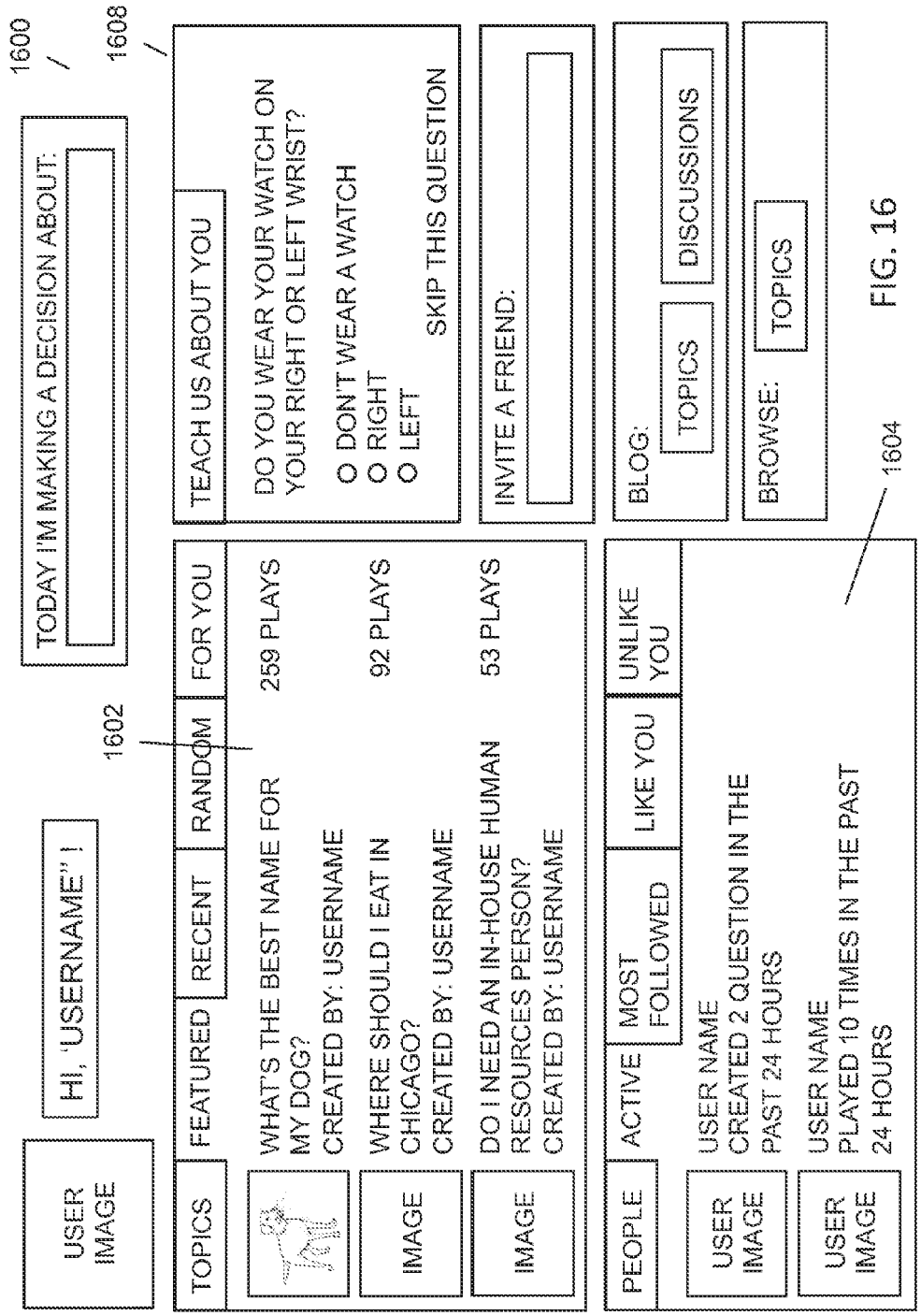
FIG. 16 depicts an embodiment contributor/expert interface home

FIG. 16 shows an example of a contributor/expert interface home page 1600, showing recent contributions to the system 1602 and other users making contributions 1604. In upper right corner is a question for learning the user's taste preferences 1608.

Figure 17:
FIG. 17 depicts an embodiment objective question to a user looking for help in a decision.

FIG. 17 shows an example of a question in a dialog with the system asking an objective question 1700, and in this instance, to a user looking for help deciding what to name their new puppy.

Figure 18:
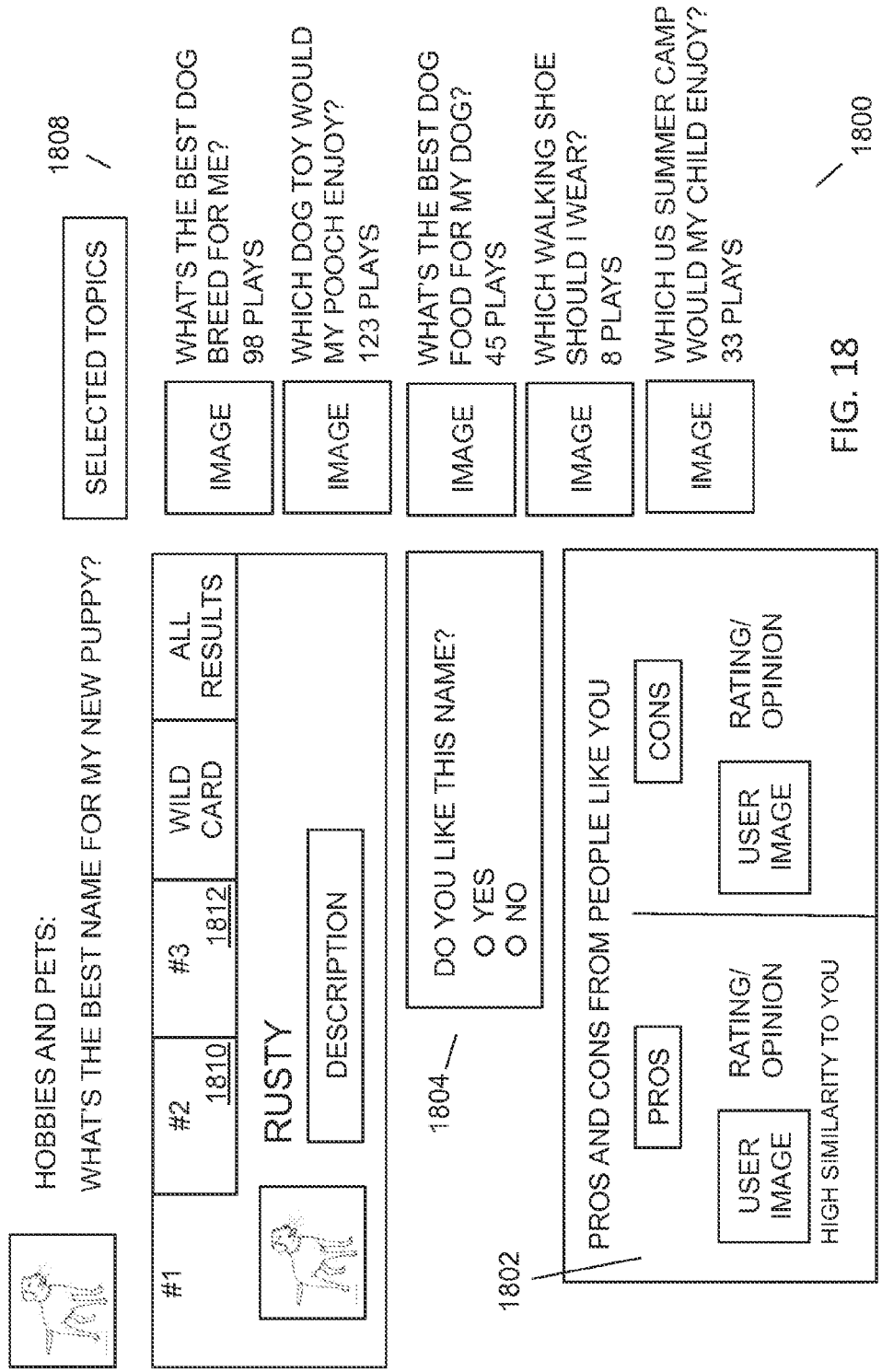
FIG. 18 depicts an embodiment of a decision result showing a particular recommended decision.

FIG. 18 shows an example of a decision result showing the particular recommended decision 1800 (in this instance, name your dog Rusty), reviews about this decision from other users 1802 (where it may be ranked, such as by their similarity to the user), yes/no buttons 1804 (such as for receiving feedback on this decision, showing other decision areas that the user might enjoy under, and the like), suggested Topics 1808. In this example, the system's second and third best recommended decisions are listed under the #2 tab 1810 and #3 tab 1812. The system may also be engaging in exploration by also recommending a "wild card" decision which may be a decision that was partly picked through randomness. The Suggested Topics 1808 may be selected based on how relevant the system thinks these topics may be for the user and/or how much profit the system thinks it may be able to generate from the user using these other decision areas.

FIG. 19 shows an example of an interface for users 1900 to set the associations between attributes and decision results. In this example, the decision result "Rusty" should be associated with the attribute "Is this name for a female, or male dog? Male".

FIG. 20 shows an example of how a user may edit content in the system 2000. In this example the user is able to edit a decision result: it's name, description, URL for getting more information, etc.

FIG. 21 shows an example of how content that is editable by users may also have an interface for seeing prior revisions 2100 to the content and showing the changes between two prior revisions. Users may also revert the changes made by other users if those changes are deemed to be irrelevant or unhelpful. In this case the example shows the difference between two revisions to a decision result where the description of the result has been changed.

Figure 22:
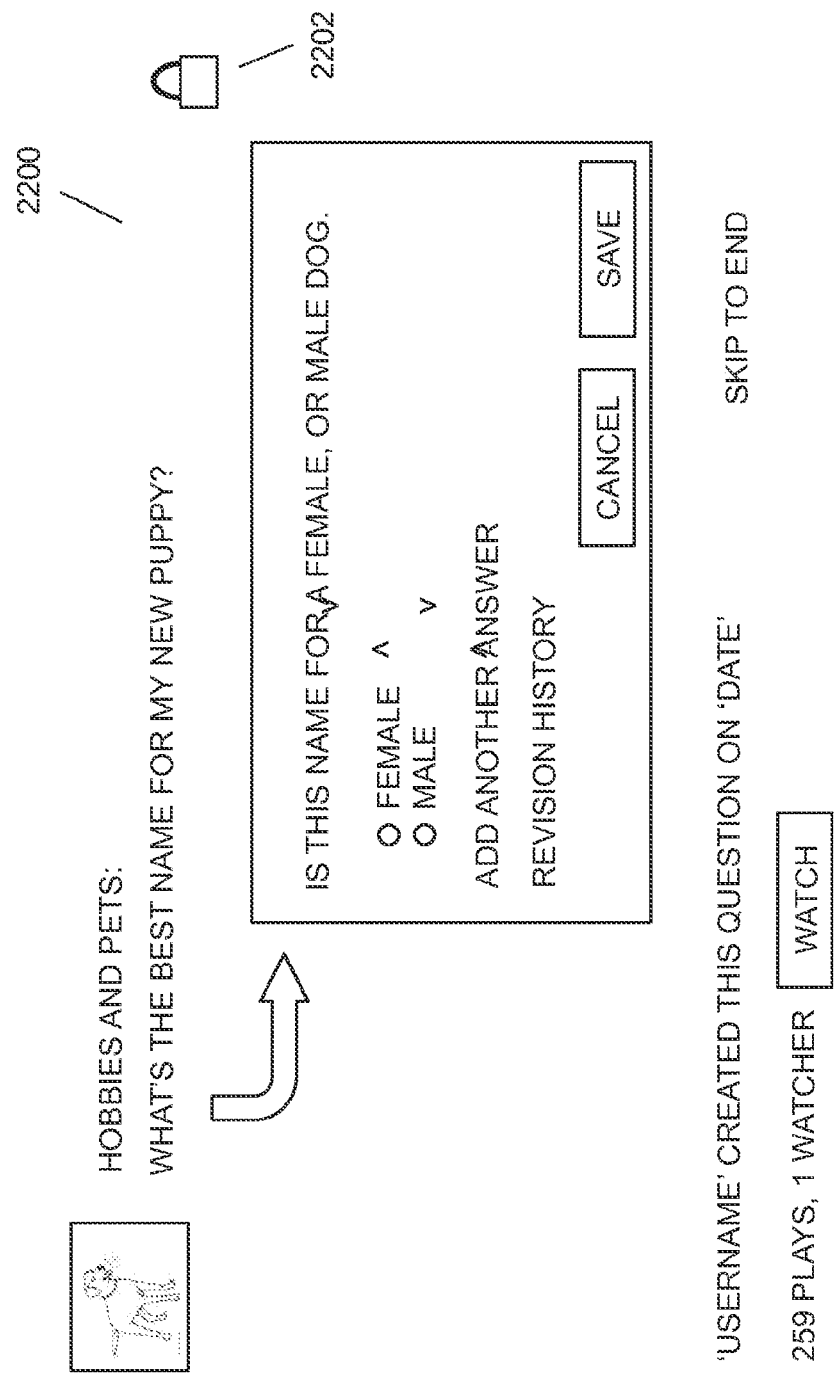
FIG. 22 depicts an embodiment showing a question being edited by a user.

FIG. 22 shows an example showing a question being edited by a user 2200. New answers may be added, existing answers re-ordered, the question and answer text itself edited, and the like. Questions may be optionally "locked" to prevent other users from changing them, such as by indicated by the pad lock icon 2202.

FIG. 23 shows an example showing that edits to attributes may have revision histories like other editable content 2300. This example shows the difference between two revisions of the attribute associations between the decision result "Rusty" and the attributes "How many syllables do you want the name to have? No more than 2 or 3 or more is OK".

FIG. 24 shows an example showing a 'workshop' screen 2400 where newly added areas of advice may be first displayed. In embodiments, expert users may make additions here without regular users seeing the works-in-progress. Content that is deemed objectionable, irrelevant, or low quality may be voted on and removed from the system.

FIG. 25 shows an example showing the system asking the user taste subjective questions 2500 in order to learn taste and subjective preferences from the user. After answering these questions the system may show statistics on how other users answered the same question.

FIG. 26 shows an example of an activity feed 2600 of recent activity by contributors across the site showing newly added content and expert training.

In embodiments, the present invention may provide a facility for providing an improved way to provide decisions to a user 1314 with a question 1320 across a broad category of topics, including products, personal, health, business, educational, entertainment, the environment, and the like. For example, the system may provide decisions on everything from whether a user 1314 should break up with their boyfriend, to whether you should get a tattoo or not, to whether you can deduct something on your taxes in addition to product decisions, and the like. In embodiments, the system may provide decisions on any interest a user 1314 may have.

In embodiments, the present invention may provide a decision system that is flexible and is capable of changing and growing. This may be partly enabled by the system's use of a dialog of questions 1320 and answers to make a decision, and then getting feedback from the user 1314 so the system can improve. In embodiments, this approach may be significantly more powerful since the system may ask any question 1320 and therefore get much better information from the user 1314 about their wants. In addition, users may be able to extend the system by entering their own questions 1320 and answers for the system to ask, entering in new decisions for the system to make, and the like. The system may then automatically try out newly entered information to see if it is useful or helpful and use this new information to determine if it is useful, and possibly stop asking/using the questions/decisions that may not be as helpful to users. In embodiments, this approach may provide for building a wisdom-of-the-crowds based decision making expert system for potentially any topic.

In embodiments, the present invention may also provide improved decision facility to the user 1314 by providing decisions by ranking across non-price or size, the system may rank cameras based on how much they're liked by retired people, how sexy they took, and the like. The system may then help users navigate across these dimensions. For instance, instead of users just being able to say "I like this camera, but want a cheaper one" the system may let them do things like say "I like this camera but want one better for learning photography" or "I like this vacation, but want one with a more active social scene".

In embodiments, the present invention may lend itself to a variety of different user interfaces, such as a web interface, instant messaging, voice, cell phone, SMS/instant messaging, third party use (e.g. a widget on a third party, web service sold to a third party), and the like. For example, a voice interface may be well suited to the system since there may be a very limited vocabulary that the system must recognize, such as just the possible answers to each question. In this way, if the system can't understand a user response it may just move on to another question 1320 instead of annoying the user 1314 by asking them to repeat their answer over and over. In another example, the present invention may be integrated into a third party site, such as a search for a TV on an e-commerce website, where the present invention is a widget to help the user 1314 narrow down the results, or using the present invention as a widget in association with a real estate website to build an MLS query for the user 1314 to find a house that is a good match for them. In embodiments, the present invention may provide a user interface, both in regard to a physical interface and in the way questions, answers, and decisions are presented, that provides the user 1314 with a significantly improved way to obtain decisions on a great variety of topics.

In embodiments, the present invention may be integrated into third party products in such as way as to improve the third party's user interface and user satisfaction. For example some website services provide predictions through past purchase history. In this case, the present invention may be able to explore a user's mood or intent, such as through asking explicit questions. In the case of search engines, the present invention may be able to detect when the user 1314 is trying to make a decision 1310 and then start to ask them follow on questions. In the case of forum sites, mailing lists, news groups, and the like, the present invention may provide improved access to decisions and decisions that were made by people similar to the user. For example, the present invention may be able to search through all the forum posts to find people who are in the same situation as the user, and providing what decision 1310 the forum community recommended to them.

In embodiments, the present invention may be able to extend ecommerce web application user interfaces. For instance, a user 1314 may start a product search with a keyword search and then ask questions 1320 to narrow down the results to the best decision 1310 for the user. The present invention may be able to provide a Q&A interface for picking a product once the user 1314 clicks into a category page. For example, after clicking cameras on the website, the user 1314 might see a first question. The present invention may be able to rank products along dimensions that are based on how users answer questions. For example, cameras might be ranked from best to worst 'travel camera' based on how people answer 1322 the question "What do you want a camera for?" Answer "Travel" and then whether they give positive or negative feedback to a particular camera. This may allow the e-commerce website to rank a list of camera keyword search results from best to worst travel cameras.

In embodiments, the present invention may be able to provide an improved search engine capability, such as detecting when a user 1314 is trying to make a decision 1310 and switching to a Q&A interface, based on the search results from a keyword search ask follow up questions 1320 to narrow down or re-rank the results, ask questions 1320 in order to build a keyword search query or to refine a search query, learn feedback based on which links a user 1314 clicks after being asked questions, and the like. In addition, the present invention may implicitly learn about the user 1314 and alter rankings based on these implicit facts, such as what time of day they're using the system, where they are in the world, what type of browser they're using, weather where they are, and the like.

In embodiments, the present invention may be able to provide a way for information to be gathered and utilized by users. For instance, Wikipedia is a way for users to contribute information such that the end user 1314 must, to some extent, self validate the accuracy of the information subsequently supplied to them. In a similar fashion, the present invention may be able to host a web application that utilizes user contributed content. For instance, instead of learning what the prices of cameras are, the web application could have users input the prices of cameras and then allow other users to self validate these claims. In this way, the scope of the contributed information may be allowed to grow organically as users interact with the system.

In embodiments, some e-commerce applications may provide for products and/or services that are associated with personal preference, and so may benefit from the present invention. For instance, there are currently several movie rental web services, where the user 1314 selects movies for delivery to their home through the mail. Decisions are also provided to the user 1314 based on what the user 1314 has selected in the past. However, choosing a movie may involve personal interests at the time of rental that cannot be determined by past selections, such as mood, intent, weather, are they going to be atone or with someone, their current personal relationships, and the like. These types of interests may be explored with the present invention through questioning, and as such, may provide a much more personalized match to the user's interests at the time of rental.

In embodiments, local search applications may be improved through the use of the present invention. For example, if a user 1314 wanted a decision 1310 on where to eat dinner, they might search for "dinner in new york" and find a website with suggestions targeted to the query. This interface however falls short when the user 1314 doesn't have a clear idea as to what keywords to include. For instance, the user 1314 might not know the key options for food and might not think to search for 'ethiopian food new york.' The present invention may have the advantage of being able to figure out what question 1320 it should ask in order to narrow down the possibilities. In embodiments, the present invention may be able to aid in the building of a search query.

In embodiments, the present invention may provide for an improved way to match up users and experts, users and other knowledge based users, and the like. For instance, a service may be provided to collect users and experts on different topics. Users may then come to the web interface of the service and enter into a session of Q&A where the best match is determined. As a result of the questions, the system may provide a decision, where the profile of the expert or other user 1314 is provided, and where the user 1314 may be asked if they agree with the recommended individual. In embodiments, the user 1314 may be provided a home page where previous matches and communications may be kept, forwarded to friends, experts rated, and the like.

In embodiments, the present invention may provide a platform for a community based question 1320 and answer 1322 application. For instance, users may post questions 1320 to the system, and other users may be allowed to respond. In such a system, a user 1314 may receive answers from a single user, multiple users, an automated system, and the like, where the user 1314 may be able to choose which answer 1322 they feel is correct. This answer 1322 may be kept private, posted for others to view, posted as the correct answer, provided to the system, and the like. In embodiments, the system may use the questions 1320 and answers to further develop the system, provide more accurate answers to users, sort the answers provided to the user, filter the answers provided to the user, and the like. In addition, users of the system may provide feedback to answers provided by other users, contribute to filtering criteria for eliminating incorrect answers, and the like.

In embodiments, the present invention may be used as entertainment, through machine learning capabilities as described herein. For instance, a user 1314 may provide an input or think of an idea, such as a topic, a keyword, a category, a question, a feeling, and the like, and the system may make a guess as to what it is through a series of questions 1320 and answers. For example, the user 1314 may think of an object, such as baseball, and the system may utilize machine learning capabilities, such as geometric systems, to provide questions 1320 to the user. A typical question 1320 may relate to size, such as 'is it bigger than a toaster?' These questions 1320 may then be answered by the user, such as through multiple choice selection, fill in the blank, true/false, free response, and the like. The system may then continue the question 1320 and answer 1322 sequence until it has a guess, and provide this guess to the user. In embodiments, this process may continue for a fixed number of questions, a random number of questions, a user 1314 specified number of questions, a system determined number of questions, a system specified number of questions, and the like. In embodiments, the system may provide the user 1314 with a user interface, such as through the Internet via a website, through a stand-alone computational device, through a mobile computational device, through a phone service, through a voice interface, in association with an instant messaging service, through text messaging, and the like. In embodiments, the system may be provided to a third party, such as a widget to another website, as an API to a third party application, and the like. In embodiments, the present invention may use non-neural networks for entertainment applications, such as playing games.

In embodiments, the present invention may provide a system to assist in the discovery of new drugs, where the system may provide an aid in the selection and combination of molecules in creating a new drug. For example, the system may ask the user 1314 about information associated with chemical parameters, such as solubility, reactivity, toxicity, and the like, and combine these with questions 1320 to probe the user's expertise in recognizing molecular structures. As the question 1320 and answer 1322 sequence progresses, the system may provide the user 1314 with insights as to which molecular structures may be stable and synthesizable. In embodiments, the process may continue until the user 1314 has an improved sense for what molecular combinations may make for a new drug, until the choice of new exploratory routes are available for presentation to the user, until an new potential drug is identified, and the like.

In embodiments, the present invention may provide for an image finder application, where the user 1314 may be assisted in identifying an image that fits some subjective criteria that is not necessarily explicitly known to the user. For example, a user 1314 may be involved in the development of a brochure for a company, where they have the text for the brochure, but need to select an image to support the ideas and emotions that the text is trying to convey. The user 1314 may in this instance have a subjective idea as to what type of photograph may be required, but not necessarily to the extent that they could specify a search with keywords. The user 1314 may instead first specify the source of the images, such as from a file, a database, a website service, from Google images, from an advertiser image bank, and the like. Then the user 1314 may be asked a series of questions, or be presented with a series of images to choose from. The answers and/or selections that the user 1314 chooses may then be utilized in refining the choices that are next presented to the user, and from which further questions 1320 and/or image selections may be provided. In embodiments, this process may continue until the user 1314 finds an image to select as the final image. Additionally, the system may take the user's 'final selection' and select a group of other similar images for presentation to the user, at which time the user 1314 may choose to continue the process of selection refinement.

In embodiments, the present invention may be used in a baby naming application, where the user 1314 may have only a vague sense of what names they might prefer. The user 1314 may be initially asked different types of questions 1320 intended to provide the system with information to aid in the learning of the user's preferences, such as questions 1320 about family, friends, education, heritage, geographic location, place of birth, hobbies, books read, movies watched, and the like. The system may then continue to learn through the presentation of questions 1320 associated with name preference in a plurality of ways, such as rating name, choosing from a list of names, answering questions 1320 pertaining to name, and the like. In embodiments, this process may continue until the user 1314 finds a name to select as the final name. Additionally, the system may take the user's 'final selection' and select a group of other similar names for presentation to the user, at which time the user 1314 may choose to continue the process of selection refinement.

In embodiments, the present invention may provide decisions for a plurality of topics including, hut not limited to, video games, laptops, vacations, cameras, general personality, drinks, cell phones, televisions, grills, watches, coffee machines, toe rings, Halloween, GPS devices, hottest celebrity, your personal hero, presidential election, baby toys, blogs, camcorders, cars, which star wars character are you, credit cards, hair care, skin care, sex and the city, should I get a tattoo, professions, how much allowance, city to live in, dog breeds, fragrance, New York, neighborhood chooser, software, desktop computers, DVD players and recorders, cigars, charities, Broadway shows, speakers, home theater systems, MP3 players, computer networking devices, headphones, memory cards, magazines, books, Oprah picks, books, The New York Times bestsellers, business casual clothing, franchises, cookware, toys, toys—educational, athletic apparel, espresso machines, should I go Greek, should I come out to my parents, should I ask for a raise, do I have a drinking problem, should medicate my add/AMID child, vacuum cleaners, clothes washers and dryers, is working at a startup right for me, humidifiers, are you a good friend, risk of developing diabetes, which foreign language should I learn, microwaves, car audio, what kind of customer are you, wine, should I join the which military branch should I join, what kind of art will I enjoy, baby and toddler car seats, baby strollers, baby travel accessories, natural and organic beauty products, makeup, home audio receivers and amplifiers, copiers and fax machines, printers, breakup with my boyfriend/girlfriend, which Greek god are you, what game show would enjoy, computer accessories, which superpower should you have, college, online degree programs, choose a major for college, identity theft prevention, should I hire a personal trainer, should I buy or lease a car, should I have laser eye surgery, what should I do about losing my hair, should I start my own business, should my child start kindergarten, how to entertain my family visiting NYC, OTC pain relievers, do I need a living will, miles or cash for my next flight, best way to whiten my teeth, should I let my daughter wear makeup, is hypnosis likely to cure my bad habit, ED options, sleep aids, OTC allergy pills, how much money to spend on a wedding gift, should I buy the extended warranty, is it better to take the SAT or ACT, personal audio accessories, coffee/espresso drink would I enjoy, video game consoles, jeans, downloadable PC games, snacks, vitamins and supplements, which superhero am I, sunglasses, kitchen gadgets, pillows, beauty accessories, beauty bags and cases, sporting goods, which musical instrument is right for me, should I hire a decorator, electronic readers, where do you belong in a shopping mall, power washers, small business, phone system, how much to tip, should I try Botox, should I get liposuction, risk of skin cancer, should I refinance my home, car services (NYC), microbrewery beer, gourmet chocolates, am I saving enough for retirement, entertainment centers/TV stands, cookbooks, electric shavers, keep sending nieces/nephews b-day gifts, luggage, computer projectors, energy/workout bars, razors, gourmet ice creams, online dating, newscasts, makeup, tools and brushes, beauty mirrors and compacts, business books, how soon to call after a first date, places to retire, external hard drives, universal remote controls, walking shoes, should sell my life insurance policy, how green are you, do I have an eating disorder, baby cribs, diets and diet books, cell phone plans, wedding and engagement rings, am I assertive enough, does my child play video games too much, tax preparation (personal return), should get a reverse mortgage, cancel plans with friends for a date, children's TV shows, kitchen countertops, bathing supplies, insect repellents, cancer specialist, hospitals, national chain restaurants, cereal, should I have kids now, should I hire a nanny, movies, beef cuts, target calories per day, do I have OCD, home air purifiers, auto air fresheners and purifiers, i-phone applications, gay/lesbian vacations, is it ok to ask my co-worker on a date, is my pre-teen ready to babysit, sports/energy drinks, TV shows, office furniture, motorcycles, reward a child for a good report card, lawn trimmers and edgers, am I too stressed, religion, do you make a good first impression, do you spend too much time online, should I get a new hairstyle, should I home-school my child, diaper bags, should I use cloth or disposable diapers, dog toys, is my partner cheating on me, classic books should my elderly parent stop driving, am I over my ex, is it lust or love, pedometers and heart rate monitors, chewing gum, weather devices, will gas additives help my car, Orlando theme parks, how big of a turkey should I buy, popular music—new releases, self tanner, tax and money management, software, baby bottles and Sippy cups, baby high chairs and booster seats, baby tethers, toasters and toaster ovens, comforters sheets and bed linens, flatware sets, pet carriers and kennels, cheese, kitchen faucets, casual shoes, dress shoes, beauty electronics, am I saving enough for retirement, mutual fund chooser, steak cuts, what is my D&D alignment, acne and pimple medication, bathroom faucets, home exterior lighting, landscape lighting, lawn mowers, aperitif, cognac, gin, rum, scotch, tequila vodkas, whiskeys, Las Vegas shows, sunscreen, running shoes, US MBA programs, patio and outdoor furniture, kitchen knives, are you a true fan, auto insurance, personal legal services, should I hire a financial advisor, indoor plant selector, delivery services, can I deduct it, pool heaters, sofas, house numbers, contact lenses, birthday gifts, has my career peaked, electronic books, doorknobs & lock sets, snow removal equipment, green home improvement, kids clothing & swimwear, motorcycle helmets, bicycle helmets, juicers, golf clubs, refrigerators, wine coolers, ranges and ovens, air conditioners, Christmas gifts, breakup phrases, cold sore medication, diabetes monitoring devices, smoking cessation, what do I do about the hair on my back, hormones to counteract menopause, hiking backpacks, school backpass, get a website/domain, e-mail services, web hosting, carpets, power tools, tile, water heaters, outdoor paint, window treatments, fireplace screens, indoor lamps, small business legal services, brunch recipes, ceiling fans, mattresses Las Vegas hotels and casinos, salsas, love quiz for valentines, how much to spend on client gifts, anniversary gifts, outdoors outerwear, casual outerwear, camping tents, sleeping bags, tires, adventure vacations, music downloads, video downloads, wedding dresses, wedding themes, Manhattan gyms, budget hotel chains, golf courses, ski vacations, US spas, ETF funds, designer handbags, should I declare bankruptcy, 401k as down payment on home, should I see a psychiatrist, self defense, dishware, dishwashers, political parties, new year's resolutions, cruise lines, family vacations, baby food, baby health care products, should I shave my head, t-shirts, online photo services, buy a class graduation ring, summer job/internship, where to volunteer, home alarm systems, diagnose your relationship issues, is she/he hot for me, should I adopt, should my aging parents be driving, online bank accounts, BBQ sauces, frozen pizza, recipe finder, should I re-gift it, bodybuilding supplements, home workout equipment, how many hours of sleep do I need, should I consider plastic surgery, risk of arthritis, risk of heart disease, risk of osteoporosis, do I have a gambling problem, best dance to learn, bicycles, cat food, dog food, hobby recommender, martial arts, poster art, outdoor flower selector which Muppet are you, activities for kids, how ethical are you, should I baptize my child, Miami hotels, national parks, motor oils, automotive video, blouses, coats, dresses, glasses frames, hosiery, interview clothes, jackets, negligee, pants, shirts, skirts, hats, phones-land lines, steakhouses, which birth method is right for you, summer camp recommender, march madness bracket chooser, baby formula, New York bakeries, fractional jet ownership, how self confident am I, digital photo frames, do I need an accountant, does my child have ADD/ADHD, document shredders, baby monitors, green home improvement, conference phones, and the like.

Figure 13:
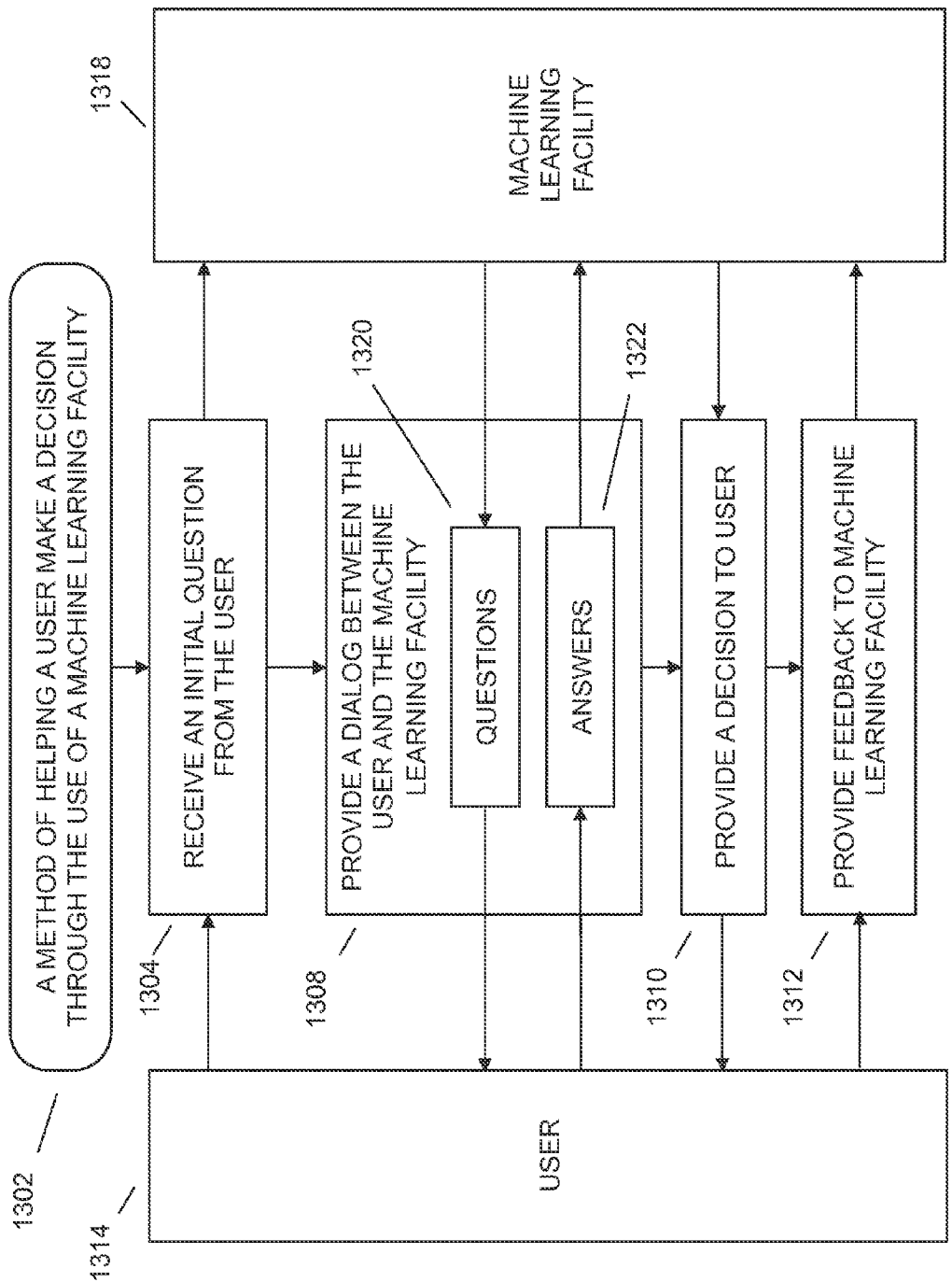
FIG. 13 depicts an embodiment process flow for the present invention.

In embodiments, and as depicted in FIG. 13, the present invention may help a user 1314 make a decision 1310 through the use of a machine learning facility 1302. The process may begin with an initial question 1320 being received 1304 by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

In embodiments, the initial question 1304 posed by the user 1314 may be an objective question, a subjective question, and the like. A question 1320 may be provided from amongst a broad category of topics, such as topics pertaining to a product, personal information, personal health, economic health, business, politics, education, entertainment, the environment, and the like. The questions 1320 may be in the form of a multiple choice question, a yes-no question, a rating, a choice of images, a personal question, and the like. The questions 1320 may be about the user 1314, provided by another user, provided by an expert, and the like. The questions 1320 may be based on a previous answer, such as from the current dialog 1308 with the user 1314, from a stored previous dialog 1308 with the user 1314, from a stored previous dialog 1308 with another user. The question 1320 may be a pseudo random question, such as a test question, an exploration question 1320 that helps select a pseudo random decision 1310 on the chance that the pseudo random decision 1310 turns out to be useful, and the like. The questions 1320 may include at least one image as part of the question. The questions 1320 may be along psychographic dimensions. In embodiments, the questions 1320 may not be asked directly to the user 1314, but rather determined from contextual information, such as through an IP address, the location of the user, the weather at the user's location, a domain name, related to path information, related to a recent download, related to a recent network access, related to a recent file access, and the like.

In embodiments, the dialog 1308 may continue until the machine learning facility 1318 develops a high confidence in a reduced set of decisions, such as a reduced set of decisions presented to the user, a single decision 1310 presented to the user. The decision 1310 provided by the machine learning facility 1318 may be independent of the order of questions in the dialog 1308. The decision 1310 may provide an alternate decision 1310 when at least one question 1320 in the dialog is omitted, where the alternate decision 1310 may be different based on the machine learning facility 1318 having less information from the user 1314. The decision 1310 may display a ranking of decision choices, such as ranking decisions across non-traditional feature dimensions. The decision 1310 may display at least one image related to the decision 1310. The decision 1310 may be a pseudo random decision on the chance that the pseudo random decision 1310 turns out to be useful, such as the pseudo random decision being part of a system of exploration, where the system of exploration may improve the effectiveness of the system, the machine learning facility 1318 may learn from exploration, and the like.

In embodiments, the feedback 1312 provided may be related to, or derived from, how the user 1314 answers questions 1320 in the dialog 1308, how the user 1314 responds to the decision 1310 provided by the machine learning facility 1318, and the like. In embodiments, the feedback 1312 may be solicited from the user 1314.

In embodiments, users 1314 may extend the learning of the machine learning facility 1318 by entering new information, where the new information may be their own topic, question, answer, decision, and the like. The machine learning facility 1318 may use the new information to determine whether the new information is helpful to users.

In embodiments, a user interface may be provided for user interaction with the machine learning facility 1318, such as associated with a web interface, instant messaging, a voice interface, a cell phone, with SMS, and the like.

In embodiments, the present invention may help a user make a decision 1310 through the use of a machine learning facility 1318. The process may begin with an initial question 1304 being received by the machine learning facility 1318 from the user 1314, where the initial question 1304 may be associated with one of a broad category of topics, such as product, personal, health, business, political, educational, entertainment, environment, and the like. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

Figure 14:
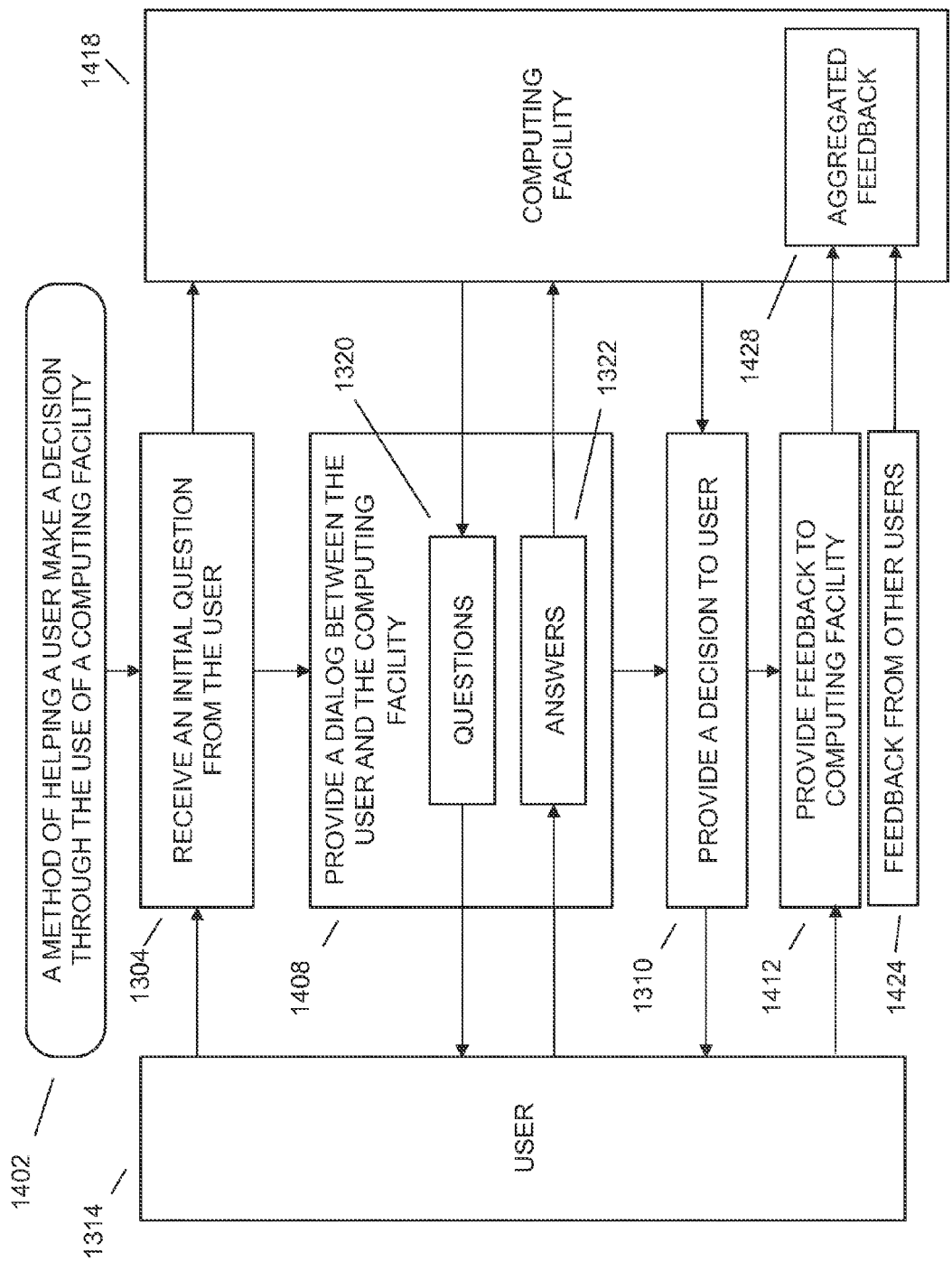
FIG. 14 depicts an embodiment process flow for the present invention.

In embodiments, and as depicted in FIG. 14, the present invention may help a user make a decision 1310 through the use of a computing facility 1402. The process may begin with an initial question 1304 being received by the computing facility 1418 from the user 1314. The user 1314 may then be provided with a dialog 1408 consisting of questions 1320 from the computing facility 1418 and answers 1322 provided by the user 1314. The computing facility 1418 may then provide a decision 1310 to the user 1314 based on an aggregated feedback 1428 from the feedback from a plurality of users 1412. In embodiments, the computer facility 1418 may improve future questions 1320 and decisions 1310 provided by the computing facility 1418 based on receiving feedback 1412 from the user.

In embodiments, the present invention may help a user make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314, where the number of questions 1320 and answers 1322 provided through the dialog 1308 may determine the quality of the decision 1310. The machine learning facility 1318 may then provide a decision 1310 to the user based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user. In embodiments, the quality may be high when the number of questions 1320 and answers 1322 large, such as greater than 10 questions, greater than 15 questions, greater than 10 questions, and the like. In embodiments, the quality may be good quality when the number of questions 1320 and answers 1322 is small, such as less than 10 questions, less than 5 questions, less than 3 questions, one question, and the like.

Figure 15:
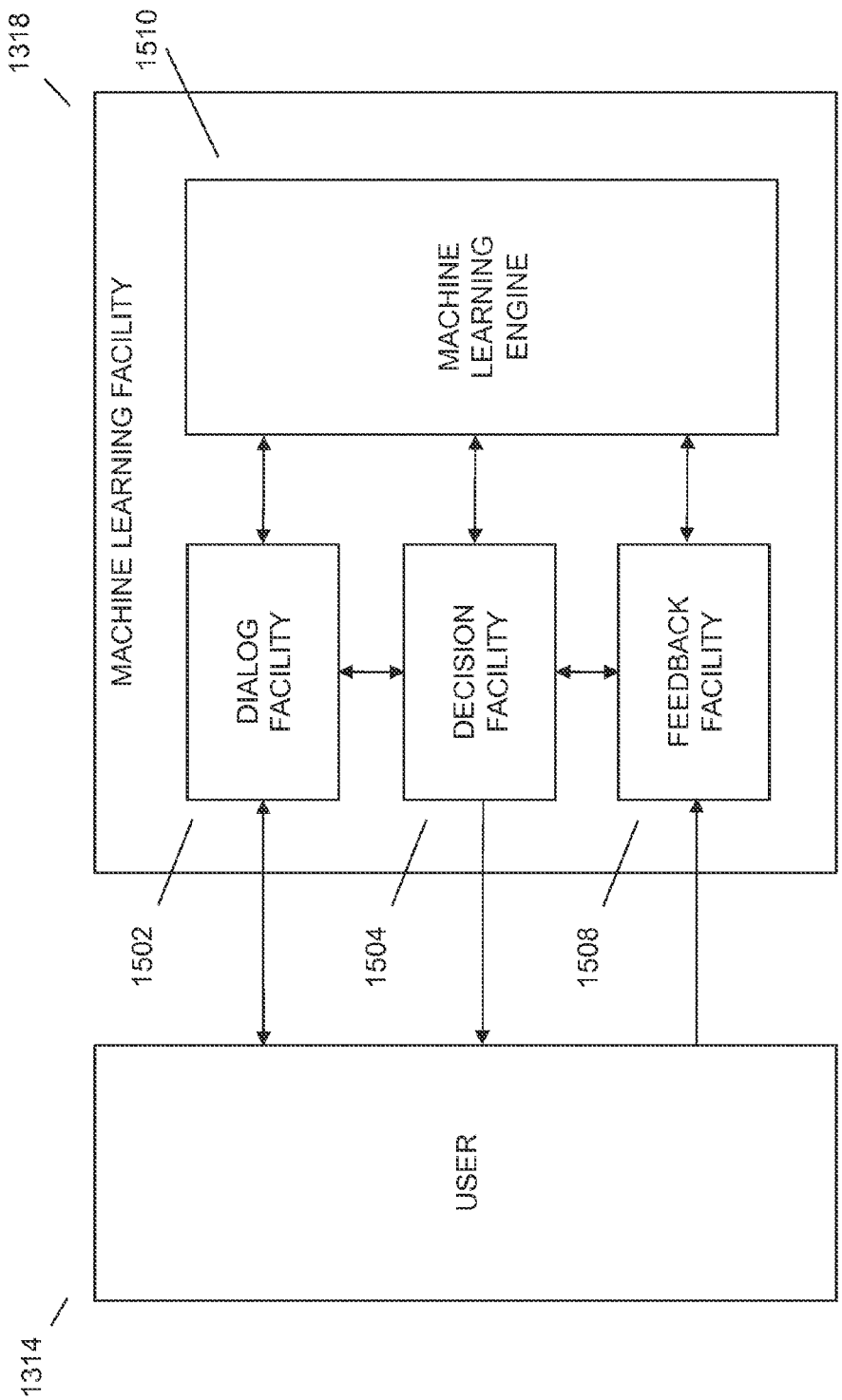
FIG. 15 depicts an embodiment of a block diagram for the present invention.

In embodiments, and as depicted in FIG. 15, the present invention may make a decision 1310 through the use of a machine learning facility 1318. The system may include a machine learning facility 1318 that may receive an initial question 1304 from the user 1314, a dialog facility 1502 within the machine learning facility 1318 providing the user 1314 with questions 1320 and accepting answers 1322 from the user, the machine learning facility 1318 providing a decision 1310 from a decision facility 1504 to the user 1314, and the like. In embodiments, the decision 1310 provided to the user 1314 may be based on the exchange of dialog 1308 between the user 1314 and the machine learning facility 1318, and pertain to the initial question 1304. Further, the machine learning facility 1318 may receive feedback 1312 through a feedback facility 1508 from the user 1314 to improve future questions 1320 and decisions 1310 provided by the machine learning facility 1318.

In embodiments, the present invention may help a user 1314 make a decision 1310 through the use of a machine learning facility 1318. The process may begin with an initial question 1304 being received by the machine learning facility 1318 from the user 1314 through a third party, such as a search application, a social network application, a service provider, a comparison shopping engine, a media company's web environment, and the like. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

In embodiments, the present invention may help a user 1314 make a decision 1310 through the use of a machine learning facility 1318. The process may begin with an initial question 1304 being received by the machine learning facility 1318 from the user 1314 through a third party search application, where the user 1314 begins with a keyword search on the third party search application and then is provided a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, where the decision 1310 may be provided back to the third party search application, such as in the form of a sorted list.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314, where the machine learning facility 1318 may utilize third party information, functions, utilities, and the like. The machine learning facility 1318 may then provide a decision 1310 to the user 1314 based on the dialog 1308 and pertaining to the initial question 1304, such as a recommendation, a diagnosis, a conclusion, advice, and the like. In embodiments, third party information, functions, utilities, and the like, may include an application programming interface (API) enabling the collection of cost information, product information, personal information, topical information, and the like.

In embodiments, the present invention may help a user 1314 make a decision 1310 through the use of a machine learning facility 1318. The process may begin with an initial question 1304 being received by the machine learning facility 1318 from the user 1314 through a third party search application, where the user 1314 begins with a keyword search on the third party search application and then is provided a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be provided back to the third party search application based at least in part on collaborative filtering.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide at least one image with the decision 1310 to the user 1314 based on the dialog 1308 and pertaining to the initial question 1304, such as a recommendation, a diagnosis, a conclusion, advice, and the like. In embodiments, the image may be a photograph, a drawing, a video image, an advertisement, and the like.

In embodiments, the present invention may help a user 1314 make a decision 1310 through the use of a machine learning facility 1318. The process may begin with an initial question 1304 being received by the machine learning facility 1318 from the user 1314. The user 13114 may then be provided with a dialog 1308 consisting of questions 1320 from the machine learning facility 1318 and answers 1322 provided by the user 1314 where the questions 11320 may be determined at least in part from learning from other users of the machine learning facility 1318. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based at least in part on learning from decisions 1310 provided by other users of the machine learning facility 1318.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based at least in part on collaborative filtering.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based at least in part on collaborative filtering whose context is provided through the dialog 1308, such as at least one question providing the context for the collaborative filtering.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based only on information gathered through a plurality of user 1314s of the machine learning facility 1318 and pertaining to the initial question 1304, where at least one of the plurality of user 1314s of the machine learning facility 1318 may be the user 1314 associated with the dialog 1308.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1118 may then provide a decision 1310 to the user 1314 based on the dialog 1308 and pertaining to the initial question 1304, and with limited initial machine learning facility 1318 knowledge on the subject matter of the initial question 1304. In embodiments, the limited initial machine learning facility 1318 knowledge may be seed knowledge, may be limited to basic knowledge associated with the subject matter of the initial question 1304, may be limited to basic knowledge associated with the subject matter of the initial question 1304 where the basic knowledge may be expert knowledge.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like, where the decision 1310 may be based on learning from a combination of expert and user inputs.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a category-based decision 1310 to the user 1314 based on the dialog 1308 and pertaining to the initial question 1304, such as a recommendation, a diagnosis, a conclusion, advice, and the like.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 where the machine learning facility 1318 may utilize responses from a plurality of user 1314s of the machine learning facility 1318 to categorize and provide decisions 1310 along at least one of psychographic and demographic dimensions.

In embodiments, the present invention may provide a user 1314 with a response through the use of a machine teaming facility 1318. The user 1314 may be provided with a dialog 1308 consisting of questions 1320 from the machine learning facility 1318 and answers 1322 provided by the user 1314, where the questions 1320 from the machine learning facility 1318 may be related to an application, such as an entertainment application, a drug discovery application, a baby name application, and the like. The machine learning facility 1318 may then provide the response to the user 1314 based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

In embodiments, the present invention may provide results based on multiple dimensions, such as a result based on a textual match from a user input, based on the user's taste profile, and the like. FIG. 27 shows an example search interface showing search results for the user query "fios". In this example, the rankings are based on first finding decisions and decision results (recommendations) that are a good textual match for the user query and then second ranking the decision results by the knowledge the system has about the user's taste profile. In this example, "fios" is a good textual match for the decision results "Verizon FIOS" as the recommendation to "Which ISP should I use" 2702 and "What US satellite/cable service provider should I get" 2704 and both are this users #1 ranked result based on the user's taste preferences.

In embodiments, the present invention may provide multiple question and answer 'results' in response to a user's unstructured input. For example, FIG. 28 shows a case where the user's query is 'suv'. The first result is for the topic 'What new car should I buy?' 2802 but with the question 'what type of car do you want?' already answered with 'suv'. This may provide a bridge between unstructured search and the structured Q&A data that the system stores. Further, as shown in the example, the user's top 3 results are displayed personalized based on their taste profiles. Effectively, the user has done a keyword search and gotten results without explicitly answering any questions via the traditional Q&A interface, such as for the other questions provided as examples shown, 'Which BMW should I buy?' 2804, 'What late model used car should I buy?' 2808, and 'What tires should I use on my car or truck?' 2810.

In embodiments, the present invention may ask the user to express their preferences when they have given answers to questions that either contradict each other, are mutually exclusive, or which each individually have a dramatic affect on the rankings of results for the user. For example, the user may start the "What new car should I buy" topic and answered that they want a SUV that is under $18,000 and is more practical than extravagant. The system may want to get the user's preference as to what is more important—that the vehicle be an SUV or under $18,000. FIG. 29 shows an example question to the user, asking for their preference.

In embodiments, the system may learn a set of question importances that are per-user, per-decision-result, per-question's-answer-per-decision-result, and the like. For example, the system may learn that user A cares more about weight than price when it comes to buying small cameras, but cares more about price than anything else when it comes to buying cars.

In embodiments, users may extend the system by adding new decision results. Those new decision results may optionally include links to web pages to read more about the decision result. The system may automatically convert those links to affiliate links such that the system receives commissions from the site that the link points to. Further, based on the link submitted by the user, the system may recognize what kind of link it is and understand how to parse out information such as price for products, such as from Amazon.com, or parse out product codes so that vendor-specific API calls can be made to look up product information based on the product codes.

In embodiments, users may be clustered into groups using dimension reduction techniques such as singular value decomposition (SVD), eigenvector, and other like based approaches. The system may display information about why a group of users were clustered together. One way to do this is to find the top X dimensions in the low-dimension space that the cluster as a whole differs most on from the population average. The divergence of the cluster's distribution of answers from the general populations distribution in each dimension in the sub-space may be used to rank dimensions in terms of how well they explain what is unique about each cluster.

In embodiments, the dimensions in the sub-space may not be easily described or interpreted due to their being composed of many different features such as how people answered questions or which decision results they like. One way to explain what each dimension means may be to find questions and answers that are most correlated with the different extremes of the dimension and label the dimension with these questions/answers.

In embodiments, one way to cluster users may be to pick an initial random grouping of users and iteratively move users between clusters to minimize how much users differ from each other in their own cluster. After some number of iterations the process may be stopped or the process may continue until a threshold amount of error has been reached.

In embodiments, the present invention may facilitate matching by user similarity. Given a username, email address, numeric user id, and the like, provide a list of other users who are similar or dissimilar in some way. For example, given a Facebook username provide a ranked list of other Facebook users who have similar tastes over all or in some specific way, such as in electronics. In addition, this list may be optionally restricted, such as to other users being one degree away in the social graph from the first user (e.g. rank my friends on Facebook by their similarity to me so that I can ask the one most like me a question). In embodiments, user similarity may be computed via asking a user questions about themselves, looking at their social graph, using context like their location, IP address, time, and the like. The social graph may be used by mapping users in the social graph to known users in other data sets based on heuristics on username, email address, first name, last name, birthday, address, sex, and other like information. Adjacent people may be searched in the social graph to bring more people into consideration even if they are more removed from the person you are trying to 'triangulate' in on. For example, combining a social graph from Facebook with users who have written reviews on Amazon to find users on Facebook who are most like me and then look at what laptops they tend to like on Amazon in order to give me a laptop recommendation. In another example, reviews may be filtered on a site such as Yelp, Tripadvisor, Amazon, and the like, based on people similar to you. This information may then be used to help the user, such as recommending users to "friend" on Facebook, to 'follow' on Twitter, and the like. FIGS. 30 and 31 provide examples of similarity profiles as may be provided by the present invention.

In embodiments, the present invention may provide a level of indirection between recommendations by instead recommending people who in turn like/dislike things. The present invention may recommend things to buy based on what similar users bought on Amazon, places to eat based on similar users on Yelp, Zagat, Foursquare, and the like, things to click on in Google search results based on what similar people clicked on, and the like. For example, consider the problem of recommending which users a new user to Twitter should follow. The present invention may look at all the users on Twitter and who follows them, and match some of those followers to the data set of the present invention knowing things about each user based on the questions they have answered about themselves. This could also match the followers to other users, such as Amazon users, Yelp users, and the like, to learn other things about them. Based on this, the present invention may make inferences about the followers of a particular user, such at a Twitter user. Now, a new user may be asked about themselves and find which existing user's followers this new user is most like. A recommendation may then be generated for the new Twitter user to follow the existing Twitter user whose followers are most like the new user.

In embodiments, the present invention may facilitate real-time personalization, such as making recommendations that immediately reflect new information from a user, immediately use their social graph, new facts about them, their context such as changing location etc. to re-rank recommendations or otherwise improve results.

In embodiments, the present invention may match based on context, such as location, time, weather, social graph, and the like, such as implicitly using location to show nearby places a user might like to eat, drink, sites they might like to see, things to do, etc. For example, this process may then be used in a mobile application that has access to location data via GPS. Optionally, the recommendation may be informed by other parts of the user's context, such as the current weather (e.g. don't recommend a place that people only like because of the patio if it's raining), current time (e.g. don't recommend nightclubs at 10 am), calendar (e.g. know when user is busy and where they have to be in the future), social graph (e.g. recommend places that the user's friends are at all else being equal), and the like.

In embodiments, the present invention may provide for a natural language question and answer interface, such as to allow freeform or structured input from a user about a decision or recommendation they want help with. The input may be categorized either by asking the user, having other users review the question, using automated techniques like natural language processing (i.e., "is this question about electronics, travel, cars or some other topic?"), and the like.

In embodiments, the present invention may find similar users to the requesting user who has expertise in the category of the question. For example, the user may want advice about hotels in L.A. from people who have similar taste in hotels AND know something about L.A. hotels (such as either self-described knowledge or demonstrated knowledge based on their actions). For example, the present invention may then alert those similar users to the new question and requesting their help in solving it. Consideration may be given to how many prior questions/alerts they have been sent, how many they have already responded to, how helpful their responses have been, and the like. Similar users may be allowed to engage in a dialog with the requesting user to help inform the requesting user's decision or recommendation problem. The resulting dialog may be stored for others to use and encourage the similar users to index the dialog into a structured form to aid later recall by other requesting users.

The present invention may provide third-party sites with the ability to learn about their users, finding similar users, and making recommendations, such as independently of direct user interaction with the system. In embodiments, the present invention may provide a taste and preference API that third parties, such as third parties hosting their own web sites, may use to learn about the tastes, preferences, likes, dislikes, and other attributes of a user, where the user is not engaged in a dialog or interacting directly with the computing facility of the present invention. For example, a user may go to a website such as Amazon.com and make an inquiry about a product. In this instance, Amazon may have an API of the present invention that enables the creation or enhancement of a taste and preference profile of a user so as to better determine the user's tastes, preferences, and the like, and so enable the third-party to better target meaningful responses back to the user with regard to the user inquiry. In embodiments, the third-party may use the API to determine the tastes, preferences, and the like of the user without user interaction, such as by determining their tastes and preferences through previous interactions with the user, where these previous interactions may be from previous interactions while on the third-party site, such as Amazon in this example, or from previous interactions with other websites hosting a similar API or through direct interaction with a facility of the present invention. In embodiments, the API may be used by a plurality of users such that interactions with the users may be used to identify other similar users, and so use the choices, decisions, selection, recommendations, and the like, of these other similar users to aid in the selection of recommendations to the present user. In embodiments, these other similar users may be associated with the third-party hosting the API, or from another host API site, or from a facility of the present invention. In embodiments, the use of an API of the present invention hosted by a third-party site may provide a significant advantage to the third-party site with regard to recommendations that are relevant to the tastes, preferences, likes, dislikes, attributes, and the like, of the user.

In embodiments, tastes and preferences of a user may be determined or augmented though other users, such as other similar users, other users that are connected to the user in a social network, other users that are associated through a personal or professional activity, other users that are friends or family, and the like. In embodiments, this may be done without the need to ask questions of the user. For instance, a user may have an existing taste and preference profile as established through the present invention, and that profile may be improved by collecting or inferring information about other users in their social network, family, place of business, and the like. In embodiments, the user's profile may be improved through inferring additional tastes and preferences from other similar users, or users shown to have some connection to the user, such as through a social network. In embodiments, the user's profile may be improved through choices made by other similar users, such as in a product selection, recommendation, and the like. In embodiments, the system may learn about a known user's taste profile though their rating things they like and don't like, or through the use of natural language processing, such as inferring a taste profile by analyzing how the user tags their user profile.

Referring to FIG. 32, in embodiments the present invention may provide for a computer program product embodied in a computer readable medium that, when executing on one or more computers, helps a third-party website to learn about a user through the use of a computer facility 3202 by performing the steps of: (1) providing a user preference learning API to the third-party website 3220 to determine preferences of the user 3218 as applied to a market of the third-party, wherein the preference learning API is executing as an extension of the computer facility 3204; (2) receiving third-party information related to the market of the third-party 3208; (3) collecting the preferences of the user 3218 and storing them as a user preference profile 3210; (4) receiving a query from the user at the third-party website 3220 associated with the market of the third-party 3212; and (5) supplying a recommendation to the third-party based on the user preference profile and the third-party information to aid the third-party in the answering of the received query 3214. In embodiments, the determining preferences may be through the use of natural language processing. The computing facility may be a machine learning facility. The third-party information may consist of at least one of product information from product manufacturers, product information from web merchants, pricing information from other websites, availability information from other websites, pricing information from merchants, availability information from merchants, a review, comments, and ratings. The preference learning API may enable the collection of at least one of cost information, product information, personal information, and topical information. Further, user profile preferences may be additionally based on information inferred from a user's social network, where the user may not receive additional dialog between the user and the computer facility.

Figure 33:
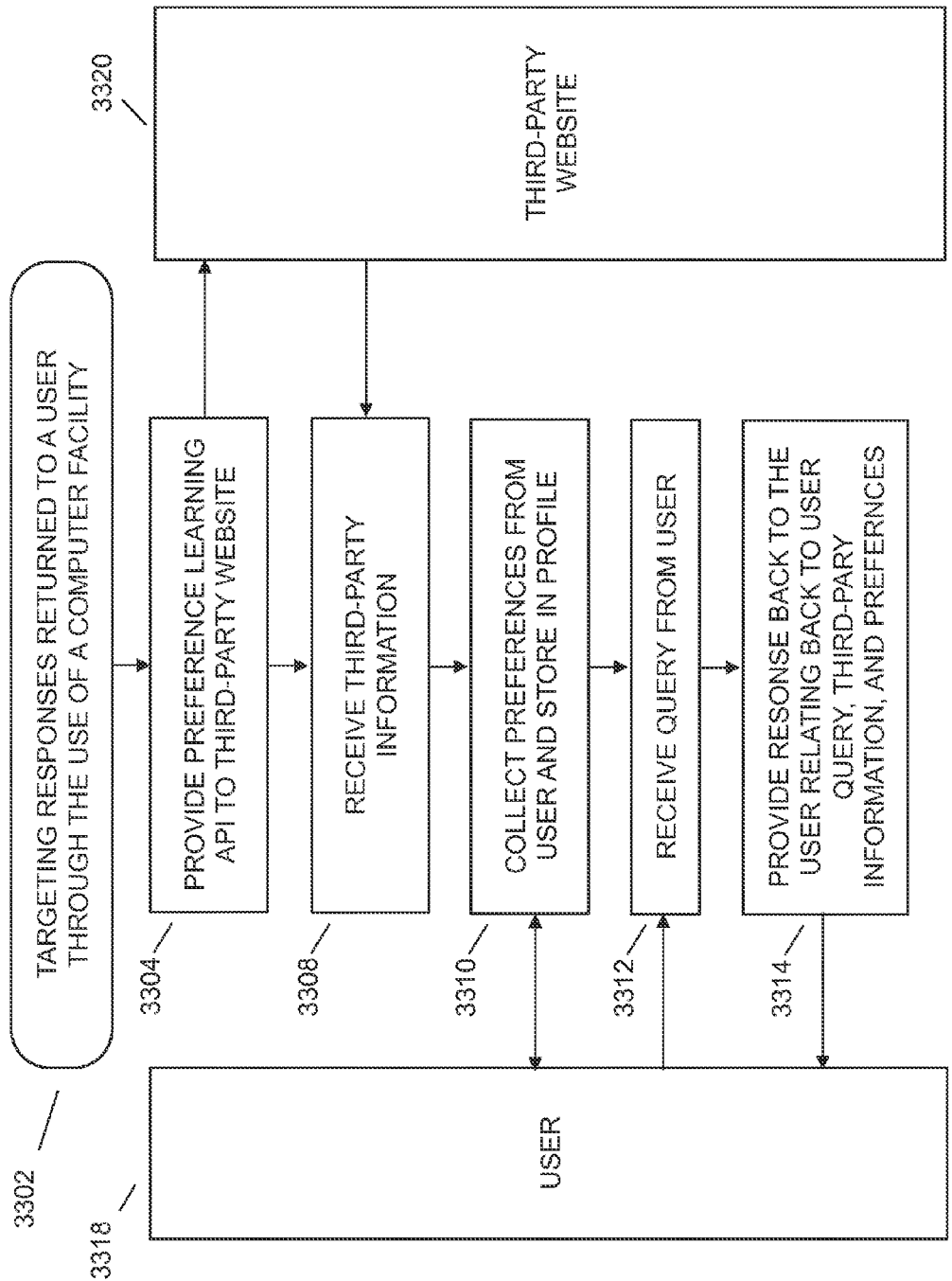
FIG. 33 depicts an embodiment for using a third-party API to help learn about a user and to target responses returned to the user from a user query.

Referring to FIG. 33, the present invention may provide for the use of a taste and preference API to target responses returned to a user, such as for targeting advertising, show reviews from similar users, recommend products or services, show similar people on social networks, to rank search results based on which results similar users clicked on most, and the like. In embodiments, the present invention may provide for a computer program product embodied in a computer readable medium that, when executing on one or more computers, helps target responses returned to a user through the use of a computer facility 3302 by performing the steps of: (1) providing a user preference learning API to a third-party website 3320 to determine preferences of a user as related to a market of a third-party, wherein the preference learning API is executing as an extension of the computer facility 3304; (2) receiving third-party information related to the market of the third-party 3308; (3) collecting the preferences of the user 3318 and storing them as a user preference profile 3310; (4) receiving a query from the user 3318 at the third-party website 3312; and (5) using in the user preference learning API the third-party information related to the market of the third-party, and the preferences of the user 3318 as stored in the user preference profile to provide a response back to the user that relates to the query from the user 3314. In embodiments, the computing facility may be a machine learning facility.

The response may be providing an advertisement to the user, where the advertisement may be based on the preferences of the user as stored in the user preference profile. The advertisement is provided by the computer facility, provided through the third-party and enabled through preferences provided to the third-party from the computer facility, delivered to other users in a user's social network, and the like. The response may provide a recommendation of a product, service, and the like related to the market of the third-party. Collecting the preferences of at least a second user may form a user preference profile for the second user, determining the second user to be similar to the user based on a comparison of preference profiles. The response may be providing a recommendation made by the second user. The collecting of preferences for the second user may be taken from an internet based social construct, and the response provides information to the user that shows the second user as a similar person on the construct, where the internet based social construct may be a social network. The collecting of preferences for the at least second user may include search result selections, the query may be a search request, and the response may be a search result ranked according to the search result selections of the at least second user. The collecting may be from recommendations, purchases, and search result choices made by the user. The collecting may be from sources that reveal location behaviors of the user. The source may be a user location information, such as from the web services foursquare, yelp, Google, Gowalla, Facebook, and the like. The source may be user location information from a service provider. The third-party information may consist of at least one of product information from product manufacturers, product information from web merchants, pricing information from other websites, availability information from other websites, pricing information from merchants, availability information from merchants, a review, comments, and ratings. The determining preferences may be through the use of natural language processing. The API may enable the collection of cost information, product information, personal information, topical information, and the like. The collecting may be from a user's interactions as represented in an Internet based social interactive construct, where the internet based social interactive construct may be a social network. The response may be a list of reviews sorted by a review author's similarity to the user reading the reviews. Collecting the preferences of the user may be through third party websites. The collecting may be through crawling third party websites.

In embodiments, the present invention may utilize a taste and preference API that third parties may use to target advertising to a user based on the user's (preferences, where the user is not engaged in a dialog or interacting directly with the computing facility of the present invention. For instance, a user may have previously undergone a dialog of questions and answers with the system, and through that dialog the system may have developed a taste and preference profile for the user. In embodiments, the dialog may have been provided directly with a facility of the present invention, or through a third-party API provided by the present invention. Alternately, the user may have never interacted with a facility of the present invention, where the user's taste and preference profile may be created and updated through the user's interactions, responses, recommendations, reviews, and the like. In embodiments, the system may learn about a known user's taste profile though their rating things they like and don't like, or through the use of natural language processing, such as inferring a taste profile by analyzing how the user tags their user profile. The taste and preference profile for the user may then be used to target advertising to the user, such as advertising that is matched to the user's tastes and preferences. For example, a third-party taste and preference API may be associated with an outdoor store website, such as L.L. Bean, REI, EMS, and the like, where the outdoor store is trying to improve their targeting of advertising to their customers. A customer may then visit the outdoor store website and make a query for a product, such as for hiking boots. The taste and (preference API may then enable a look up of the user's tastes and preference in order to establish a match for an advertisement placement to the user's browser. In this example, the user's taste and preference profile may indicate that the user enjoys traveling to New England, likes to camp, has a family with children, and the like. As a result, the advertisement facility associated with the website may select an advertisement that utilizes the information in the user query, in this instance hiking boots, and information from their taste and preference profile. An advertisement in this case may be for lodging in the White Mountains, which combines the user's hiking boot query with their preference for travel in New England. Further, the lodging may be a family lodging because of the user likes to travel as a family, and with attributes that mirror the user's preferences. In embodiments, the third-party taste and preference API may enable a third-party to improve their targeting of advertisements to users such that they are able to increase revenue made on a given advertisement placement from an advertisement sponsor. In embodiments, the user taste and preference profile may be developed in real-time as focused on their immediate query. Tastes and preferences may be gleaned so as to better target advertisements to the user, such as during subsequent refinement of product search, at the point of purchase, and the like.

In embodiments, advertising may be targeted to a user or a group of individuals associated with the user based on taste and preferences inferred though the user's social network. For instance, a taste and preference API used by a third-party may be used to establish taste and preferences for a group, node cluster, and the like, such as in a user's social network. In embodiments, the tastes and preferences inferred from the social network may utilize taste and preference profiles previously formed, such as though third part sites or through a facility directly associated with the present invention. These taste and preferences may then be used to better target advertisements to the user or to members of the user's social network. In an example, a third-party may want to target advertisement to a user, where the user has an established taste and preference profile stored in a facility of the present invention. The third-party may then use information in the user's profile to target advertisements. Alternately, the third-party may additionally use information inferred from a social network that the user is part of, such as information pertaining to the topics of the social network, common interests of users associated with the user in the social network, and the like. For instance, the user may have a taste and preference profile that indicates they are middle aged, politically conservative, rural, and the like, and is associated with users in a social network that have hunting as a dominate interest. In this instance, the third-party may target advertisements for hunting equipment, hunting trips, and the like, where the advertisement has been selected based on the users existing taste and preference profile plus inferences from the user's social network. In embodiments, this may be done without the need to engage the user in a dialog as described herein, but rather indirectly through the user's interactions, such as on the third-party website, through third-party supplied information, on other websites where the present invention has a third-party API, and the like. In embodiments, the third-party may also utilize the taste and preferences from the user to target advertisements to other members of the user's social network.

In embodiments, advertising to a user may be targeted based on the product choices, recommendations, and the like, of users with similar tastes and preferences. For example, a first user may have similar tastes and preferences to a second user, where the first user has an existing taste and preference profile and has made certain product choices, recommendations, and the like. Advertisements may then be targeted to the second user based on the decisions of the first user. For example, a first user may have a profile that indicates they are older, retired, lives in California, enjoys travel, and the like, where they have previously made a product choice for luggage. A second user may then be provided a recommendation for similar luggage based on the similarity of the tastes and preferences of two users. In embodiments, this may be executed without the need to engage either of the users in a dialog.

In embodiments, the present invention may provide for a computer program product embodied in a computer readable medium that, when executing on one or more computers, helps target advertising to a user through the use of a computer facility by performing the steps of: (1) providing a user preference learning API to a third-party website to determine preferences of the user as applied to a market of a third-party, wherein the preference learning API is executing as an extension of the computer facility; (2) receiving third-party information related to the market of the third-party; (3) collecting the preferences of the user and store them as a user preference profile; (4) receiving a query from the user at the third-party website associated with the market of the third-party; and (5) providing an advertisement to the user, wherein the advertisement is based on the ascertained preferences of the user. In embodiments, the determining preferences may be through the use of natural language processing. The advertisement may be provided by the computer facility. The advertisement may be provided through the third-party and enabled through preferences provided to the third-party from the computer facility. The API may enable the collection of at least one of cost information, product information, personal information, and topical information. The decision may be also based on information inferred from a user's social network. An advertisement may be delivered to other users associated with the user, such as through a social network.

In embodiments, the present invention may provide a taste and preference API that third parties may use to provide users with reviews from similar users, where the user and similar users may not have engaged in a dialog or interacting directly with the computing facility of the present invention. For instance, the taste and preference API may enable the present invention to collect taste and preference information for the user, provide the third-party with taste and preference information for the user from a previously established taste and preference profile, provide the third-party with taste and preference information for the user based on near-term actions of the user, and the like. In embodiments, the user may have never interacted with a facility of the present invention, where a user's taste and preference profile may be created and updated through the user's interactions, responses, recommendations, reviews, and the like. In embodiments, the system may learn about a known user's taste profile though their rating things they like and don't like, or through the use of natural language processing, such as inferring a taste profile by analyzing how the user tags their user profile. In this case, similar users may have a previously established taste and preference profile, and as such may have a taste and preference profile that may be matched to the user. In addition, these similar users may have reviews associated with their profile. The system may now match the user to a similar user, and then provide the user with the associated review. For instance, a user may have an existing taste and preference profile with the system, such as directly with the computer facility or though at least one third-party API, and may want to know what other similar users thought of some product, service, person, event, and the like. The system may then search the taste and preference profiles for similar users on the subject the present user has interest in. In this way, the system may now be able to provide reviews and such to the present user from similar users, and thus helping the present user determine what they may want to do based on their tastes and preferences. For example, a user may go to a product website that utilizes the taste and preference API of the present invention, and is interested in reviews for digital cameras. The third-party may now find similar users, and then search for digital camera reviews by those similar users and provide the reviews to the current user. In embodiments, the reviews may be resident at a third-party facility, at another third-party facility, at a facility of the present invention, and the like. In embodiments, the ability to show reviews of similar users may allow the user to access more relevant reviews in a more time efficient manner, and the third-party user of the API may be able to provide more targeted and relevant support to their users.

In embodiments, the present invention may provide a taste and preference API that third parties may use to provide users with reviews from similar users, where the users are determined to be similar without the similar users participating in a dialog through the present invention. For instance, the similar user may be identified as being similar through a social network, friend, family, work, and the like. In an example, a user may be associated with a second user though a social network, and through this association, determined to be 'similar', such as though age, interests, and the like. The similar user may then provide a review, such as for a product, an activity, and the like. This review may then be provided to the user as relevant though the similarity to the other user. In embodiments, similar users may be determined through similar recommendations on other topics, such as in combination with other factors, where the other factors may be a social association.

In embodiments, the present invention may provide for a computer program product embodied in a computer readable medium that, when executing on one or more computers, helps a user find reviews of similar users through the use of a computer facility by performing the steps of: (1) providing a user preference learning API to a third-party website to determine preferences of the user, wherein the preference learning API is executing as an extension of the computer facility; (2) collecting preferences of a plurality of users, wherein the plurality of users includes the user, (3) storing the preferences of the user in a taste and preference database which contains a plurality of taste and preference profiles; (4) receiving a request from the user through a third-party taste and preference learning API for a topical review from a user who has similar taste and preferences; (5) matching the preferences of the user to at least one other user's preference in the taste and preference database; (6) searching for a review related to the request for the topical review from amongst the matched other users; and (7) providing the review to the user. In embodiments, the determining preferences may be through the use of natural language processing. The review may be found within the computer facility, a facility of the third-party, and the like. The computing facility may be a machine learning facility. The preference learning API may enable the collection of cost information, product information, personal information, topical information and the like. The review may be provided by a similar user that has no taste and preference profile, where the user may be similar as determined though a social association, where the social association may be a social network.

In embodiments, the present invention may provide a taste and preference API that third parties may use to recommend products, services, and the like. For instance, a user may come to a third-party website in search of a recommendation for a product, and the third-party may then utilize the taste and preference API to better understand what the user typically prefers, and from that preference, suggest a product. In an example, the user may come to an audio store website looking for a recommendation for an audio system for playing music from their iPhone. The third-party may then utilize existing taste and preferences for the user through the API. In this example, the tastes and preferences of the user may indicate that they are a collage student and often on the run in their social life. From this information, the third-party may now make recommendations, such as recommendations for audio systems that are portable, small, powerful, and the like. Alternately, the third-party may use the taste and preference API to determine their taste and preferences at the time of the user inquiry, such as targeted to the inquiry, content of the third-party, for the user in general, and the like. The third-party may use this new taste and preference information alone, or in combination with previous tastes and preference profiles through the present invention, to make the recommendations. The taste and preferences as established through the third-party may now be stored in a facility of the present invention, such as to be used again or in combination with new taste and preference profiles generated through other third-party APIs or directly through a facility of the present invention. In embodiments, the ability to use the taste and preference API may improve the recommendations for products, services, and the like that are made through third-party sites.

In embodiments, the present invention may provide a taste and preference API that third parties may use to recommend products, services, and the like, to a user based on the actions of similar users. For instance, two users may have previously established taste and preference profiles with the present invention, where one of the users has selected a product, service, or the like, and where third-party may now provide a recommendation to the other user based on their similarity, such as determined through their profiles. In an example, two users may have been determined to be similar through their taste and preference profiles, such as by their age, location, political views, social activities, and the like. The first user may then select a product, such as a car. In the event that the second similar user should indicate an interest in a car, such as through searching, advertisement selection, explicit question to the present invention, and the like, the present invention may provide the car selection to the second user as a potential fit because of their similarities. In embodiments, this may be done without a dialog provided to one or both users.

In embodiments, the present invention may provide for a computer program product embodied in a computer readable medium that, when executing on one or more computers, helps a user find a recommendation through the use of a computer facility by performing the steps of: (1) providing a user preference learning API to a third-party website to determine preferences of the user as applied to the products and services of the third-party, wherein the preference learning API is executing as an extension of the computer facility; (2) receiving third-party information related to the products and services of the third-party; (3) collecting the preferences of the user and storing them as a user preference profile, wherein the source of the collecting is from user interactions on the Internet; (4) receiving a query from the user at the third-party website associated with at least one of products and services of the third-party; and (5) providing a recommendation for at least one of the product and service to the user from the computing facility, wherein the recommendation is based on the query and the ascertained preferences of the user. In embodiments, the determining of preferences may be through the use of natural language processing. The collecting may be from the third-party website on the Internet; a plurality of third-party websites on the Internet; at least one of recommendations, purchases, and search result choices made by the user; and the like. The computing facility may be a machine learning facility. The third-party information may consist of product information from product manufacturers, product information from web merchants, pricing information from other websites, availability information from other websites, pricing information from merchants, availability information from merchants, a review, comments, ratings, and the like. The API may enable the collection of cost information, product information, personal information, topical information, and the like. The preferences may be derived from an action of a second similar user, where the similarity may be determined through a taste and preference profile for the user and second similar user. The action of a second similar user may be a selection of at least one of product and service.

In embodiments, the present invention may provide a taste and preference API that third-party social network sites may use to show a user people that are similar to them on the social network. These similar people may be shown as a list, as photos, by region, by age, by gender, and the like. For instance, the user may come to a social network site and ask to see or be connected to people who are similar to them. The social network site may then utilize the taste and preference API to provide the user with a dialog to determine their tastes and preferences, such as in general, to social situations, to social networking, to activities, to music, to personality, and the like. Alternately, the user may already have a taste and preferences profile as determined directly by a facility of the present invention, through another third-party API, though the social network site, and the like. The social network may then use this information to match the user to other people on the social network, such as through taste and preference profiles of the other people as previously determined, through information available about the other people as available through the social network, and the like. For example, the user's taste and preference may indicate that they are young and enjoy going to clubs in the NYC. The social networking site may now be able to match the user to similar people on the social network, such as by list, photograph, by category, by region of the city, and the like. In embodiments, the taste and preference API with a social network may provide an enhanced matching experience to the user who is trying to find other similar people to be social with.

In embodiments, the present invention may provide for a computer program product embodied in a computer readable medium that, when executing on one or more computers, helps a user find other similar users on a social networking site through the use of a computer facility by performing the steps of: (1) receiving an initial request from a user through a third-party social networking site API, wherein the initial request is to find other similar users to them on the social network; (2) ascertaining preferences of the user through the social networking site API; (3) matching the user preferences to other users on the social network with users with similar preferences; and (4) providing a matching result to the user that includes the other users that match user's preference. In embodiments, the ascertaining of preferences may be through the use of natural language processing. The matching result may be presented to the user as a list of the similar users. The matching result may be presented to the user as a profile of the similar users. The matching result may be presented to the user as links to the similar users within the social network. The computing facility may be a machine learning facility.

In embodiments, the present invention may provide a taste and preference API that third-party searching facilities may use to rank search results based on which results similar users selected the most. For instance, the searching facility may offer users the opportunity to improve the relevancy of how the search results are listed through a tastes and preference profile, as provided through the taste and preference API of the present invention. A taste and preference profile database or the like may then be accumulated and maintained, from which the searching facility may rank search results for the user to previously selected results by other similar users. In an example, a user may have a taste and preference profile that shows a retired male who likes to sail and is a bit adventurous. When the user searches for Caribbean vacation destinations the searching facility may rank the search results with these taste and preference attributes listed first, such as for sailboat rental packages in the islands, hiking in the islands, off-beat destinations, and the like. In embodiments, the use of a taste and preference API provided to a searching facility may improve the relevancy of ranked search results to the user.

In embodiments, the present invention may provide for a computer program product embodied in a computer readable medium that, when executing on one or more computers, helps rank search results through the use of a computer facility by performing the steps of: (1) receiving a search request from a user through a third-party searching facility; (2) ascertaining preferences of the user, wherein the ascertained preferences from the user creates a taste and preference profile for the user and is stored in a taste and preference storage facility which includes a plurality of other user taste and preference profiles, where the profiles also contain a history of search results selected by the other users in previous searches; (3) matching the user to other users with similar taste and preference profiles; (4) determining a search result set for the user's search request; (5) matching the search result set to the history of search results selected by the other users with similar taste and preference profiles; and (6) providing the search results to the user, wherein the search results are ranked according to the matched results selected by the other users with similar taste and preference profiles. In embodiments, the ascertaining of preferences may be through the use of natural language processing. The computing facility may be a machine learning facility. The searching facility may be a search engine.

Figure 34:
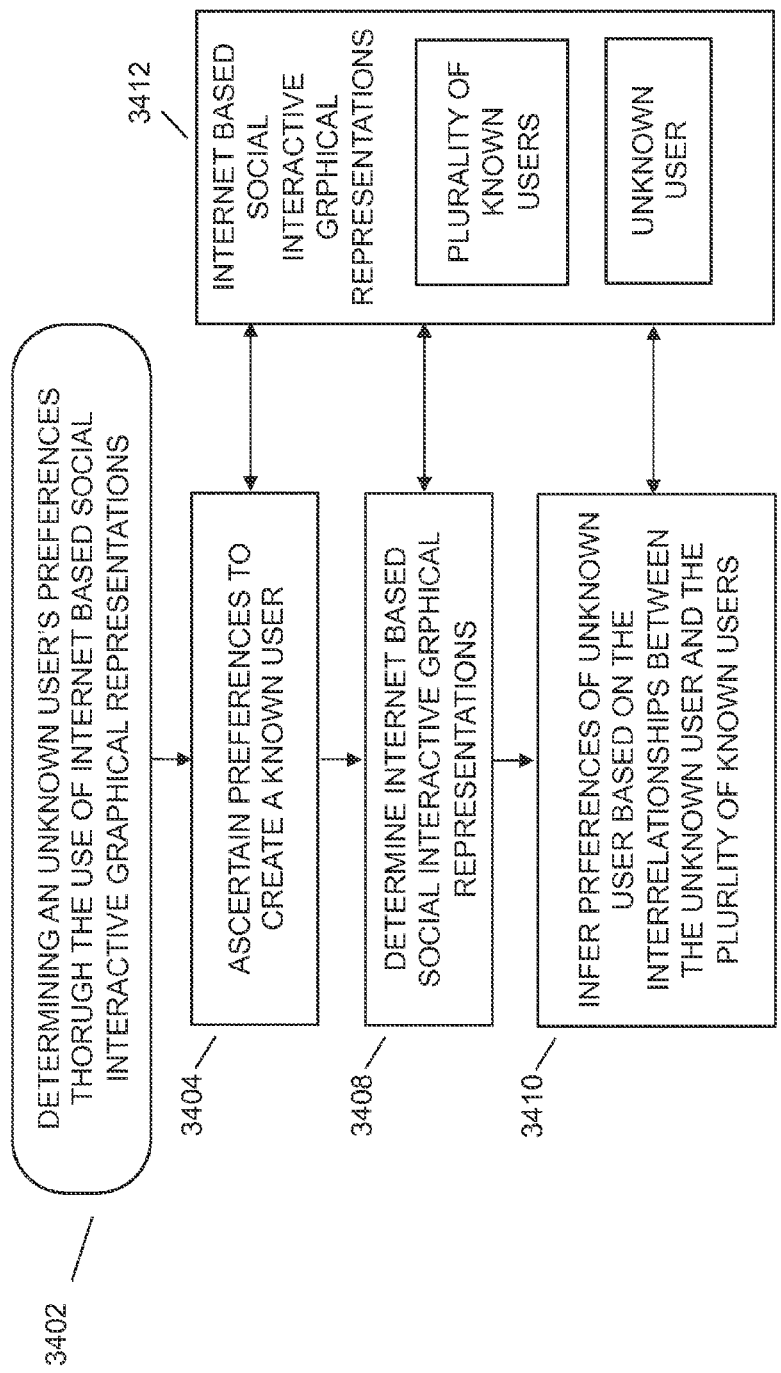
FIG. 34 depicts an embodiment for determining an unknown user's preferences through the use of Internet social interactive graphical representations.

Referring to FIG. 34, the present invention may utilize social graphs to infer the taste and preferences for an unknown user by finding paths through an Internet based social interactive construct to people with known taste preferences. In this way, the present invention may provide a way to get data for a user that the system has never heard of before. In embodiments, the present invention may provide for a computer program product embodied in a computer readable medium that, when executing on one or more computers, helps determine an unknown user's preferences through the use of internet based social interactive graphical representations on a computer facility 3402 by performing the steps of: (1) ascertaining preferences of a plurality of users who are part of an internet based social interactive construct, wherein the plurality of users become a plurality of known users 3404; (2) determining the internet based social interactive graphical representation 3412 for the plurality of known users 3408; and (3) inferring the preferences of an unknown user present in the internet based social interactive graphical representation 3412 of the plurality of known users based on the interrelationships between the unknown user and the plurality of known users within the graphical representation 3410. In embodiments, the Internet based social interactive graphical representation may be a social network, a social graph, a social diagram, and the like. The unknown user may be three degrees, five degrees, and the like away from the closest known user in the internet based social interactive graphical representation. The inferred preferences of the unknown user may make the unknown user a new known user, and the new known user may be used to contribute to the inferring of the preferences of a second unknown user. The preferences may include personal information, topical information, and the like related to interactions of the user, where the interactions may be through the interact based social interactive graphical representation. The interactions may be through an API provided to a third-party website. The inferring may be provided in conjunction with other known users that are related to the user in the user's internet based social interactive construct. The ascertaining of preferences may be through the use of natural language processing. The computing facility may be a machine learning facility. The inferred preferences may be used to target advertising to the unknown user, to share reviews with the unknown user. The inferred preferences may be used to recommend products, services, and the like to the unknown user. The inferred preferences may be used to aid in ranking search results for the unknown user. Known users that are in close proximity to the unknown user may carry more weight in an inferring algorithm. The inferred preferences may be refined by information from other sources, where the other sources may include third party sources, recommendations made by the plurality of known users, search queries by the plurality of known users, search result selections one of the plurality of known users, personal tastes as determined through web interactions by at least one of the plurality of known users, and the like. The other sources may include a third-party preference learning API.

In embodiments, the present invention may utilize social network graphs, diagrams, graphical representations, and the like, to infer the taste and preferences for an unknown user by finding paths through a social network to people with known taste, or visa versa. Social diagrams are, generally speaking, the mapping of a plurality of users and how they are related. By using the social diagram, a taste and preference of a known and unknown user may be determined from their interrelation within the diagram. For instance, a user with a known taste and preference profile may be directly associated with a plurality other users, such as represented in a social diagram. To a first approximation, it may be assumed that these plurality of other users are similar to the user, and so have similar taste and preferences. These other users may then be provided refined services that take advantage of knowing a users' taste and preference, such as described herein. For example, provided with a user with a known taste and preference profile indicating they are a rock climber, it may be assumed that users within a first link of the user's social diagram are also rock climbers. In reality, this may prove to be too general an assumption. However, it may be a good assumption that the user does have associations with other rock climbers, and so the system may go out through the social diagram searching for other known users that enjoy rock climbing. In this example, it may be found there is another known user, such as three links away, that also enjoys rock climbing, and this user is found in a cluster that connects to the first user. From this it may be a good assumption that this cluster is a group of rock climbers, and rock climbers may all share a set of similar tastes and preferences with each other. In embodiments, tastes and preferences may be inferred from associations within a social network diagram, and as such, may be provided benefits from the present invention as described herein.

In embodiments, the present invention may provide for a computer program product embodied in a computer readable medium that, when executing on one or more computers, helps determine an unknown user's tastes and preference through the use of social network graphical representations on a computer facility by performing the steps of: (1) ascertaining preferences of the user, wherein the user becomes a known user; (2) determine the social network graphical representation for the known user; (3) determine the presence to other known users within the known user's social network graphical representation; and (4) infer the preferences of an unknown user present in the known user's social network graphical representation based on the interrelationships between the unknown user and the known user and other known users within the network graphical representation. In embodiments, the ascertaining of preferences may be through the use of natural language processing. The social network graphical representation may be a social graph, asocial diagram, and the like. The computing facility may be a machine learning facility.

In embodiments, the present invention may combine the tastes and preferences of a user as determined through two or more third-party API to improve recommendations provided through the two or more third-party API. For instance, there may be taste and preference profiles being established through more than a single third-party API, and by combining these different tastes and preference profiles by the present invention, a combined taste and preference profile may be generated. Further, as additional taste and preference profiles are created through third-party API, they may be used to continuously update the combined taste and preference profile for a user. The third parties may then utilize the combined taste and preference profile to improve their recommendations. This may especially be the case when different third parties focus taste and preference profiling on different areas, such as products, personal relationships, services, celebrities, and the like. It can be appreciated that combining a number of more specific profiles into a combined profile may provide a richer taste and preference profile then could be generated through any one of the more specific profiles. In addition, a user may change their tastes and preferences over time, and so combining more recent user profile interactions on one third-party API may benefit another third-party that the user has not interacted with in recent time, but where the other third-party wants to keep their user profiles up to date.

Figure 35:
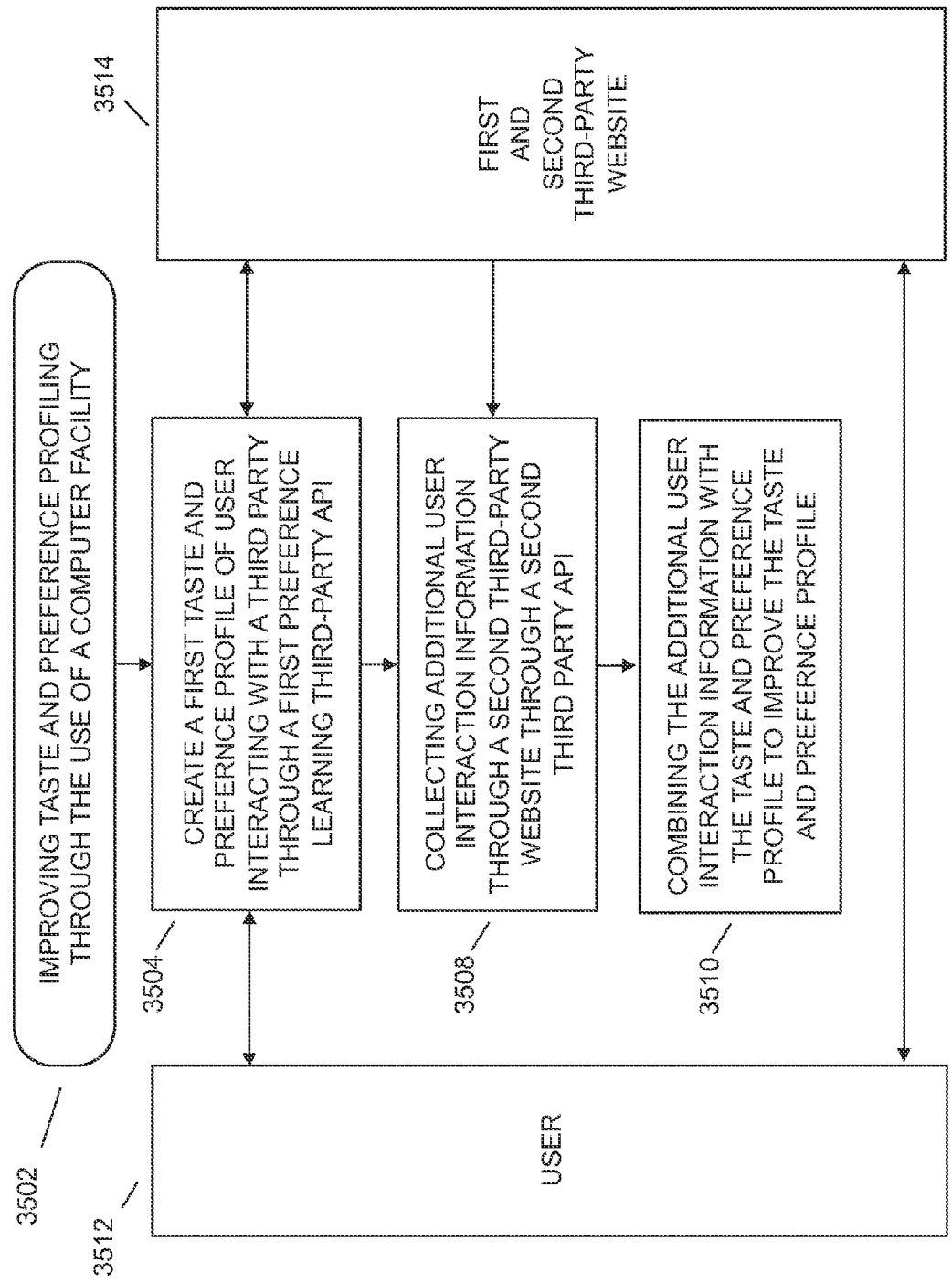
FIG. 35 depicts an embodiment for the improvement of user taste and preference profiling.

Referring to FIG. 35, in embodiments the present invention may provide for a computer program product embodied in a computer readable medium that, when executing on one or more computers, provides improved taste and preference profiling through the use of a computer facility 3502 by performing the steps of: (1) creating a first taste and preference profile of a user 3512 through the user's interactions with a first third-party website 3514 through a first preference learning third-party API 3504; (2) collecting additional user interaction information through a second third-party website 3514 through a second third-party API 3508; and (3) combining the additional user interaction information with the taste and preference profile to improve the taste and preference profile 3510. In embodiments, creating a first taste and preference profile may be through the ascertaining of user preferences through the use of natural language processing. The computing facility may be a machine learning facility. The API may enable the collection of at least one of cost information, product information, personal information, and topical information.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method comprising:
comparing a first user preference profile of a first user of an online social network and a second user preference profile of a second user of an online social network, the first user preference profile indicating preferences of the first user and the second user preference profile indicating preferences of the second user;
determining, one or more hardware processors, that the second user is similar to the first user, based on the comparison;
notifying the first user that the second user is similar to the first user; and
prompting the first user to connect to the second user via the online social network.

2. The method of claim 1, further comprising:
identifying the preferences of the first user; and
generating the first user preference profile indicating the preferences of the first user.

3. The method of claim 2, wherein the preferences of the first user are identified based on search result selections of the first user.

4. The method of claim 2, wherein the preferences of the first user are identified by analyzing user actions of the first user on the online social network.

5. The method of claim 2, wherein the preferences of the first user are identified by crawling, from a third party website, information describing the preferences of the first user.

6. The method of claim 1, further comprising:
determining a plurality of users on the online social network similar to the first user;
generating a ranked list of the plurality of users, based on a degree of similarity between each of the users and the first user; and
providing the ranked list to the first user.

7. The method of claim 6, further comprising:
prompting the first user to connect to one of more of the users via the online social network.

8. The method of claim 6, wherein the plurality of users are restricted to users that are connected to the particular user via the online social network.

9. A system comprising:
a recommendation module, comprising one or more hardware processors, configured to:
compare a first user preference profile of a first user of an online social network and a second user preference profile of a second user of an online social network, the first user preference profile indicating preferences of the first user and the second user preference profile indicating preferences of the second user;
determine that the second user is similar to the first user, based on the comparison;
notify the first user that the second user is similar to the first user; and
prompt the first user to connect to the second user via the online social network.

10. The system of claim 9, wherein the recommendation module is further configured to:
identify the preferences of the first user; and
generate the first user preference profile indicating the preferences of the first user.

11. The system of claim 10, wherein the preferences of the first user are identified based on search result selections of the first user.

12. The system of claim 10, wherein the preferences of the first user are identified by analyzing user actions of the first user on the online social network.

13. The system of claim 10, wherein the preferences of the first user are identified by crawling, from a third party website, information describing the preferences of the first user.

14. The system of claim 9, wherein the recommendation module is further configured to:
determine a plurality of users on the online social network similar to the first user;
generate a ranked list of the plurality of users, based on a degree of similarity between each of the users and the first user; and
provide the ranked list to the first user.

15. The system of claim 14, wherein the recommendation module is further configured to:
prompt the first user to connect to one of more of the users via the online social network.

16. The system of claim 14, wherein the plurality of users are restricted to users that are connected to the particular user via the online social network.

17. A non-transitory machine-readable storage medium comprising instructions that, when executed by one or more processors of a machine, cause the machine to perform operations comprising:
comparing a first user preference profile of a first user of an online social network and a second user preference profile of a second user of an online social network, the first user preference profile indicating preferences of the first user and the second user preference profile indicating preferences of the second user;
determining that the second user is similar to the first user, based on the comparison;

notifying the first user that the second user is similar to the first user; and prompting the first user to connect to the second user via the online social network.

18. The storage medium of claim 17, wherein the operations further comprise:

determining a plurality of users on the online social network similar to the first user;

generating a ranked list of the plurality of users, based on a degree of similarity between each of the users and the first user; and providing the ranked list to the first user.

19. The storage medium of claim 18, wherein the operations further comprise:

prompting the first user to connect to one of more of the users via the online social network.

20. The storage medium of claim 18, wherein the plurality of users are restricted to users that are connected to the particular user via the online social network.

* * * * *